(12) United States Patent
Zhao et al.

(10) Patent No.: US 12,509,785 B2
(45) Date of Patent: Dec. 30, 2025

(54) RECOVERY PROCEDURE FOR CARBON OXIDE ELECTROLYZERS

(71) Applicant: Twelve Benefit Corporation, Berkeley, CA (US)

(72) Inventors: Shuai Zhao, Santa Clara, CA (US); Sichao Ma, Dublin, CA (US); Edward Izett, Berkeley, CA (US); Timothy A. Bekkedahl, Fremont, CA (US); Kendra P. Kuhl, Oakland, CA (US)

(73) Assignee: Twelve Benefit Corporation, Berkeley, CA (US)

( * ) Notice: Subject to any disclaimer, the term of this patent is extended or adjusted under 35 U.S.C. 154(b) by 621 days.

(21) Appl. No.: 17/652,255

(22) Filed: Feb. 23, 2022

(65) Prior Publication Data
US 2022/0267916 A1 Aug. 25, 2022

Related U.S. Application Data

(60) Provisional application No. 63/200,238, filed on Feb. 23, 2021.

(51) Int. Cl.
*C25B 15/02* (2021.01)
*C25B 3/26* (2021.01)
(Continued)

(52) U.S. Cl.
CPC ............... *C25B 15/02* (2013.01); *C25B 3/26* (2021.01); *C25B 9/19* (2021.01); *C25B 13/08* (2013.01)

(58) Field of Classification Search
CPC .. C25B 3/25; C25B 15/02; C25B 3/26; C25B 9/19; C25B 13/08
See application file for complete search history.

(56) References Cited

U.S. PATENT DOCUMENTS

| 10,865,490 B2 | 12/2020 | Ono et al. |
| 10,961,632 B2 | 3/2021 | Ono et al. |

(Continued)

FOREIGN PATENT DOCUMENTS

| CN | 101981744 A | 2/2011 |
| CN | 102912374 A | 2/2013 |

(Continued)

OTHER PUBLICATIONS

BR Office Action dated Aug. 15, 2023, in Application No. BR1120210103686 with English translation.
(Continued)

*Primary Examiner* — Ciel P Contreras
(74) *Attorney, Agent, or Firm* — Weaver Austin Villeneuve & Sampson LLP

(57) ABSTRACT

Methods and/or systems for operating a carbon oxide reduction electrolyzer may involve (a) performing normal operation at the electrolyzer; (b) performing a recovery or protection process including: (i) applying a modified current and/or voltage to the electrolyzer, and (ii) while applying the reverse current to the electrolyzer, flowing a recovery gas to the cathode; and (c) resuming normal operation at the electrolyzer. Applying a modified current and/or voltage may involve applying a short circuit to the electrolyzer, holding the electrolyzer electrodes at open circuit voltage, and/or applying a reverse current to the electrolyzer.

16 Claims, 6 Drawing Sheets

(51) Int. Cl.
*C25B 9/19* (2021.01)
*C25B 13/08* (2006.01)

(56) References Cited

U.S. PATENT DOCUMENTS

| | | | |
|---|---|---|---|
| 10,975,480 B2 | 4/2021 | Masel | |
| 10,975,481 B2 | 4/2021 | Guo et al. | |
| 11,417,901 B2 | 8/2022 | Ma et al. | |
| 11,578,415 B2 | 2/2023 | Cave et al. | |
| 11,888,191 B2 | 1/2024 | Ma et al. | |
| 12,043,912 B2 | 7/2024 | Cave et al. | |
| 2006/0016685 A1 | 1/2006 | Hawkins et al. | |
| 2008/0318093 A1 | 12/2008 | Lee et al. | |
| 2009/0155102 A1 | 6/2009 | Park et al. | |
| 2012/0328942 A1 | 12/2012 | Thomas-Alyea et al. | |
| 2013/0105304 A1 | 5/2013 | Kaczur et al. | |
| 2016/0161869 A1 | 6/2016 | Avneri et al. | |
| 2017/0259206 A1 | 9/2017 | Masel et al. | |
| 2017/0321333 A1 | 11/2017 | Kuhl et al. | |
| 2017/0321334 A1 | 11/2017 | Kuhl et al. | |
| 2018/0111083 A1 | 4/2018 | Masel | |
| 2018/0274109 A1 | 9/2018 | Kudo et al. | |
| 2019/0062931 A1 | 2/2019 | Stark et al. | |
| 2019/0085477 A1 | 3/2019 | Ono et al. | |
| 2019/0127865 A1 | 5/2019 | Li et al. | |
| 2019/0226103 A1 | 7/2019 | Kuhl et al. | |
| 2019/0233954 A1* | 8/2019 | Tacconi | C25B 11/031 |
| 2020/0080211 A1 | 3/2020 | Schmid et al. | |
| 2020/0087233 A1* | 3/2020 | Ono | C25B 9/73 |
| 2020/0087805 A1 | 3/2020 | Ono et al. | |
| 2020/0220185 A1 | 7/2020 | Ma et al. | |
| 2020/0240023 A1 | 7/2020 | Cave et al. | |
| 2020/0308718 A1 | 10/2020 | Patru et al. | |
| 2020/0376479 A1 | 12/2020 | Masel | |
| 2021/0002775 A1 | 1/2021 | Matsumoto et al. | |
| 2022/0393203 A1 | 12/2022 | Ma et al. | |
| 2023/0136397 A1 | 5/2023 | Cave et al. | |
| 2024/0145745 A1 | 5/2024 | Ma et al. | |
| 2024/0327999 A1 | 10/2024 | Cave et al. | |

FOREIGN PATENT DOCUMENTS

| | | | | |
|---|---|---|---|---|
| CN | 104619886 A | 5/2015 | | |
| CN | 104919088 A | 9/2015 | | |
| CN | 106715760 A | 5/2017 | | |
| CN | 107735512 A | 2/2018 | | |
| CN | 108884578 A | 11/2018 | | |
| CN | 109417181 A | 3/2019 | | |
| DE | 102016211155 A1 | 12/2017 | | |
| DE | 102016211151 A1 | 1/2018 | | |
| EP | 1038993 | 9/2000 | | |
| EP | 1193329 A1 | 4/2002 | | |
| EP | 3378968 A1 | 9/2018 | | |
| IN | 201817041221 A | 3/2019 | | |
| JP | H08296077 A | 11/1996 | | |
| JP | 2003213472 A | 7/2003 | | |
| JP | 2012050531 A | 3/2012 | | |
| JP | 2014532119 A | 12/2014 | | |
| JP | 2015533944 A | 11/2015 | | |
| JP | 2018154898 A | 10/2018 | | |
| JP | 2018154899 A | 10/2018 | | |
| JP | 2018184655 A | 11/2018 | | |
| KR | 100962903 B1 | 6/2010 | | |
| WO | WO-2008124538 A1 | 10/2008 | | |
| WO | WO-2013078004 A1* | 5/2013 | | C25B 1/04 |
| WO | WO-2016039999 A1 | 3/2016 | | |
| WO | WO-2017144395 A1 | 8/2017 | | |
| WO | WO-2017169682 A1 | 10/2017 | | |
| WO | WO-2017176306 A1 | 10/2017 | | |
| WO | WO-2017190234 A1 | 11/2017 | | |
| WO | WO-2017192787 A1 | 11/2017 | | |
| WO | WO-2019020239 A1 | 1/2019 | | |
| WO | WO-2020112919 A1 | 6/2020 | | |
| WO | WO-2020143970 A1 | 7/2020 | | |
| WO | WO-2021007508 A1 | 1/2021 | | |

OTHER PUBLICATIONS

BR Office Action dated Jul. 7, 2023, in Application No. BR112021011768-7 with English Translation.
CA Office Action dated Feb. 28, 2024 in CA Application No. 3120748.
IN Examination Report dated Dec. 5, 2022, in Application No. 202117030935 with English Translation.
IN Office Action dated Jan. 31, 2023 in Application No. IN202117028812.
International Preliminary Report on Patentability dated Jun. 10, 2021 in Application No. PCT/US2019/063471.
International Preliminary Report on Patentability dated Sep. 7, 2023, in PCT Application No. PCT/US2022/070797.
International Search Report and Written Opinion dated Jun. 29, 2022, in PCT Application No. PCT/US2022/070797.
JP Office Action dated Dec. 5, 2023 in JP Application No. 2021-528976 with English translation.
JP Office Action dated Feb. 27, 2024, in JP Application No. 2021-534155, with English Translation.
JP Office Action dated Sep. 5, 2023, in Application No. JP2021-528976 with English translation.
JP Office Action dated Sep. 5, 2023, in Application No. JP2021-534155 with English translation.
SA Examination Report dated Aug. 8, 2023, in Application No. 521422124 with English Translation.
SA Examination Report dated Feb. 6, 2024, in SA Application No. 521422124, with English Translation.
SA Examination Report dated Jun. 22, 2023, in Application No. 521422291 with English Translation.
Sharretts Plating Company. "What is Electrocleaning?" . . . Https://www.sharrettsplating.com/blog/what-is-electrocleaning/. Jul. 12, 2017, 3 pages.
U.S. Notice of Allowance dated Jul. 7, 2022 in U.S. Appl. No. 16/719,359.
U.S. Corrected Notice of Allowance dated Jan. 9, 2023 in U.S. Appl. No. 16/697,066.
U.S. Corrected Notice of Allowance dated Mar. 19, 2024 in U.S. Appl. No. 18/145,702.
U.S. Non Final Office Action dated Mar. 30, 2023 for U.S. Appl. No. 17/662,225.
U.S. Non-Final Office Action dated Nov. 8, 2023 in U.S. Appl. No. 18/145,702.
U.S. Notice of Allowance dated Mar. 6, 2024 in U.S. Appl. No. 18/145,702.
U.S. Notice of Allowance dated Mar. 25, 2022 in U.S. Appl. No. 16/719,359.
U.S. Notice of Allowance dated May 17, 2023 in U.S. Appl. No. 17/662,225.
U.S. Notice of Allowance dated Sep. 18, 2023, in U.S. Appl. No. 17/662,225.
U.S. Notice of Allowance dated Sep. 29, 2022 in U.S. Appl. No. 16/697,066.
U.S. Appl. No. 18/145,702 inventors Cave et al., filed Dec. 22, 2022.
Badami, M. "Leakage effects on the performance characteristics of a regenerative blower for the hydrogen recirculation of a PEM fuel cell," Energy Conversion and Management, vol. 55, Mar. 2012, pp. 20-25.
Badami, M., "Theoretical model with experimental validation of a regenerative blower for hydrogen recirculation in a PEM fuel cell system," Energy Conversion and Management, vol. 51, Issue 3, Mar. 2010, pp. 553-560.
Blaszczyk, J., "In-Situ Anode Recirculation Rate Measurement Method (Draft)," Ogura Industrial Corporation, Ballard Power Systems, Full Cell Seminar & Exposition 2011, Oct. 31-Nov. 3, 2011, 22 pages.
Casebolt, R., et al., "Effect of Electrolyte Composition and Concentration on Pulsed Potential Electrochemical CO2 Reduction," ChemElectroChem, Chemistry Europe, Accepted Manuscript, 25 pp.
Choo et al. Modulated Ionomer Distribution in the Catalyst Layer of Polymer Electrolyte Membrane Fuel Cells for High Temperature

(56) References Cited

OTHER PUBLICATIONS

Operation, Chemsuschem, vol. 7, Issue 8, Aug. 2014, pp. 2335-2341.
Endrodi, B., "Multilayer Electrolyzer Stack Converts Carbon Dioxide to Gas Products at High Pressure with Multilayer Electrolyzer Stack Converts Carbon," acs Energy Lett. 2019, 4, 1770-1777.
Hori, Y., "Chapter 48: Co2-reduction, catalyzed by metal electrodes," Handbook of Fuel Cells—Fundamentals, Technology and Applications, vol. 2, Electrocatalysis, 2003. pp. 720-733.
International Search Report and Written Opinion issued on Apr. 8, 2020, in PCT Application No. PCT/US2019/067169.
International Search Report and Written Opinion issued on Mar. 19, 2020, in PCT Application No. PCT/US2019/063471.
James, B.D., et al. 2017 DOE Hydrogen and Fuel Cells Program Review, Fuel Cell Systems Analysis, Strategic Analysis, Project IDI FC163, Jun. 8, 2017, 34 pages.
Kaczur, J., et al., "A Review of the Use of Immobilized Ionic Liquids in the Electrochemical conversion of CO2," Journal of Carbon Research, ,2020 6, 33, 12 pages.
Kim, C., et al., "Impact of Pulsed Electrochemical Reduction of CO2 on the formation of C2+ Products over Cu," ACS Catal., 2020, 10, 12403-12413.
Kimura, K.W., et al., "Selective Electrochemical CO2 Reduction During Pulsed Potential Stems From Dynamic Interface," ACS Catalysis, ACS Paragon Plus Environment, University of Illinois at Urbana-Champaign, Downloaded from pubs.acs.org on Jun. 30, 2020, 31 pages.
Kutz, R. et al., Sustainion Imidazolium-Functionalized Polymers for Carbon Dioxide Electrolysis, Energy Technology, 2017, 5, pp. 929-936.
Li, et al., "Electrolysis of Co2 to Syngas in Bipolar Membrane-Based Electrochemical Cells," ACS Publications, ACS Energy Letters, 2016, 1, pp. 1149-1153.
Li, et al., "Electrolytic Conversion of Bicarbonate into CO in a Flow Cell," Cell Press, Joule 3, Jun. 19, 2019, pp. 1487-1497.
Ren, D., et al., "Selective Electrochemical Reduction of Carbon Dioxide to Ethylene and Ethanol on Copper(I) Oxide Catalysts," ACS Catal., 2015, 5, pp. 2814-2821.
Ren, D., et al., "The effects of currents and potentials on the selectivities of copper toward carbon dioxide electroreduction," Nature Communication, 2018, 9:925, pp. 1-8.
Salvatore, D., et al. "Electrolysis of Gaseous Co2 to CO in a Flow Cell with a Bipolar Memberane," ACS Energy Letters, 2018, 3, pp. 149-154.
Sharma, et al., "Electrocatalytic conversion of carbon dioxide to fuels: a review on the interaction between CO2 and the liquid electrolyte," WIREs Energy Environ 2017, 6:e239. doi: 10.1002/wene.239, pp. 1-21.
U.S. Corrected Notice of Allowability dated Dec. 30, 2021, in U.S. Appl. No. 16/719,359.
U.S. Non Final Office Action dated Feb. 23, 2022 in U.S. Appl. No. 16/697,066.
U.S Notice of Allowance dated Dec. 21, 2021, in U.S. Appl. No. 16/719,359.
U.S. Restriction Requirement dated Oct. 29, 2021, in U.S. Appl. No. 16/697,066.
Verma, et al., "The effect of electrolyte composition on the electroreduction of CO2 to CO on Ag based gas diffusion electrodes," Phys. Chem. Chem. Phys., 2016, 18, pp. 7075-7084.
Weekes D.M., et al., "Electrolytic CO2 Reduction in a Flow Cell", Accounts of Chemical Research, 2018, vol. 51 (4), pp. 910-918.
Xia, Chuan, et al., "Continuous production of pure liquid fuel solutions via electrocatalytic CO2 reduction using solid electrolyte devices," Nature Energy, http://www.nature.com/natureenergy; http://www.nature.com/natureenergy.
Xu, Y., et al., "Self-Cleaning CO2 Reduction Systems: Unsteady Electrochemical Forcing Enables Stability," ACS Energy Letters, 2021, 6, pp. 809-815.
AE Examination Report dated Sep. 3, 2024 in AE Application No. P6001035/2021.
AE Search Report and Examination Report dated Jun. 20, 2024 in AE Application No. P6000880 /2021.
AU Examination Report dated Nov. 14, 2024, in AU Application No. 20190401616.9 .
Australian Examination Report dated Oct. 22, 2024, in AU Application No. 2019386085.
Bui, J., et al., "Engineering Catalyst-electrolyte Microenvironments to Optimize the Activity and Selectivity for the Electrochemical Reduction of Co2 on Cu and Ag," Accounts of Chemical Research, 2022, vol. 55(4), pp. 484-494.
CN Notice of Allowance dated Jun. 28, 2024 in CN Application No. 201980090689.2 with English Translation.
CN Office Action dated Jun. 27, 2024 in CN Application No. 201980086718.8 with English translation.
JP Office Action dated Nov. 5, 2024 in JP Application No. 2021-534155 with English translation.
KR Office Action dated Oct. 16, 2024 in KR Application No. 10-2021-7019873 with English Translation.
KR Office Action dated Sep. 26, 2024 in KR Application No. 10-2021-7022695 with English Translation.
SA Office Action dated Sep. 16, 2024 in SA Application No. 524452150 with English translation.
US Non-Final Office Action dated May 5, 2025 in U.S. Appl. No. 18/542,508.
EP Extended European Search Report dated May 27, 2025 in EP Application No. 22760614.2.

* cited by examiner

RECOVERY PROCEDURE FOR CARBON OXIDE ELECTROLYZERS

STATEMENT OF GOVERNMENT SUPPORT

This invention was made with government support under Award Number DE-FE0031712 awarded by the National Energy Technology Laboratory. The government has certain rights in the invention.

INCORPORATION BY REFERENCE

An Application Data Sheet is filed concurrently with this specification as part of the present application. Each application that the present application claims benefit of or priority to as identified in the concurrently filed Application Data Sheet is incorporated by reference herein in their entireties and for all purposes.

BACKGROUND

Electrolytic carbon dioxide reactors must balance various operating conditions such as reactant composition at the anode and cathode, electrical energy delivered to the anode and cathode, and the physical chemical environment of the electrolyte, anode, and cathode. Balancing these conditions can have a strong impact on the electrolytic reactor's operating voltage, Faradaic yield, and mix of products generated at the cathode, including carbon monoxide (CO) and/or other carbon-containing products (CCPs) and hydrogen.

Background and contextual descriptions contained herein are provided solely for the purpose of generally presenting the context of the disclosure. Much of this disclosure presents work of the inventors, and simply because such work is described in the background section or presented as context elsewhere herein does not mean that such work is admitted prior art.

SUMMARY

Some aspects of this disclosure pertain to methods of operating an electrolyzer for carbon oxide reduction, and such methods may be characterized by the following operations: (a) performing normal operation at the electrolyzer; (b) performing a recovery or protection process comprising: (i) creating an electrical short circuit between the cathode and an anode of the electrolyzer, and (ii) while electrically shorting the cathode and anode, flowing a recovery gas to the cathode; and (c) resuming normal operation at the electrolyzer.

In certain embodiments, normal operation comprises inletting a reactant gas comprising a carbon oxide to a cathode of the electrolyzer and applying an electrical current to the electrolyzer at a first current density, to thereby reduce the carbon oxide and produce a carbon-containing reduction product. In some embodiments, resuming normal operation comprises stopping or modifying flow of the recovery gas to the cathode, and removing the electrical short circuit.

In certain embodiments, normal operation comprises flowing the reactant gas to the cathode at first flow rate and at a first pressure. In certain embodiments, normal operation comprises periodically pausing and/or pulsing the electrical current to the electrolyzer. In certain embodiments, performing normal operation at the electrolyzer comprises performing normal operation for a period of at least about 100 hours.

In certain embodiments, the methods additionally include, after resuming normal operation at the electrolyzer, continuing to perform normal operation at the electrolyzer for at least about 100 hours before again performing the recovery or protection process or terminating operation of the electrolyzer.

In certain embodiments, the carbon oxide is $CO_2$ and/or CO and the carbon-containing reduction product comprises CO, a hydrocarbon, or an organic oxygen-containing compound.

In certain embodiments, the recovery gas has a different composition than the reactant gas. In certain embodiments, the recovery or protection process is performed for a period of about 5 to 300 minutes.

In some embodiments, the methods additionally include determining that an event that is likely to harm performance of the electrolyzer is occurring or is likely to occur, and performing the protection process.

Some aspects of this disclosure pertain to methods of operating an electrolyzer for carbon oxide reduction, and such methods may be characterized by the following operations: (a) performing normal operation at the electrolyzer; (b) performing a recovery or protection process comprising: (i) transitioning the electrolyzer to a state in which there is an open circuit voltage between the cathode and the anode of the electrolyzer, and (ii) while the electrolyzer maintains the open circuit voltage, flowing a recovery gas to the cathode; and (c) resuming normal operation at the electrolyzer.

In some embodiments, normal operation comprises inletting a reactant gas comprising a carbon oxide to a cathode of the electrolyzer and applying an electrical current to the electrolyzer at a first current density, to thereby produce an operating electrical potential between the cathode and an anode of the electrolyzer and reduce the carbon oxide and produce a carbon-containing reduction product. In some embodiments, resuming normal operation comprises stopping or modifying flow of the recovery gas to the cathode, and returning to the operating electrical potential.

In certain embodiments, normal operation comprises flowing the reactant gas to the cathode at first flow rate and at a first pressure. In certain embodiments, normal operation comprises periodically pausing and/or pulsing the electrical current to the electrolyzer. In certain embodiments, performing normal operation at the electrolyzer comprises performing normal operation for a period of at least about 100 hours.

In certain embodiments, the methods additionally include, after resuming normal operation at the electrolyzer, continuing to perform normal operation at the electrolyzer for at least about 100 hours before again performing the recovery or protection process or terminating operation of the electrolyzer.

In certain embodiments, the carbon oxide is $CO_2$ and/or CO and the carbon-containing reduction product comprises CO, a hydrocarbon, or an organic oxygen-containing compound.

In certain embodiments, the recovery gas has a different composition than the reactant gas. In certain embodiments, the recovery or protection process is performed for a period of about 5 to 300 minutes.

Some aspects of this disclosure pertain to methods of operating an electrolyzer for carbon oxide reduction, and such methods may be characterized by the following operations: (a) performing normal operation at the electrolyzer; (b) performing a recovery or protection process comprising: (i) applying a reverse current to the electrolyzer, and (ii) while applying the reverse current to the electrolyzer, flowing a recovery gas to the cathode; and (c) resuming normal operation at the electrolyzer.

Normal operation may comprise inletting a reactant gas comprising a carbon oxide to a cathode of the electrolyzer and applying an electrical current to the electrolyzer at a first current density, to thereby produce an operating electrical potential between the cathode and an anode of the electrolyzer and reduce the carbon oxide and produce a carbon-containing reduction product. Resuming normal operation may comprise stopping or modifying flow of the recovery gas to the cathode, and ceasing application of the reverse current to the electrolyzer.

In certain embodiments, applying the reverse current comprises applying an anodic current at a magnitude of at most about −50 mA/cm$^2$ of cathode planar surface area.

In certain embodiments, normal operation comprises flowing the reactant gas to the cathode at first flow rate and at a first pressure. In certain embodiments, normal operation comprises periodically pausing and/or pulsing the electrical current to the electrolyzer. In certain embodiments, performing normal operation at the electrolyzer comprises performing normal operation for a period of at least about 100 hours.

In certain embodiments, the methods additionally include, after resuming normal operation at the electrolyzer, continuing to perform normal operation at the electrolyzer for at least about 100 hours before again performing the recovery or protection process or terminating operation of the electrolyzer.

In certain embodiments, the carbon oxide is $CO_2$ and/or CO and the carbon-containing reduction product comprises CO, a hydrocarbon, or an organic oxygen-containing compound.

In certain embodiments, the recovery gas has a different composition than the reactant gas. In certain embodiments, the recovery or protection process is performed for a period of about 5 to 300 minutes.

In some embodiments, the methods additionally include determining that an event that is likely to harm performance of the electrolyzer is occurring or is likely to occur and performing the protection process.

Certain aspects of the disclosure pertain to carbon oxide reduction electrolyzers that may be characterized by the following features: (a) at least one membrane electrode assembly (MEA) comprising (i) a cathode comprising a carbon oxide reduction catalyst that promotes reduction of a carbon oxide, (ii) an anode comprising a catalyst that promotes oxidation, and (iii) a polymer electrolyte membrane (PEM) layer disposed between the cathode and the anode; (b) a power source configured to control electrical current applied to carbon oxide reduction electrolyzer; and (c) one or more controllers configured to cause the electrolyzer to: (1) perform normal operation at the MEA, wherein normal operation comprises inletting a reactant gas comprising a carbon oxide to a cathode of the MEA and applying an electrical current to the MEA at a first current density, (2) perform a recovery or protection process comprising: (i) creating an electrical short circuit between the cathode and an anode of the electrolyzer, and (ii) while electrically shorting the cathode and anode, flowing a recovery gas to the cathode, and (3) resume normal operation at the MEA by stopping or modifying flow of the recovery gas to the cathode, and removing the electrical short circuit.

In certain embodiments, the one or more controllers are configured to cause the electrolyzer to flow the reactant gas to the cathode at first flow rate and at a first pressure during normal operation. In certain embodiments, the one or more controllers are configured to cause the electrolyzer to periodic pause and/or pulse the electrical current to the MEA during normal operation. In certain embodiments, the one or more controllers are configured to cause the electrolyzer to perform normal operation for a period of at least about 100 hours.

In certain embodiments, the one or more controllers are further configured to cause the electrolyzer to continue to perform normal operation at the MEA for at least about 100 hours, after resuming normal operation at the MEA, and before again performing the recovery or protection process or terminating operation of the MEA.

In certain embodiments, the recovery gas has a different composition than the reactant gas.

In certain embodiments, the one or more controllers are configured to cause the electrolyzer to perform the recovery or protection process for a period of about 5 to 300 minutes.

In certain embodiments, the one or more controllers are configured to determine that an event that is likely to harm performance of the electrolyzer is occurring or is likely to occur, and performing the protection process.

Certain aspects of the disclosure pertain to carbon oxide reduction electrolyzers that may be characterized by the following features: (a) at least one membrane electrode assembly (MEA) comprising (i) a cathode comprising a carbon oxide reduction catalyst that promotes reduction of a carbon oxide, (ii) an anode comprising a catalyst that promotes oxidation, and (iii) a polymer electrolyte membrane (PEM) layer disposed between the cathode and the anode; (b) a power source configured to control electrical current applied to carbon oxide reduction electrolyzer; and (c) one or more controllers configured to cause the electrolyzer to: (1) perform normal operation at the MEA, wherein normal operation comprises inletting a reactant gas comprising a carbon oxide to a cathode of the MEA and applying an electrical current to the MEA at a first current density, (2) perform a recovery or protection process comprising: (i) transitioning the electrolyzer to a state in which there is an open circuit voltage between the cathode and the anode of the electrolyzer, and (ii) while the electrolyzer maintains the open circuit voltage, flowing a recovery gas to the cathode; and (3) resume normal operation at the MEA by stopping or modifying flow of the recovery gas to the cathode, and returning to the operating electrical potential.

In certain embodiments, the one or more controllers are configured to cause the electrolyzer to flow the reactant gas to the cathode at first flow rate and at a first pressure during normal operation.

In certain embodiments, the one or more controllers are further configured to cause the electrolyzer to continue to perform normal operation at the MEA for at least about 100 hours, after resuming normal operation at the MEA, and before again performing the recovery or protection process or terminating operation of the MEA.

In certain embodiments, the recovery gas has a different composition than the reactant gas.

Certain aspects of the disclosure pertain to carbon oxide reduction electrolyzers that may be characterized by the following features: (a) at least one membrane electrode assembly (MEA) comprising (i) a cathode comprising a carbon oxide reduction catalyst that promotes reduction of a carbon oxide, (ii) an anode comprising a catalyst that promotes oxidation, and (iii) a polymer electrolyte membrane (PEM) layer disposed between the cathode and the anode; (b) a power source configured to control electrical current applied to carbon oxide reduction electrolyzer; and (c) one or more controllers configured to cause the electrolyzer to: (1) perform normal operation at the MEA, wherein normal operation comprises inletting a reactant gas comprising a carbon oxide to a cathode of the MEA and applying an electrical current to the MEA at a first current density, (2) perform a recovery or protection process comprising: (i) applying a reverse current to the electrolyzer, and (ii) while applying the reverse current to the electrolyzer, flowing a recovery gas to the cathode; and (3) resume normal operation at the MEA by stopping or modifying flow of the recovery gas to the cathode and ceasing application of the reverse current to the electrolyzer.

In certain embodiments, the one or more controllers are configured to cause the electrolyzer to flow the reactant gas to the cathode at first flow rate and at a first pressure during normal operation. In certain embodiments, the one or more controllers are configured to cause the electrolyzer to periodic pause and/or pulse the electrical current to the MEA during normal operation. In certain embodiments, the one or more controllers are configured to cause the electrolyzer to perform normal operation for a period of at least about 100 hours.

In certain embodiments, the one or more controllers are further configured to cause the electrolyzer to continue to perform normal operation at the MEA for at least about 100 hours, after resuming normal operation at the MEA, and before again performing the recovery or protection process or terminating operation of the MEA.

In certain embodiments, the recovery gas has a different composition than the reactant gas.

In certain embodiments, the one or more controllers are configured to cause the electrolyzer to perform the recovery or protection process for a period of about 5 to 300 minutes.

In certain embodiments, the one or more controllers are configured to determine that an event that is likely to harm performance of the electrolyzer is occurring or is likely to occur and performing the protection process.

Yet another aspect of this disclosure pertains to methods of operating a carbon oxide reduction electrolyzer, which methods may be characterized by the following operations: (a) performing normal operation at the electrolyzer, wherein normal operation comprises inletting a reactant gas comprising a carbon oxide to a cathode of the electrolyzer and applying an electrical current to the electrolyzer at a first current density, to thereby reduce the carbon oxide and produce a carbon-containing reduction product; (b) performing a recovery process comprising: (i) stopping or significantly reducing the electrical current applied to the electrolyzer, and (ii) while stopping or significantly reducing the current applied to the electrolyzer, contacting the cathode with a liquid; and (c) resuming normal operation at the electrolyzer. In some embodiments, resuming normal operation comprises stopping the contacting of the cathode with the liquid and reapplying electrical current to the electrolyzer.

In some implementations, contacting the cathode with the liquid comprises flowing the liquid to the cathode. In some embodiments, the liquid comprises water. In some embodiments, the water comprises a dissolved salt. In some embodiments, the dissolved salt comprises a bicarbonate salt at a concentration of about 20 mM or less.

In some embodiments, the recovery process additionally includes flowing a drying gas to the cathode after contacting the cathode with the liquid and at least partially before resuming normal operation. In such embodiments, the drying gas may comprise the carbon oxide, an inert gas, air, or any combination thereof.

In some embodiments, the recovery process further comprises flowing a recovery gas to the cathode before contacting the cathode with the liquid. In such embodiments, the recovery gas may have a different composition than the reactant gas, may flow to the cathode at a different flow rate than the reactant gas during normal operation, may contact the cathode at a different pressure than the reactant gas during normal operation, or any combination thereof.

Normal operation may be performed as described above for any of the methods that perform a recovery or protection operation. Further, in some embodiments, during normal operation, the liquid does not contact the cathode. Additionally, the carbon oxide and carbon-containing reaction product may be characterized as described above for any of the embodiments that perform a recovery or protection operation.

In some embodiments, the recovery process is performed for a period of about 5 to 300 minutes.

In some embodiments, the methods additionally include, after resuming normal operation at the electrolyzer, continuing to perform normal operation at the electrolyzer for at least about 100 hours before again performing the recovery process or terminating operation of the electrolyzer.

In some embodiments, significantly reducing the electrical current applied to the electrolyzer comprises applying the electrical current to the cathode at a level of at most about 100 $mA/cm^2$ of cathode planar surface area. In some embodiments, significantly reducing the electrical current applied to the electrolyzer comprises applying the electrical current in an anodic direction to the cathode. In some examples, applying the electrical current in the anodic direction comprises applying an anodic current at a level of at most about 1 $mA/cm^2$ of cathode planar surface area.

In some embodiments, while stopping or significantly reducing the electrical current applied to the electrolyzer, the method additionally comprises a voltage or current scan at the electrolyzer. In some such embodiments, the voltage or current scan is performed cyclically.

Certain other aspects of the disclosure pertain to carbon oxide reduction electrolyzers, which may be characterized by the following features: (a) at least one membrane electrode assembly (MEA) comprising (i) a cathode comprising a carbon oxide reduction catalyst that promotes reduction of a carbon oxide, (ii) an anode comprising a catalyst that promotes oxidation, and (iii) a polymer electrolyte membrane (PEM) layer disposed between the cathode and the anode; (b) a power source configured to control electrical current or voltage applied to carbon oxide reduction electrolyzer; and (c) one or more controllers configured to cause the electrolyzer to (1) perform normal operation at the MEA, (2) perform a recovery process comprising: (i) stopping or significantly reducing the electrical current applied to the MEA, and (ii) while stopping or significantly reducing the current applied to the MEA, contacting the cathode with a liquid, and (3) resume normal operation at the MEA, wherein resuming normal operation comprises stopping the contacting of the cathode with the liquid and reapplying electrical current to the MEA. Normal operation may comprise inletting a reactant gas comprising a carbon oxide to a cathode of the MEA and applying an electrical current to the MEA at a first current density. In certain embodiments, the one or more controllers are configured to cause the electrolyzer to flow the liquid to the cathode.

Normal operation may be controlled by systems as described above for any systems that perform a recovery or protection operation. Additionally, the carbon oxide and carbon-containing reaction product may be characterized as described above for any of the aspects that may perform a recovery or protection operation.

In certain embodiments, the one or more controllers are further configured to cause the electrolyzer to continue to perform normal operation at the MEA for at least about 100 hours, after resuming normal operation at the MEA, and before again performing the recovery process or terminating operation of the MEA. In certain embodiments, the one or more controllers are configured to cause the electrolyzer to perform the recovery process for a period of about 5 to 300 minutes.

In certain embodiments, the one or more controllers are further configured to cause the electrolyzer to flow a recovery gas to the cathode before contacting the cathode with the liquid. In such embodiments, the recovery gas may have a different composition than the reactant gas, may flow to the cathode at a different flow rate than the reactant gas during normal operation, may contact the cathode at a different pressure than the reactant gas during normal operation, or may involve any combination thereof.

In certain embodiments, the one or more controllers are further configured to cause the electrolyzer to flow a drying gas to the cathode after contacting the cathode with the liquid and at least partly before resuming normal operation.

In some implementations, contacting the cathode with the liquid comprises flowing the liquid to the cathode. In some embodiments, the liquid comprises water. In some embodiments, the water comprises a dissolved salt. In some embodiments, the dissolved salt comprises a bicarbonate salt at a concentration of about 20 mM or less.

In certain embodiments, the one or more controllers are configured to cause the electrolyzer to significantly reduce the electrical current applied to the MEA by applying the electrical current to the cathode at a level of at most about 100 mA/cm$^2$ of cathode planar surface area.

In certain embodiments, the one or more controllers are configured to cause the electrolyzer to significantly reduce the electrical current applied to the MEA by applying the electrical current in an anodic direction to the cathode. In some such embodiments, the electrical current in the anodic direction has a current density of at most about 1 mA/cm$^2$ of cathode planar surface area.

In certain embodiments, the one or more controllers are configured to cause the electrolyzer to perform a voltage or current scan at the MEA, while stopping or significantly reducing the electrical current applied to the MEA. In some cases, the one or more controllers are configured to cause the electrolyzer to perform the voltage or current scan cyclically.

Some further aspects of the disclosure pertain to methods of operating an electrolyzer for carbon oxide reduction, which methods may be characterized by the following operations: (a) performing normal operation at the electrolyzer; (b) performing a recovery process comprising: (i) stopping or significantly reducing the electrical current applied to the electrolyzer, and (ii) while stopping or significantly reducing the current applied to the electrolyzer, flowing a recovery gas to the cathode; and (c) resuming normal operation at the electrolyzer, wherein resuming normal operation comprises stopping or modifying flow of the recovery gas to the cathode and reapplying electrical current to the electrolyzer.

Normal operation may comprise inletting a reactant gas comprising a carbon oxide to a cathode of the electrolyzer and applying an electrical current to the electrolyzer at a first current density to thereby reduce the carbon oxide and produce a carbon-containing reduction product. Normal operation may be performed as described above for any of the methods that perform a recovery or protection operation. Further, in some embodiments, during normal operation, the liquid does not contact the cathode. Additionally, the carbon oxide and carbon-containing reaction product may be characterized as described above for any of the embodiments that perform a recovery or protection operation.

In certain embodiments, the recovery gas has a different composition than the reactant gas. In certain embodiments, the recovery process is performed for a period of about 5 to 300 minutes.

In some embodiments, the methods additionally include, after resuming normal operation at the electrolyzer, continuing to perform normal operation at the electrolyzer for at least about 100 hours before again performing the recovery process or terminating operation of the electrolyzer.

In certain embodiments, significantly reducing the electrical current applied to the electrolyzer comprises applying the electrical current to the cathode at a level of at most about 100 mA/cm$^2$ of cathode planar surface area. In certain embodiments, significantly reducing the electrical current applied to the electrolyzer comprises applying the electrical current in an anodic direction to the cathode. As an example, applying the electrical current in the anodic direction comprises applying an anodic current at a level of at most about 1 mA/cm$^2$ of cathode planar surface area.

In certain embodiments, while stopping or significantly reducing the electrical current applied to the electrolyzer, the method performs a voltage or current scan at the electrolyzer. As an example, the voltage or current scan is performed cyclically.

Yet another aspect of the disclosure pertains to systems that may be characterized by the following elements: (a) at least one membrane electrode assembly (MEA) comprising (i) a cathode comprising a carbon oxide reduction catalyst that promotes reduction of a carbon oxide, (ii) an anode comprising a catalyst that promotes oxidation, and (iii) a polymer electrolyte membrane (PEM) layer disposed between the cathode and the anode; (b) a power source configured to control electrical current applied to carbon oxide reduction electrolyzer; and (c) one or more controllers configured to cause the electrolyzer to:
  a. perform normal operation at the MEA,
  b. perform a recovery process comprising: (i) stopping or significantly reducing the electrical current applied to the MEA, and (ii) while stopping or significantly reducing the current applied to the MEA, flowing a recovery gas to the cathode, and
  c. resume normal operation at the MEA.

Normal operation may comprise inletting a reactant gas comprising a carbon oxide to a cathode of the MEA and applying an electrical current to the MEA at a first current density. Resuming normal operation may comprise stopping the contacting of the cathode with the liquid and reapplying electrical current to the MEA.

Normal operation may be controlled by systems as described above for any systems that perform a recovery or protection operation. Additionally, the carbon oxide and carbon-containing reaction product may be characterized as described above for any of the aspects that may perform a recovery or protection operation.

In certain embodiments, the one or more controllers are configured to cause the electrolyzer to perform the recovery process for a period of about 5 to 300 minutes. In certain embodiments, the one or more controllers are further configured to cause the electrolyzer to continue to perform normal operation at the MEA for at least about 100 hours, after resuming normal operation at the MEA, and before again performing the recovery process or terminating operation of the MEA. In some embodiments, the recovery gas has a different composition than the reactant gas.

In certain embodiments, the one or more controllers are configured to cause the electrolyzer to significantly reduce the electrical current applied to the MEA by applying the electrical current to the cathode at a level of at most about 100 mA/cm² of cathode planar surface area.

In certain embodiment, the one or more controllers are configured to cause the electrolyzer to significantly reduce the electrical current applied to the MEA by applying the electrical current in an anodic direction to the cathode. As an example, the electrical current in the anodic direction has a current density of at most about 1 mA/cm² of cathode planar surface area.

In certain embodiments, the one or more controllers are configured to cause the electrolyzer to perform a voltage or current scan at the MEA, while stopping or significantly reducing the electrical current applied to the MEA. As an example, the one or more controllers are configured to cause the electrolyzer to perform the voltage or current scan cyclically.

These and other features of the disclosure will be described further herein and with reference to the associated drawings.

DETAILED DESCRIPTION

Introduction and Context

Figure 1A:
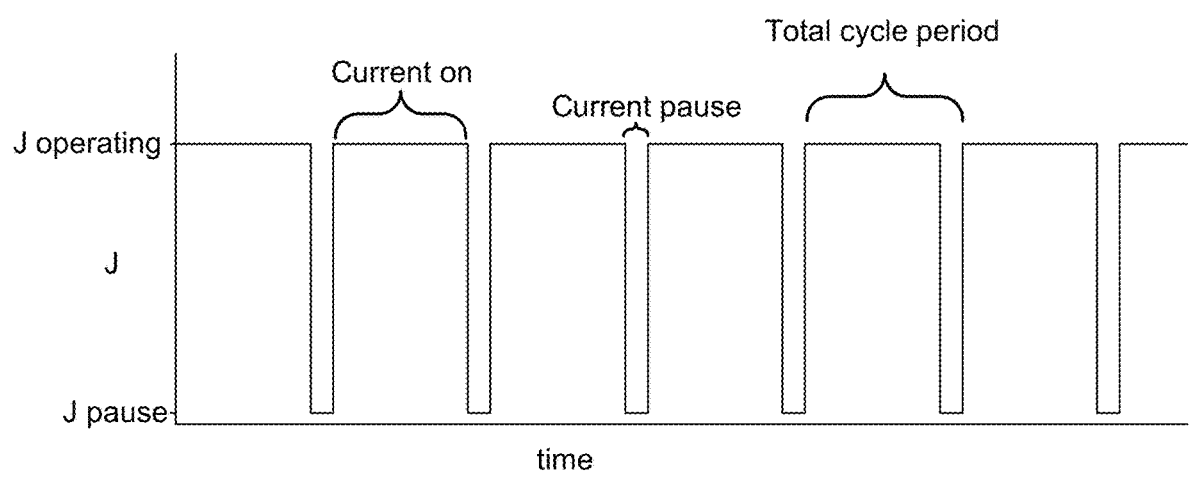
FIG. 1A is an illustration of an example of a current pause schedule or profile that may be implemented during operation of a carbon oxide reduction electrolyzer according to various embodiments of the disclosure.

Carbon oxide electrolyzers containing polymer-based membrane electrode assemblies (MEAs) are designed to produce oxygen at the anofde from water and one or more carbon-based compounds through the electrochemical reduction of carbon dioxide or other carbon oxide at the cathode. As used herein, the term carbon oxide includes carbon dioxide ($CO_2$), carbon monoxide (CO), carbonate ions ($CO_3^{2-}$), bicarbonate ions ($HCO3^-$), and any combinations thereof. Various examples of MEAs and MEA-based carbon oxide electrolyzers are described in the following references: Published PCT Application No. 2017/192788, published Nov. 9, 2017, and titled "REACTOR WITH ADVANCED ARCHITECTURE FOR THE ELECTROCHEMICAL REACTION OF $CO_2$, CO, AND OTHER CHEMICAL COMPOUNDS," Published PCT Application No. 2019/144135, published Jul. 25, 2019, and titled "SYSTEM AND METHOD FOR CARBON DIOXIDE REACTOR CONTROL," and, US Provisional Patent Application No. 62/939,960, filed Nov. 25, 2019, and titled "MEMBRANE ELECTRODE ASSEMBLY FOR COX REDUCTION," each of which is incorporated herein by reference in its entirety. In some cases, an MEA has a bipolar interface, i.e., an interface between a layer of a first ion exchange polymer that is substantially more conductive to anions than cations and a layer of a second ion exchange polymer that is substantially more conductive to cations than anions. In some cases, an MEA contains only an anion exchange polymer or multiple anion exchange polymers, optionally provided as a plurality of layers.

Operating Parameter Types

Disclosed herein are various operating conditions for MEAs and MEA-based carbon oxide electrolzyers. Among the types of operating parameters are:

carbon oxide gas flow parameters—e.g., $CO_2$ flow rate (molar and volumetric), pressure, and composition;
anode water flow parameters—e.g., water flow rate, pressure, temperature, and composition; electrical parameters—e.g., current density and voltage;
MEA and cell temperature;
electrolyzer start up conditions; and
temporal variations in operating conditions (e.g., pulsing current and/or gas flow)

Gas Management

Introduction

In a carbon oxide reduction cell, a carbon oxide is supplied to the cathode. The carbon oxide serves any one or more of multiple possible purposes. For example, it serves as a reactant. It may also serve as a purge gas for removing water and/or removing reduction products from the cathode.

Parameters that characterize gas flow to the cathode include the gas composition at the inlet to the cell, the gas composition at the outlet from the cell, the volumetric flow rate of the gas stream to the cathode, the velocity of the gas stream to the cathode, the molar flow rate of reactant gas to cathode, the pressure of the gas at the inlet to the cell, the gas distribution pattern over the cathode, the total cross-sectional area of flow channels and pressure drop of the gas as it flows through the cell. The term "input gas stream" refers to the gas at the inlet to an electrolytic carbon oxide reduction cell. In MEA electrolyzers having a flow field, the inlet gas stream may be the gas that enters the cell upstream of the MEA and flow field. Examples of cell stacks including an MEA, a gas diffusion layer, and a flow field are described in PCT Patent Application Publication No. 2019144135, published Jul. 25, 2019, which is incorporated herein by reference in its entirety.

Roles of Gas Flowing to the Cathode

At least some of the gas flowing into the cathode is consumed by the reduction reaction. The inlet gas may be characterized by the molar flow rate of the reactant carbon oxide entering the cell. Typically, the molar flow rate is large enough to support a specified reaction rate. The reaction rate may be determined, at least in part, by current density at the cathode and the efficiency of the reduction reaction at the cathode. A non-exhaustive list of cathode reduction reactions is shown here.

CO and $CO_2$ electrolysis reactions when water is a product:

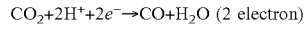

$CO_2 + 2H^+ + 2e^- \rightarrow CO + H_2O$ (2 electron)

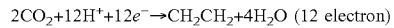

$2CO_2 + 12H^+ + 12e^- \rightarrow CH_2CH_2 + 4H_2O$ (12 electron)

$$2CO_2+12H^++12e^-\rightarrow CH_3CH_2OH+3H_2O \text{ (12 electron)}$$

$$CO_2+8H^++8e^-\rightarrow CH_4+2H_2O \text{ (8 electron)}$$

$$2CO+8H^++8e^-\rightarrow CH_2CH_2+2H_2O \text{ (8 electron)}$$

$$2CO+8H^++8e^-\rightarrow CH_3CH_2OH+H_2O \text{ (8 electron)}$$

$$CO+6H^++6e^-\rightarrow CH_4+H_2O \text{ (6 electron)}$$

CO and CO$_2$ electrolysis reactions when water is the proton source:

$$CO_2+H_2O+2O+2e^-\rightarrow CO+2OH^- \text{(2 electron)}$$

$$2CO_2+8H_2O+12e^-\rightarrow CH_2CH_2+12OH^- \text{(12 electron)}$$

$$2CO_2+9H_2O+12e^-\rightarrow CH_3CH_2OH+12OH^- \text{(12 electron)}$$

$$CO_2+6H_2O+8e^-\rightarrow CH_4+8OH^- \text{(8 electron)}$$

$$2CO+6H_2O+8e^-\rightarrow CH_2CH_2+8OH^- \text{(8 electron)}$$

$$2CO+7H_2O+8e^-\rightarrow CH_3CH_2OH+8OH^- \text{(8 electron)}$$

$$CO+5H_2O+6e^-\rightarrow CH_4+6OH^- \text{(6 electron)}$$

Another role of the inlet gas stream to the cathode may be to flush out reaction products generated at the cathode. These products may be liquid (e.g., ethanol, formic acid, acetic acid, 1-propanol) or gas (e.g., CO, methane, ethylene, and/or hydrogen).

Another role of the inlet gas stream to the cathode may be to force water out of the cathode. This prevents the cathode from flooding with water, which may hinder reaction at catalytic sites. The water may be gas or liquid (e.g., water droplets). Some or all the water may originate on the anode side of an MEA. Water may be generated from some carbon oxide reduction reactions. The inlet gas may carry water with it to the cathode outlet. The carried water may be in gas and/or liquid (e.g., mist or droplets) phase. The inlet gas stream may also apply pressure to the cathode side of the MEA, thereby causing permeation of water through the MEA, toward the anode, and/or resisting transport of water across the MEA, from the anode to the cathode.

In certain embodiments, the inlet gas stream may carry moisture (through humidified inlet gas) that delivers water to at least portions of the cathode of the MEA. The moisture in the inlet gas may preferentially moisturize a portion of the MEA that is susceptible to drying, e.g., the portion of the MEA closest to the gas inlet. The moisture may also act as a proton source for certain carbon oxide reduction reactions.

Molar Flow Rate

Together with the current, the molar flow rate of reactant gas may set the carbon oxide reduction reaction rate. In some embodiments, the molar flow rate of inlet carbon oxide may be set by the current at the cathode and/or the efficiency of the carbon oxide reduction reaction. Note that carbon oxide reduction cells often operate at less than 100% electrochemical conversion efficiency. Thus, in some embodiments, the molar flow rate of carbon oxide to the cathode is greater than required for a theoretical complete conversion of the input carbon oxide to the desired reduction product(s). Further, even if all incoming carbon oxide could be electrochemically reduced, excess gas may be required to serve one or more other purposes such as flushing water or reaction products out of the cathode. In other words, the incoming carbon oxide stream may require excess carbon oxide over what is required for complete stoichiometric conversion. Even if a carbon oxide reduction reaction is 100% efficient, the system cannot have vanishing small amounts of input gas reactant, as some gas is needed to push out water and/or certain reaction products from the cathode.

If the molar flow rate is so great that much of the inlet carbon oxide goes unreacted, the output stream of the cathode may have a relatively low concentration of the reduction product (e.g., a relatively low concentration of carbon monoxide in carbon dioxide, for example about 30% molar or lower). In some contexts, this can require extensive and/or costly purification of the reduction product.

One way to relate molar flow rate to electrical current is via a parameter referred to herein as "stoichiometric value" along with a corresponding flow rate. The molar flow rate of carbon oxide in the input stream may be defined in terms of flow rate per unit of reaction expected for a given current. Herein, the term "stoichiometric" value refers to a fraction or multiple of the flow rate of reactant carbon oxide required to fully utilize all current at the cathode, assuming a reduction reaction of carbon oxide is 100% efficient at the cathode to a given reaction. A flow rate of carbon oxide having a stoichiometric value of "1" is the flow rate required to consume all electrons provided at the cathode, and no more than that, in the given reduction reaction at the cathode. The stoichiometric value represents the amount of excess (or shortfall) reactant that is present beyond (or below) what could be theoretically reacted if the current efficiency for a given reaction were 100%. It is a dimensionless number or fraction.

For the carbon dioxide reduction reaction that produces carbon monoxide in an acidic environment ($CO_2+2H^++2e^-\rightarrow CO+H_2O$), a carbon dioxide flow rate with a stoichiometric value of 1 provides one mole of carbon dioxide for every two moles of electrons provided by the cell. Stated another way, a cell having a current providing 2 moles of electrons/second and a carbon dioxide flow rate providing 1 mole of carbon dioxide molecules/second would have a stoichiometric value of 1. For the same current and a flow rate of 0.5 carbon dioxide moles/second, the cell would have a stoichiometric value of 0.5. And, again for the same current but with a flow rate of 1.5 carbon dioxide moles/second, the cell would have a stoichiometric value of 1.5. The molar or volumetric flow rate needed to achieve a stoichiometric value of 1 can be calculated as:

Stoichiometric value of 1—Flow Rate (sccm)=[60 (s/min) *Molar gas volume at STP (mL/mol)]/[Faraday's constant (C/mol e-)*#e-'s/mole $CO_2$]*Amps of current fed to the electrolyzer. If an electrolyzer system comprises a stack of two or more cells in series, flow rate is multiplied by the number of cells in the stack.

In an example, a 100 cm$^2$ electrolyzer with a current density of 500 mA/cm$^2$ performing the electrochemical reduction of $CO_2$ to CO has a total current of 50 A and the reaction requires 2 moles of e-/mole CO produced, so the stoichiometric flow rate having a stoichiometric value of 1 is:

[60*22,413]/[9,6485*2]*50=348.4 sccm

In this example a flow rate producing a stoichiometric value of 0.5 would be:

0.5*348.4=174.2 sccm

And a flow rate producing stoichiometric value of 2 is:

2*348.4=696.8 sccm

In another example of a cell producing ethylene from carbon dioxide, 12 moles of electrons are needed to reduce 2 moles of carbon dioxide to 1 mole of ethylene. The stoichiometric flow rate for producing a stoichiometric value of 1 for a 3 cell 1500 cm2 electrolyzer with a current density of 300 mA/cm2 is:

[60*22,413]/[96,485*6]*1350=3,136 sccm

In certain embodiments, the stoichiometric value is at least about 1. In certain embodiments, the stoichiometric value is between about 1 and 400. In certain embodiments, the stoichiometric value is between about 1 and 20. Certain ranges of stoichiometric value are disclosed elsewhere herein for particular operating regimes (e.g., high ratios of $CO:CO_2$ in an output stream).

As an example, for reactions that produce CO from $CO_2$, the stoichiometric value may be about 1 to 30. As another example, for reactions that produce ethylene or other C2 product in a bipolar MEA configuration, the stoichiometric value may be about 1 to 180. As another example, for reactions that produce ethylene or other C2 product in an AEM-only MEA configuration, the stoichiometric value may be about 1 to 90. As another example, for reactions that produce methane, the stoichiometric value may be about 1 to 230.

Volumetric Flow Rate and Flow Velocity

The volumetric flow rate and the corresponding flow velocity of the input gas are related to the molar flow rate of the reactant gas, but they may be set independently. Further, different criteria may apply for setting a volumetric flow rate and corresponding velocity. Considerations for determining the volumetric flow rate and flow velocity may include not only the molar flow rate of reactant gas, but the gas pressure and the composition of the input gas stream. The volume occupied by a given mass of the input gas decreases with increasing pressure. Therefore, for a fixed molar flow rate, the volumetric flow rate, which is proportional to velocity for a given cross section, decreases with increasing pressure. Further when a reactant gas is diluted with a non-reactant gas, the volumetric flow rate is determined not only by the molar flow rate of the reactant gas and the pressure of the input gas stream, but by the flow rate of non-reactant gases in the inlet stream.

The volumetric flow rate and flow velocity of the input gas stream can affect the rate of removal of water and/or reaction products from the cathode. Greater velocities remove more water and/or reaction products from the cathode. These materials may be in gas or liquid form. The input gas stream picks up and carries the materials, in either phase, from the cathode and pushes them toward exhaust through, e.g., a flow field. For example, the gas stream may push liquid water (droplets) through flow channels. Note that water in the cathode may arrive via passage of anode water from the anode.

Water that moves from the anode to cathode in an MEA-based carbon oxide reduction electrolyzer can contain valuable components such as salts introduced to the cell. Therefore, in certain embodiments, an electrolyzer system is configured to recycle water from the gas leaving the cathode back to the anode. In certain embodiments, the water removed from the cathode by the gas stream has one or more liquid phase reduction reaction products (e.g., formate or ethanol). In certain embodiments water recovered from the cathode gas stream is treated to remove reduction reaction products. Such treatment may be performed prior to reintroduction to the anode. In certain embodiments, the water removed from the cathode by the gas stream has salt ions. In some cases, the concentration of salt ions removed at the cathode by the gas stream is different from the concentration of salt ions in the anode water. In certain embodiments, prior to reintroduction to the anode, water recovered from the cathode gas stream is treated to adjust its salt concentration.

In certain embodiments, the volumetric flow rate of carbon oxide is about 1.4E-6 to 1.66E-4 liters/(second per cm2. of MEA cathode active surface area). In some cases, the volumetric flow rate of carbon oxide is about 1.4E-6 to 5.53E-5 liters/(second per cm2. of MEA cathode active surface area). In certain embodiments, the velocity of carbon oxide is about over the cathode active surface area is about 0.2 to 4 m/s.

In certain embodiments employing AEM only MEAs used to produce hydrocarbons such as CH4, C2H4, ethanol, etc., there is minimal water recovered at the cathode because water moves from the cathode to the anode side in AEM only MEAs. Therefore, in such embodiments, lower volumetric input gas flow rates, and corresponding gas velocities, may be employed.

Gas Pressure at the Inlet to the Cell, Cathode Side

The pressure of the inlet gas stream may be set or adjusted based on various considerations. Some considerations suggest a relatively high pressure. For example, a relatively high pressure inlet gas stream may provide a relatively high molar flow rate and permit a relatively high reaction rate at the cathode. Stated another way, a relatively high pressure inlet gas may increase electrolyzer performance by providing a relatively high delivery rate of carbon oxide reactant to the catalyst. As noted, practical considerations may require excess carbon oxide over what is required for full stoichiometric conversion, even for 100% efficient reactions.

In some implementations, a relatively high pressure gas stream may increase the ability to remove water from the cathode. Pressurized carbon oxide on the cathode may push water toward the anode of the MEA, via permeation, particularly if the anode water pressure is lower than the gas stream pressure at the cathode.

However, pressurizing the inlet carbon oxide gas stream increases the gas density, and thereby lowers the volumetric flow rate and velocity for a given molar flow rate. Water removal is dependent on flow velocity. Increasing pressure reduces the amount of volumetric flow and thereby reduces how much water can be removed. By compressing the inlet gas stream, the system may remove less water from the cathode.

Additionally, the gas stream flushes product from the cathode. A reduced volumetric gas flow rate may flush out less product, which can shift the reaction equilibrium toward the reactants.

Still further, if the pressure of the gas stream is too high, the differential gas pressure, between the cell cathode's inlet and outlet, may be insufficient to push water droplets out of the cell's flow field.

In certain embodiments, to increase or maintain a relatively high volumetric flow at high inlet gas pressures, the feed gas may be diluted. For example, the inlet gas may be provided with a molar flow rate of carbon oxide sufficient to support a desired reaction rate, and the inlet gas may have a diluent that maintains a relatively high overall volumetric flow rate and corresponding flow velocity.

In some embodiments, a relatively high gas outlet gas pressure (dictated by the inlet gas pressure and the pressure drop through the electrolyzer) provides gaseous electrolyzer products at a pressure suitable for downstream processing (e.g., high pressure gaseous reactants to a Fisher Tropsch reactor).

The gas pressure may be limited by structural or mechanical constraints imposed by the electrolyzer cell. For example, in certain embodiments employing a bipolar MEA (e.g., with a Nafion layer), the gas pressure is limited to about 100 psig or less. In certain embodiments employing an AEM only MEA, the gas pressure is limited to about 20 psig or less due to the limited mechanical stability of the anion exchange membrane.

The gas pressure may be limited by a physical property of one or more component of the inlet gas stream. For example, carbon dioxide liquifies at ~800 psi at room temperature. In certain embodiments, the pressure of the gas stream is maintained below a point at which the carbon oxide and/or any other component condenses or deposits as a solid.

In some implementations, the gas pressure on the cathode side of a cell balances against water pressure on the anode side or the cell. As the cathode gas stream pressure increases, more gases normally on the cathode side (e.g., $CO_2$, CO, and/or H2) may pass to the anode side of the cell. This can introduce a dangerous process condition. For example, CO and/or H2 mixing with 02 can produce a flammable mixture. Note that any polymer such as a polymer electrolyte membrane in an MEA may have some permeability to a gas such as $CO_2$, CO, and $H_2$.

In certain embodiments, the pressure of the gas stream at the inlet to the cathode side of the cell is about 10 to 400 psig. In certain embodiments, the pressure of the gas stream at the inlet to the cathode side of the cell is about 25 to 400 psig. As an example, the pressure of the gas stream at the inlet of the cathode is about 100 psig. As another example, the pressure of the gas stream at the inlet of the cathode is about 10 to 20 psig. Note that the inlet gas pressure is measured at the inlet to a cell stack, i.e., upstream from a gas diffusion layer and flow field. Note that, in some implementations, there may be a significant pressure drop (e.g., about 0.5 to 15 psi in serpentine pattern flow fields) from the cell stack inlet to the MEA. Note also that the listed pressures may be particularly appropriate for a bipolar MEA.

In certain embodiments, the pressure of the gas stream at the inlet to the cathode side of the AEM-only cell is about 0 to 100 psig. In certain embodiments, the pressure of the gas stream at the inlet to the cathode side of the AEM-only cell is about 0 to 20 psig due to the low mechanical stability of AEMs.

Pressure Drop Across the Cathode Side of the Cell (Inlet P-Outlet P).

Gaseous reaction products come out of the cell at a pressure that is different from the inlet pressure of the gas stream. The outlet pressure is given by the inlet pressure minus a pressure drop caused by the gas flowing through the cathode side of the cell. The pressure drop across the cell depends on various parameters including, e.g., the flow field configuration, gas flow rate, the reduction product produced, the presence of water or precipitates in the flow field, GDL types, flow transition elements (e.g., manifolds) to the flow fields, and the gas tubing diameter. In various embodiments, the flow rate is set first, and the desired pressure drop (for the set flow rate) is tuned (using the design of the flow field).

In certain embodiments, the pressure drop of the gas stream flowing through an electrolyzer cathode is about 0.5 to 20 psi. In certain embodiments, the pressure drop of the gas stream flowing through an electrolyzer cell is about 2 to 7 psi. The pressure drop is measured between the cathode inlet tubing and the cathode outlet tubing of the electrolyzer. These pressure drop values may be appropriate for various reduction reactions, including those that produce carbon monoxide, those that produce methane, and/or those that produce ethylene. A higher pressure drop may be desirable in cases in which a low flow rate is necessary.

Composition at Inlet—Reactant (Carbon Oxide), Water (Optional), Inert Gas (Optional)

As explained, the molar flow rate of carbon oxide reactant may be determined, at least in part, by the electrical current delivered to the cell, and the flow may be characterized by a parameter referred to as the "stoichiometric" flow rate.

A process may employ a large excess of reactant, but at some point, unreacted reactant in the product stream becomes a processing burden. For example, a large amount of unreacted carbon dioxide in a carbon monoxide product stream can introduce significant separation costs. For many applications, the carbon monoxide must be purified. And for gas streams having carbon monoxide concentrations below about 30% molar, the separation effort may increase significantly.

The degree of humidification of the inlet gas stream may be adjusted for requirements of the electrolyzer. In general, a humidified carbon oxide inlet gas stream will remove less water from the cathode than a dry inlet gas stream, and it is frequently desirable to remove significant quantities of water via the cathode gas stream. However, in some electrolyzers, a humidified input gas stream provides relatively even hydration of an MEA across the electrode area. In certain embodiments, a humidified inlet gas stream is employed in electrolyzers employing AEM-only MEAs, as the cathodes in such MEAs tend to be relatively dry. It has also been observed that humidification can impact reduction reaction selectivity.

In various MEA implementations, water moves from anode to cathode in bipolar membrane system. As an example, about 2 to 5 E-8 moles of water per mA/cm2 moved per second. In some implementations, 2 to 4 water molecules move toward the cathode for each proton that moves from the anode to the cathode. In some implementations, at least some of this water is separated from the outlet gas stream and recycled to the anode.

In certain embodiments, a carbon dioxide gas stream includes one or more additives, intentionally or unintentionally added. As examples, carbon dioxide feed gas may be mixed with carbon monoxide or an inert gas (e.g., nitrogen) or impurities. In some combustion processes, waste carbon dioxide contains nitrogen, oxygen, carbon monoxide, nitrogen oxide(s), sulfur oxide(s), etc.

In certain embodiments, the inlet carbon dioxide concentration is at least about 20 mole percent, or at least about 40 mole percent, or at least about 75 mole percent, or at least about 90 mole percent. In certain embodiments, carbon dioxide provided to a carbon dioxide reduction reactor has a concentration of about 40 to 60 mole percent.

Water Management

Introduction

In various embodiments, water is supplied to the anode of an electrolytic carbon oxide reduction cell. In some implementations, during operation of the cell, water constantly flows past the anode. In some cases, some water is removed from the cathode. The term "anode water" refers to the water at the inlet to an anode in an electrolytic carbon oxide reduction cell.

Among the parameters that may characterize water in an electrolytic carbon oxide reduction cell are the composition of water delivered to the anode, the composition of water present at (or recovered from) the cathode, the mass flow rate of water to anode, the mass flow rate of water recovered from the cathode, the pressure of the water at the inlet to the anode, the respective temperatures of the water at the inlet and outlet of the anode, and pressure drop of the water as it flows through the cell.

Roles of Water Flowing to or through the Electrolytic Cell

The water in the cell may serve any one or more of various purposes. For example, it may serve as a reactant that is oxidized at the anode. In some cases, water serves as a transport medium for insoluble or soluble reaction products such as hydrogen ions, hydroxide ions, and/or bicarbonate ions. In some cases, water serves as a flushing agent for removing anode reaction products. In some embodiments, water controls the temperature of one or more components in an electrolyzer. In certain embodiments, water serves as a conductivity or activity enhancing agent for MEA components such as one or more of the individual ion conducting polymer layers of an MEA.

As a reactant at the anode, water is oxidized and provides electrons to the anode. In some embodiments, the anode half reaction is given by:

$$2H_2O \rightarrow 4H^+ + O_2 + 4e^-$$

Flowing anode water may provide a medium for sweeping out anode oxidation products such as oxygen. As an example, flowing water may remove oxygen bubbles from the anode side of an operating electrolyzer.

Anode water may be provided under conditions that deliver water to the cathode, across the MEA by, e.g., diffusion, electroosmosis, and/or permeation. Water finding its way to the cathode may hydrate $CO_2$ feedstock and/or the cathode. The hydrated cathode may have enhanced activity and/or conductivity compared to a dry cathode.

Water may heat or cool an electrolytic cell. In certain embodiments, a system including the electrolyzer contains a heater and/or cooler configured to heat or cool water upstream from the anode.

The pressure of water at the anode may balance against inlet gas pressure exerted on cathode side of the MEA. This pressure applied by the anode water may protect against damage that would otherwise be caused to the MEA or other cell components as a result of uncompensated gas pressure on the cathode side of the cell. The anode water pressure may also provide a driving force for species transport across the MEA, from the anode, and/or counterbalance a driving force for species transport from the cathode to the anode.

The anode water may serve as a source of other species needed by the electrolyzer. Examples of such other species include salts and other additives utilized by the MEA to facilitate electrolysis.

Water Flow Rate

In certain embodiments, the flow rate of water to the anode is determined, at least in part, by the reaction rate at the anode, which is in turn determined, at least in part, by the current at the anode. The molar flow rate of water determines how much reactant is provided to the anode, and perhaps more importantly how much reduction product may be produced at the cathode. In certain embodiments, the molar flow rate is at least as great as the theoretical amount of water required to support a rate of reaction (oxidation of water to oxygen and hydrogen ions) that is dictated by the current at the anode (which is dictated by the current at the cathode).

In many embodiments, the reaction rate of water at the anode is not a significant consideration in setting the flow rate of water to the anode. Other factors that may influence the flow rate of water to the anode include removal of oxygen (e.g., gaseous and/or dissolved oxygen) from the anode, controlling the temperature of the MEA and/or the cell stack as a whole, and/or delivery of salt or other additive to the anode water.

In certain embodiments, the volumetric flow rate (and associated velocity) is at least high enough to ensure that oxygen gas and/or other products produced at the anode are swept away. Generally, the molar flow rate is proportional to the volumetric flow rate because water is essentially incompressible under normal operating conditions.

In certain embodiments, the volumetric flow rate of anode water is about 0.2 to 60 milliliters/(minute per $cm^2$ of MEA anode active surface area). In some cases, the volumetric flow rate of anode water is about 1.2 to 4.8 liters/(second per $cm^2$ of MEA anode active surface area).

Water Pressure (Inlet)

In certain embodiments, pressure is set at the inlet and/or the outlet on the flow field. The pressure at the inlet to the anode flow field may be set based on a desired flow rate of water and/or a desired pressure at the anode. In various embodiments, the flow rate is set first, and the desired pressure drop (for the set flow rate) is tuned (using the design of the flow field). For a given flow rate, the pressure drop is set by the flow field configuration. In some cases, the inlet pressure of water counterbalances high pressure inlet gas on the cathode side. This may protect the MEA from damage and/or influence permeation rate of one or more species across the MEA.

In certain embodiments, the pressure of the water at the inlet to the anode side of an MEA cell is about 0.5 to 20 psig. In some embodiments, the water pressure at the anode inlet is about 10 psig. In some embodiments employing AEM only MEAs, the water pressure at the inlet to anode is about 0 to 5 psig.

Water Pressure Drop across the MEA

In some embodiments, the pressure different between the anode and cathode sides of an MEA is a controlled parameter. In some implementations, the cell may be operated to balance water pressure on the anode against gas pressure on the cathode. In some cases, a pressure gradient is maintained that provides a higher pressure on the cathode than the anode. However, if pressure gradient is opposite (anode higher), the pressure difference across the MEA may drive some permeation through the membrane. In certain embodiments, to reduce flooding at the cathode, the pressure gradient is purposely maintained higher on the cathode side (to push the water back to the anode side). This may be effective at managing the water on the cathode side; e.g., water is driven away from the cathode so that catalytic sites remain available for reacting the carbon oxide reactant. But if the carbon dioxide feedstock becomes too dry, the pressure gradient can be driven in the opposite direction (anode to cathode).

In certain embodiments, the pressure difference across the MEA (the cathode side pressure minus the anode side pressure), is about 5 to 400 psig. In certain embodiments, the pressure difference across the MEA (the cathode side pressure minus the anode side pressure), is about 70 to 400 psig.

Composition of Anode Water

Any of various factors may be relevant to the anode water composition. In some embodiments, the anode water is maintained at specified purity, particularly with respect to certain ions. In some embodiments, the anode water has a very low concentration of impurities such as iron and possibly other ions that can poison a carbon oxide reduction catalyst in the cathode.

In certain embodiments, the anode water includes one or more salts or ions. The anode water composition may be controlled to maintain such salts or ions within particular concentration ranges.

In certain embodiments, the anode water comprises a salt or salt ion having a concentration of at least about 10 µM. In some implementations, the salt ions comprise alkali metal ions. In some implementations, the salt ions comprise phosphate ions, sulfate ions, carbonate ions, bicarbonate ions, hydroxide ions, or any combination thereof.

As an example, the anode water is used with a bipolar MEA having a reduction catalyst comprising copper, and the salt comprises (i) an alkali metal cation, and (ii) a bicarbonate, a sulfate, or a hydroxide anion. In this example, the salt may present at a concentration of about 1 mM to about 1M, or about 1 mM to about 50 mM. In some cases, the MEA is configured to produce methane by reducing carbon dioxide and/or carbon monoxide at the cathode, and the salt ions include sodium ions. In some cases, the MEA is configured to produce an organic compound having two or more carbon atoms at the cathode, and the salt ions include ions of potassium, cesium, rubidium, or any combination thereof.

As an example, the anode water is used with a bipolar MEA having a reduction catalyst comprising gold, and the salt comprises (i) an alkali metal cation and (ii) a bicarbonate, hydroxide, or sulfate anion. In this example, the salt may present at a concentration of about 10 uM to about 200 mM, or about 100 uM to about 20 mM.

As an example, the anode water is used with a bipolar MEA in which all polymers in the MEA are anion conducting polymers, and the carbon oxide reduction catalyst comprises copper. In this example, the salt may comprise (i) an alkali metal cation and (ii) a bicarbonate or hydroxide anion. The salt may be present at a concentration of about 10 mM to about 15M, or about 50 mM to about 1M. In some cases, the MEA is configured to produce methane by reducing carbon dioxide and/or carbon monoxide at the cathode, and the salt ions comprise sodium ions. In some cases, the MEA is configured to produce an organic compound having two or more carbon atoms by reducing carbon dioxide and/or carbon monoxide at the cathode, and the salt ions comprise ions potassium, cesium, rubidium, or any combination thereof.

Examples of salts and salt delivery control methods and apparatus are described in PCT Patent Application Publication No. 2020/112919, published Jun. 4, 2020, and titled "ELECTROLYZER AND METHOD OF USE," which is incorporated herein by reference in its entirety.

Temperature

In some embodiments, a carbon oxide electrolyzer is operated within a specified temperature range, which may facilitate certain operations. In some embodiments, a carbon oxide electrolyzer generates heat during operation. This may be due to relatively high overpotentials. In some embodiments, a carbon oxide electrolyzer is heated by flowing heated anode water to the anode. In some embodiments, a carbon oxide electrolyzer is heated by heat from end plates on the cell stack. In some embodiments, a carbon oxide electrolyzer is cooled during operation. In some implementations, the cell employs air cooling to maintain temperature within a specified range. Some air cooled electrolyzers have about 50 or fewer carbon oxide reduction cells in a stack. In some implementations, the cell employs water cooling to maintain temperature within a specified range. Some water cooled electrolyzers have about 50 or more carbon oxide reduction cells in a stack.

Any one or more of various physical effects within a carbon oxide electrolyzer may vary as the temperature increases. An increase in temperature may result in a decrease gas solubility; this can decrease the rate or proportion of incoming carbon oxide that reaches the catalyst. Increasing temperature in the electrolyzer may increase the conductivity of polymer electrolyte. Increasing temperature in the electrolyzer may increase mass transport such as by increasing diffusion of species in water and/or in ion conductive polymers of the MEA and/or increasing flow of water or other gas species by permeation through the MEA. Increasing temperature in the electrolyzer may increase reaction rates at the cathode. These may include one or both of a carbon oxide reduction reaction and a hydrogen gas evolution reaction. Increasing temperature in the electrolyzer may increase degradation rates of the MEA materials, including, for example, the catalyst and/or the polymer electrolyte. Increasing temperature in the electrolyzer may increase vapor phase concentration of water in the gas stream exiting the cathode. Any one or more of these temperature effects may be enhanced or controlled by maintaining the cell operating temperature above or below a threshold or within a particular range.

For comparison, in aqueous carbon oxide reduction systems, the desired temperature of the reaction is often relatively low, e.g., below 20° C. For polymer based MEA carbon oxide reduction systems, the desired temperature may be relatively high, e.g., above about 20° C.

In certain embodiments, the temperature of a bipolar MEA in an operating cell is about 20 to 90° C. In certain embodiments, the temperature of a bipolar MEA in an operating cell is about 30 to 80° C.

In some embodiments, the temperature of bipolar MEA in an operating cell is about 45° C. or higher. In some embodiments, the temperature of bipolar MEA in an operating cell is about 70° C. or higher and the cell employs a relatively modest cooling system, e.g., one employing an air-cooled system.

In certain embodiments, the temperature of an AEM only MEA in an operating cell is about 20 to 45° C. In certain embodiments, the temperature of an AEM only MEA in an operating cell is about 25 to 35° C.

The optimal operating temperature may be limited by the thermal stability of the cell components.

Electrical Conditions

In some implementations, a carbon oxide electrolysis system employs a power supply configured to provide a constant current and/or a constant voltage to a carbon oxide reduction cell. Constant current operation may provide a generally constant rate of products produced at the cathode and the anode. Under some operating conditions, a constant voltage operation may produce a variable amount of product because the current density can change while maintaining a constant voltage. In some implementations, cathode reduction product selectivity may be tuned by varying cell voltage.

In certain embodiments, a constant or nominal current density at the cathode of a single electrolyzer cell is about 10 to 2000 mA/cm2. In certain embodiments, a constant current density at the cathode of a single electrolyzer cell is about 20 to 600 mA/cm2. In these ranges, the current density is defined for a geometrically smooth cathode active surface that does not account for pores or other surface texture.

In some cases, the current density may affect the selectivity of generated products. Some products may not be generated at low current densities and low cell voltages, and so a higher or lower current density may be chosen to favor or disfavor certain products. For example, a current density above about 200 mA/cm2 may promote formation of methane and/or ethylene (over carbon monoxide) in the bipolar MEA configuration, or ethylene in the AEM-only configuration. In some implementations, selectivity for methane and/or ethylene is promoted (e.g., a majority product) at about 270 to 330 mA/cm2 or about 300 mA/cm2. Below about 200 mA/cm2, CO and H2 may be the major products.

In some implementations, a power supply for a carbon oxide electrolyzer is configured to adjust current by stepping the cell current up and/or down, ramping the current to a cell up and/or down, and/or pulsing the current to a cell. In some implementations, a power supply for a carbon oxide electrolyzer is configured to adjust voltage by stepping the cell voltage up and/or down, ramping the cell voltage up and/or down, and/or pulsing the cell voltage.

In certain embodiments, the electrolyzer controller is configured to temporarily apply a positive current (i.e., temporarily run the cathode as an anode and vice versa). This may deplate (or otherwise oxidize away) impurities such as transition metals that might plate onto the cathode during operation. As an example, such impurities may originate in the anode water. Reversing the current may remove carbon oxide reduction product intermediates that may foul a cathode catalyst.

PCT Patent Application No. PCT/US2019/067169, filed Dec. 18, 2019, and titled "ELECTROLYZER AND METHOD OF USE," describes embodiments involving controlling the electrical conditions of a carbon oxide electrolysis cell and is incorporated herein by reference in its entirety.

Startup Conditions and Break in Procedures

A carbon oxide reduction electrolyzer may be subject to one or more start up conditions that are different from normal operating conditions. For example, an electrolyzer may be heated during start up. As another example, an electrolyzer may be subject to a reverse pressure gradient across the MEA (anode to cathode) compared to normal operating conditions.

In certain embodiments, an electrolyzer start up process includes first heating the electrolyzer to an elevated temperature such as the electrolyzer operating temperature (see e.g., the above temperature ranges) without applying electrical energy to drive the reduction reaction followed by application of the operating electrical energy.

In some embodiments, a carbon electrolysis cell is subject to a break in procedure before full operation. Such break in procedure may involve controlling electrical energy to the cell, controlling delivery of carbon oxide feedstock to the cell, and/or other operating parameters of the cell.

Electrical Pulsing

Context and Stages of Operation

In some embodiments, the current applied to the MEA has a non-constant profile. The current profile can differ according to the operating mode, as described further below. Operating modes may include hydration (pre-break-in), break-in, normal operation, planned shut off, extended shut off or storage, or any combination thereof. Other cell operation parameters that may be adjusted during these operating modes—sometimes related to adjustments in the current—include (a) cathode gas composition, flow rate, and pressure, (b) anode water composition and flow rate, (c) temperature, or (d) any combination thereof. In some embodiments, voltage is controlled.

Applied current may be paused or pulsed during operation of the cell. Current pausing may also be referred to as off/on cycling, with the current turned off and then on one or more times. In some embodiments, the applied current is reduced to zero (i.e., turned off) during a current pause. In some embodiments, a current pause reduces the current to a non-zero level.

In some embodiments, before applying any current to the cell, the MEA goes through a hydration step. This may involve starting the reactant flows and optionally heating the cell (or stack) so that steady state can be reached before applying current. In some implementations, prior to assembling the stack or cell, the MEAs are soaked in water to begin hydrating the MEA. After assembly, the anode water and cathode $CO_2$ flows and pressures are set. Flowing dry or humidified $CO_2$ may be beneficial in this step, even if dry $CO_2$ is used as an input during longer term operation. The anode outlet may be observed to confirm that there are no bubbles exiting the outlet. If there are, it indicates significant $CO_2$ crossover (from a pinhole in the membrane) or a leak in the hardware. If the desired operating temperature is higher than ambient, then the cell may be heated to the desired temperature after starting the anode water flow. During this step, the MEA continues to hydrate at the desired temperature.

The break-in period refers to procedures applied to a MEA or stack for the first time until the operating conditions and performance match the desired, long-term setup. In some embodiments, the first time an MEA is used, a procedure that differs from typical operation may be employed. An MEA that has not been operated before may not be fully hydrated or changes in the structure may occur due to the temperature increase during operation. In some embodiments, the current is ramped up from a lower value to a higher value in a series of steps instead of jumping straight to the desired operational value. A gradual, linear ramp-up may also be used. Examples of current profiles are shown in FIG. 1A. The number of intermediate steps in a multi-step ramp up may be 1, 2, 3, 4, 5, or 6, for example. The duration at each step may be the same or differ.

In embodiments in which the operating temperature is reached before break-in (e.g., during a hydration period), the temperature may be held constant at this temperature. In other embodiments, the temperature may be ramped up during the break-in procedure.

Cycling the stack off and on during normal operation may be useful to maintain performance over extended periods of time. Examples of performance enhancement include increasing the current efficiency of the electrolyzer, increasing the voltage efficiency of the electrolyzer, providing a single pass conversion (less frequent pulsing increases the electrolyzer's overall conversion/utilization), increasing the lifetime of the electrolyzer's MEA, increasing the lifetime of other cell components such as the (gas diffusion layer GDL), and increasing selectivity for certain reactions.

In some embodiments, a current profile or current pause schedule is such that, the current-on period is significantly greater than the pauses periods. FIG. 1A shows a schematic example of a current pause schedule, which may also be referred to as a current profile. Current density is shown on the y-axis and time on the x-axis. In some embodiments, the current pause period durations are significantly less than the current-on periods for high throughput. For example, the current-on periods may be at least 3 times, 5 times, 10 times, 20 times, 50 times, 100 times, or 500 times greater than the current pause periods.

In the example of FIG. 1A, the current pause schedule is constant for the duration of normal operation. In other embodiments, the intervals and/or pause durations may change over the course of operation. For example, current pauses may be programmed to be more frequent at an advanced operation stage.

Figure 1B:
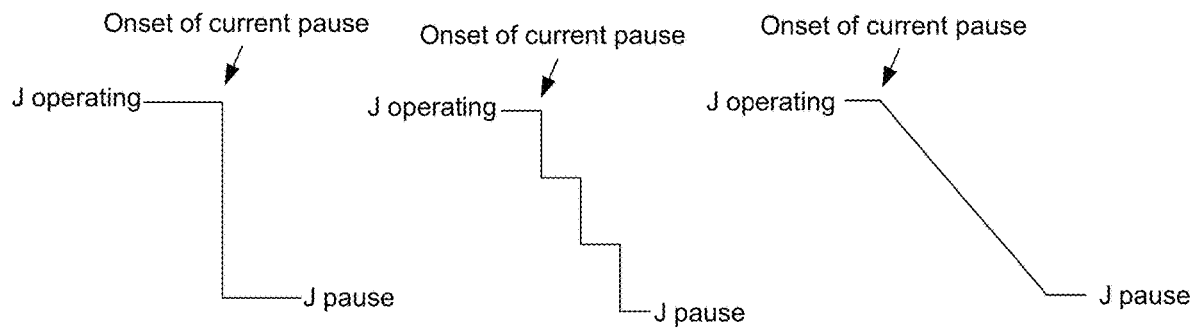
FIG. 1B shows schematic examples of current profiles in reducing current from an operating current density to the pause current density at the onset of a current pause period according to various embodiments of the disclosure.
Figure 1C:
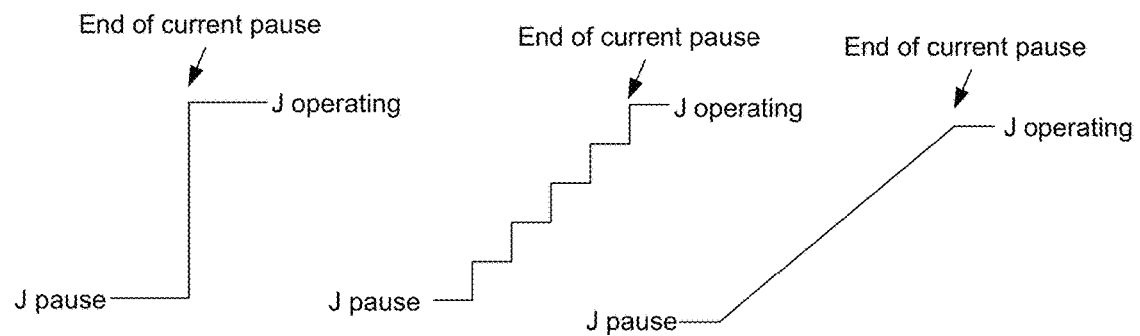
FIG. 1C shows schematic examples of current profiles returning to the operating current density at the end of a current pause period according to various embodiments of the disclosure.

In the example of FIG. 1A, single steps are used to reduce the current density at the onset of the pause period and to return to the operating density at the end of the pause period. As with increasing or reducing current in other operational modes described herein, the current may be ramped in multiple steps or continuously at the onset and/or end of a current pause period. FIG. 1B shows schematic examples of reducing current from the operating current density to the pause current density at the onset of a current pause period. Similarly, FIG. 1C shows schematic examples of returning to the operating current density at the end of a current pause period. The current profile at the onset may be chosen independently of that at the end of a pause period. For example, the current may be reduced in a single step and increased in multiple steps.

During current pauses, the cell voltage may be held at any of various values. In some cases, during a current pause, the anode and cathode are shorted (e.g., through the power supply or by connecting the electrodes with metal or other conductor) in which case the cell voltage is at or near 0 volts. In some cases, during a current pause, the anode and cathode are allowed to float and the cell's voltage is its open circuit voltage under the prevailing conditions, e.g., between 0.8V-1.4V, 0.8V-1.2V, or 0.9V-1.1V. According to various embodiments, the flow to the cathode and/or anode may be stopped or allowed to continue during a current pause.

From time to time, depending on the use of the $CO_x$ electrolysis system, planned shutoffs may be performed in which the system is shut off for a brief period and then turned back on. Examples of reasons for planned shutoffs include maintenance of some part of the system (e.g., changing filters on anode water recycle loop, replacing a flow controller, or testing a temperature sensor), a planned power outage, and a pause in a downstream process using products of $CO_x$ reduction. Planned shutoffs may have relatively short shutoff periods lasting from, e.g., a few minutes to a few days.

At times it may be desirable for the system or stack to be shut off for an extended period. For example, a holiday shut down of the facility, movement of the system to a new facility, or interruption in $CO_x$ supply. During this time, it is expected that the system could be completely disconnected from external inputs. Gases or aqueous solutions different than those used during normal operation could be sealed into the anode or cathode in this case. The start-up procedure after the extended shutoff or storage period can be the same as the break-in procedure described above.

Mechanisms Triggered by Pulsing

Electrical pulsing may impact a carbon oxide reduction electrolyzer by one or more mechanisms. While not wishing to be bound by theory, one such mechanism may involve relaxing electrode internal stress caused by strong polarization. This may be accomplished by relaxing the charging overpotential of carbon materials within the cathode, which is caused by strong polarization. Porous carbon cathode support materials may produce high capacitance, electrochemical double layers at the carbon-electrolyzer interface (effectively forming a supercapacitor). Over time, constant charging may continually increase the overpotential to charge our electrode. The resulting electric field may affect the restructuring of the surface and may also affect the charging of the carbon (or other) materials on the electrode. Pulsing or pausing may release some of the charge on the electrode interface.

Electrical pulsing may also pause mass transfer, change the electrode surface environment by changing adsorption/desorption at a different voltage, and/or deplete impurities from electrodes. Such impurities may otherwise adsorb on electrodes and degrade performance. Examples of such impurities include main or side reaction intermediates, and impurities from cell hardware or reactants (i.e. water, $CO_2$). Electrical pulsing may modify the cathode by reconstructing the catalyst surface morphology and/or rearranging catalyst sites to more favorable orientations for carbon oxide reduction.

Additionally, electrical pulsing can impact the quantity of water at the cathode. Electrical pulsing may decrease the amount of water transported from the anode (e.g., at relatively low current density), while the water removal rate at the cathode may be unchanged due to the same gas flow rate, thereby improving carbon oxide mass transfer.

Parameter Values

For context and in accordance with some embodiments, normal operation of a carbon oxide reduction cell may be performed at a voltage of about 0 to 10V (electrolytic), and/or at a cathode current density of about 0 to 2000 $mA/cm^2$ (electrolytic). A cell may have normal open circuit voltage (resting voltage) in the range of about 0 to 2.5V. Note that unless otherwise specified herein, all current and voltages having positive values are provided for an electrolytic cell (i.e., cathodic current flows at the positive electrode, which is where carbon oxide is reduced).

The following parameters may characterize electrical pulsing. Unless otherwise specified, the parameters may be implemented by controlling current and/or voltage. Note that if the electrolyzer operates under current control, applied current pulses will have corresponding voltage pulses, which may have different profiles than the current pulses. Similarly, if the electrolyzer operates under voltage control, applied voltage pulses may have corresponding, but different, current pulses.

Magnitude and duration of pulses or pauses Current pulsing may be performed using a current density cycle where a high current density is about 100 to 2000 $mA/cm^2$ or about 200 to 600 $mA/cm^2$. A high current density state may be held for about 30 minutes to 1000 minutes, with each such state separated by a reduction in current or a pause. According to various embodiments, the current is paused at relatively frequent intervals (e.g., less than about 10 hours, or less than about 2 hours), or at relatively infrequent intervals (e.g., about 10 hours or more). The reduced current between the pulses may have a current density from about 1 to 100 $mA/cm^2$ and may be held for a period of time of about 0.5 seconds to 60 minutes. The cycle may be repeated for the duration of normal operation. Note that the low current density pauses may have a reverse direction; e.g., a positive (oxidizing) current at the cathode.

In some embodiments, the current pause period durations are significantly less than the current-on periods for high throughput. For example, the current-on periods may be at least twice, at least 3 times, at least 5 times, at least 10 times, at least 20 times, at least 50 times, at least 100 times, or at least 500 times greater than the current pause periods. In certain embodiments, the periodic pulsing/pulsing has a duty cycle of about 0.2-1.

As mentioned, cell voltage may be controlled to effect pulsing or pausing. As an example, voltage pulsing is implemented using cycle in which a high voltage state ranges from about 2.7 to 3.9V. In these or other examples, a low voltage state ranges from about 1.5 to 2.7V. In some examples, the high voltage is held for about 30 minutes to 1000 minutes and/or the low voltage is held for about 5 minutes to 100 minutes. Such cycles may be repeated for the duration of normal operation. In certain embodiments, the periodic pulsing/pulsing has a duty cycle of about 0.2-1.

In certain embodiments, current pulsing helps remove liquid water from the cathode. The lowered current density may decrease the water being transported to the cathode. The operating current density may be about 200 to 600 mA/cm$^2$ for the majority of operating time, ranging from, e.g., about 65% to 95% of the total time. The paused current density is set to lower, e.g., from about 1 to 100 mA/cm$^2$, correspondingly, for a small portion of the total time, from, e.g., about 5% to 35%.

Stepped and ramping changes—Step changes or ramps (rising and falling) may be utilized during an initial break-in protocol, or a transition protocol between different current densities during pulsing, or before and after planned shutdown. Step changes may include 2 to 10 steps (e.g., about 2 to 5 steps). In some embodiments, step magnitudes are about 50 to 300 mA/cm$^2$. In some embodiments, step durations are about 1 minute to 300 minutes (e.g., about 30 to 150 minutes or about 60 to 120 minutes). A ramping protocol could include raising or dropping to the target current within about 1 second to 200 minutes. In some implementations, the ramps are linear.

In some embodiments, periods in which electrical pulsing or pausing occur are punctuated by periods when no pulsing or pausing occurs. Such alternating periods of pulsing/pausing and no pulsing/pausing may occur during normal operation, break-in, planned shutdowns, etc. Periods when no pulsing occurs may be employed as a second step break-in protocol before normal operations. As an example, a constant medium current density ranging from about 200 to 400 mA/cm$^2$ may be applied for about 50 to 100 hours before pulsing protocol starts.

Pulses may have a reverse cell current (or polarity) in which the cathode temporarily operates at oxidative currents and voltages. A reverse potential pulse may be in the range of about 0 to −3.5V with a corresponding current density in the range of −10 to 0 mA/cm$^2$. The reverse pulse may have a duration of about 0 to 60 minutes. The reverse pulses may be implemented with the same frequency and/or other parameters as described herein for forward electrical pulsing. In some embodiments, reverse electrical pulses are interleaved with forward electrical pulses.

Some relevant values of pausing or pulsing parameters are provided in US Patent Application Publication No. 2020/0220185, filed Dec. 18, 2019, which is incorporated herein by reference in its entirety.

The following parameters may characterize a planned shut down cycle. A shut-down cycle could be arranged every 100 to 10,000 hours of operation, the 'off' current status could be at absolute zero current (OCV mode) or at the minimal current status (short mode).

Non-Electrical Parameter Pulsing
Context

Electrical current is not the only reactor condition that may be pulsed or paused. Examples of other reactor conditions that may be pulsed or paused include gas flow rate to the cathode, gas pressure to the cathode, cell temperature, and water flow to the anode. Non-electrical parameter pulsing may be performed in synchronization with electrical pulsing, or may be performed independently of the electrical pulsing, if used. In some implementations, COx flow rate, electrical parameters, cell temperature, and COx pressure are pulsed independently or all together or in different combinations.

The mechanisms and effects of non-electrical parameter pausing or pulsing may overlap with those for electrical parameter pausing or pulsing. In certain embodiments, the mechanisms implicate "water management," which may improve COx mass transfer. Water management can involve clearing water out of flow fields, gas diffusion layer, catalyst layer (the pores as mentioned above), and/or the MEAs. In certain embodiments, water management clears unwanted intermediates in liquid form. In certain embodiments, water management clears potential salt blockage when lowering gas flow.

Non-Electrical Parameters Pulsing Ranges

The following are non-limiting examples of non-electrical parameter values that be used in pulsing or pausing embodiments.

Pressure Magnitude of Pulse

A reactor gas pressure may have a normal operating setpoint ranging from about 90 to 150 psi that is maintained for an operating period ranging from about minutes to hundreds of hours.

A reactor's gas pressure may, during a pulse or pause, have a lower gas pressure ranging from about 0 to 70 psi that is maintained for a period of time ranging from, e.g., about a few minutes to an hour, with or without applying current.

Such a cycle may repeat a number of times, e.g., at least about 5 times or at least about 10 times, during normal operation.

Duration of Pulses

An electrolytic reactor may operate with cathode gas pressure at a normal (high) level for an operating period ranging from about 30 minutes to 1000 hours.

The reactor may operate at a lower cathode gas pressure for a period of time ranging from, e.g., about 5 minutes to 60 minutes, with or without applying current.

As an example, a carbon oxide reduction cell is operated at about 90 psi for about 45 minutes, then at about 0 psi (gauge) for about 5 minutes. Pulsing from normal operation 0 to 70 psi has been found to help with water management.

Volumetric Flow Rate Variation During Pulsing

A gas flow rate to the cathode of an electrolytic reactor may have a normal operating setpoint ranging from, e.g., about 2 to 80 sccm (for a cathode planar surface area of 1 cm$^2$, scalable) for a duration of about 30 minutes to 1000 hours. In some embodiments, the reactor gas flow rate increases to a higher flow rate ranging from, e.g., about 12 to 120 sccm (for a cathode planar surface area of 1 cm$^2$, scalable). In some embodiments, the reactor gas flow rate decreases to a lower flow rate such as, e.g., about 0.4 to 4 sccm (for a cathode planar surface area of 1 cm$^2$, scalable). The period of gas flow rate deviation (higher or lower than the normal operating setpoint) may be shorter than the period of normal gas flow rate. For example, the deviation gas flow rate may range from about 0.1 second to 12 hours, with or without current applying. As with other parameter variations, the reactor gas flow rate cycle may repeat multiple times.

In one example, a gas flow rate cycle includes a carbon oxide flow rate setpoint of about 1000 sccm, which is maintained for about 45 minutes. In the example, the carbon oxide flow rate then increases to about 2000 sccm for about 5 minutes. This cycle repeats over normal operation.

Temperature Pulsing

In certain embodiments, a carbon oxide reduction electrolytic cell has a temperature that varies during normal operation. In some cases, the normal operating temperature is about 30-70 C and a lower pause or pulse temperature is about 20-40 C. In some cases, the normal operating temperature is maintained for about 1 to 100 days and the lower temperature is maintained for about 1 hour to 1 day.

As an example, a carbon oxide reduction electrolyzer may employ temperature variations as follows. The electrolyzer is operated at about 50 C for about 10 days, and then operated at about 30 C for about 1 day. This cycle may be repeated multiple times during normal operation of the electrolyzer. Adjusting the cell temperature may improve catalyst selectivity and change polymer electrolyte properties such as the water uptake and chemical transport rate, thereby promoting effective water management.

Ramp Rate of Pulses (Rising and Falling; Linear and/or Stepped)

Gas pressure pulses may be realized by step changes or ramping.

Gas flow rate pulses may be realized by step changes or ramping.

Temperature pulses may be realized by step changes or ramping.

Recovery and Processes

Introduction

In certain embodiments, a sequence of operations includes temporarily deviating from normal operating conditions to flow water or other liquid to the cathode and/or to flow a gas to the cathode under non-standard conditions. It has been found that flowing water to the cathode and/or flowing a gas (e.g., a gas other than the normal carbon oxide reactant) to cathode can facilitate a recovery in performance of a carbon oxide electrolyzer. This alternate sequence of operations is sometimes referred to as a "recovery process" or a "recovery sequence."

A recovery process may be performed after a carbon oxide electrolyzer has been in service, operating under normal conditions, for a period of time such as a few thousand hours. After a recovery process is completed, an electrolyzer may transition back to normal operation. A recovery process may be performed repeatedly over the service life of an electrolyzer or over the life of one or more of its components such as its associated MEA(s), gas diffusion layer(s) (GDL), and flow field(s). For example, a recovery process may be performed every 1000 to 10,000 hours of service life.

While many embodiments disclosed herein are presented as procedures for recovering lost performance of a carbon oxide electrolyzer, some embodiments pertain to protecting a carbon oxide electrolyzer from the detrimental effects of some unanticipated event such as loss of power to the electrolyzer. A carbon oxide electrolyzer may be placed in a protection mode when an unexpected event is determined to be occurring or likely to occur soon. If unmitigated, such unexpected events could damage the electrolyzer or infrastructure supporting the electrolyzer.

In some implementations, any of the operations, or any combination of such operations, described herein for performing recovery may also be employed for the protection of a carbon oxide electrolyzer.

In some embodiments, an electrolyzer and/or associated control system implements a protection mode by (a) determining that an unexpected and potentially detrimental event is occurring or will likely occur in the future and such unexpected event will, if unmitigated, likely damage or degrade the carbon oxide electrolyzer; and (b) performing one or more protective operations on the carbon oxide electrolyzer that reduce the likelihood that the electrolyzer will be damaged or degraded if the unexpected event continues to occur or does in fact occur in the future.

Examples of unexpected events that may trigger the protective operations include sudden decrease or loss of an input material such as anolyte or carbon oxide (e.g., $CO_2$) gas decrease or loss of heating or cooling, and loss of power to the electrolyzer. A substantial decrease or loss input material may require adjusting the power to electrolyzer to produce open circuit voltage or no current. Loss of power to the electrolyzer may cause the electrolyzer to discharge from operating voltage to an uncontrolled voltage, such as open circuit voltage or zero voltage either rapidly or gradually.

Examples of protective operations to mitigate the impact of the unexpected event include applying a relatively low current density to the electrolyzer, transitioning the electrolyzer voltage to open circuit voltage and reducing or ramping down the current applied to the electrolyzer. Any of these protective operations may be applied for a limited time such as only while the unexpected event continues to occur or until the likelihood of such event occurring is substantially reduced.

In some embodiments, the protective operation reduces electrolyzer current density to a relatively small (in comparison to normal operation) forward current density of about 1-50 $mA/cm^2$ or about 5-25 $mA/cm^2$ (e.g., about 10 $mA/cm^2$), or about 0.3% to 20% of the current density in normal operating conditions.

In some embodiments, the protective operation ramps down current to the electrolyzer. A ramp may have any form or slope. In some cases, the average ramp rate from full current (normal operation) to a final current is about 0.1 to 1 $mA/cm^2$ per minute, or about 1 to 10 $mA/cm^2$ per minute. In some cases, the ramping is stepped. The number of steps, the time duration of the steps, and the magnitude of the current density changes of the steps may vary. As an example, a ramp may have about 2 to 50 steps, or about 5 to 30 steps. As a further example, the duration of the steps may be about 1 to 100 seconds, or about 5 to 50 seconds. As a further example, the current magnitude of the steps may be about 0.1 to 10 $mA/cm^2$ or about 0.5 to 5 $mA/cm^2$.

In one example, a step profile reduces current density to an electrolyzer from a normal operating value (e.g., about 300 $mA/cm^2$ to 2 A/cm) via a sequence of steps, each having a much smaller value (e.g., about 10, 9, 8, 7, 6, 5, 4, 3, 2, 1 $mA/cm^2$) and each having a defined duration (e.g., about 30 seconds each), and then sets the final current output to maintain the electrolyzer at open circuit for about 5-10 minutes.

In some embodiments, an electrolyzer returns from recovery or protective mode to normal operating conditions via a current ramp. Such a return ramp may have any of the characteristics just identified for ramping current down but in the opposite direction, i.e., from low current density to higher current density.

Example Recovery Processes

In one example, a recovery process includes the following sequence: pause electrical current to the electrolyzer, then flow water over the cathode, and then restart flow of electrical current to the electrolyzer. In another example, a recovery process includes the following sequence: pause electrical current to the electrolyzer, then flow gas over the cathode, then flow water over the cathode, then again flow gas over the cathode, and finally restart normal operation by flowing electrical current through the cell. Included below are a few further examples of recovery sequences.

In some examples, a recovery operation comprises contacting the cathode with water while no current flows to the cathode. In some implementations, a relatively small amount of current flows while water is present in the cathode. In some cases, this current flows in the reverse direction (anodic at the carbon oxide reduction cathode). As an example, no more than about 1 $mA/cm^2$ current flows to the cathode in the reverse direction while water is present. In some examples, during a portion of the recovery process, water flows over the cathode, rather than quiescently contacting the cathode. Examples of recovery operations involving water flow or water contact include examples 1, 2, 3, and 4.

Example Recovery Sequence 1
  Normal operation, optionally including pulsing electrical current or voltage;
  Turn off or significantly reduce electrical current;
  Introduce water to the cathode by flowing or otherwise contacting the cathode;
  Turn on or increase current to normal operating level and reestablish normal operation (e.g., flow reactant gas at normal operating pressure and flow rate).

In some embodiments, a recovery operation comprises stopping the current, flowing water to the cathode, and then drying the cathode. The drying operation is optionally performed with the reactant gas, a modified reactant gas, or a different gas such as an inert gas.

Example Recovery Sequence 2
  Normal operation, optionally including pulsing electrical current or voltage;
  Turn off or significantly reduce electrical current;
  Introduce water to the cathode by flowing or otherwise contacting the cathode;
  Dry the cathode (e.g., by flowing gas through the cathode);
  Turn on or increase current to normal operating level and reestablish normal operation (e.g., flow reactant gas at normal operating pressure and flow rate).

In some embodiments, a recovery operation comprises flowing water to the cathode while no gas (reactant or other gas) flows to the cathode.

Example Recovery Sequence 3
  Normal operation, optionally including pulsing electrical current or voltage;
  Turn off or significantly reduce electrical current;
  Release backpressure and stop flow of the reactant gas to the cathode;
  Introduce water to the cathode;
  Dry the cathode (e.g., by flowing gas through the cathode);
  Turn on or increase current to normal operating level and reestablish normal operation (e.g., flowing the reactant gas at normal operating pressure and flow rate).

Note that stopping the gas flow and releasing or reducing the backpressure can occur in either order. If the process employs a different gas than the reactant, it may be necessary to first release the gas pressure and then stop the flow.

Example Recovery Sequence 4
  Normal operation, optionally including pulsing electrical current or voltage;
  Turn off or significantly decrease cell current;
  Release backpressure and stop flow of the reactant gas to the cathode;
  Flow gas under alternative conditions to cathode;
  Stop gas flow;
  Introduce water to the cathode by flowing or otherwise contacting the cathode;
  Stop contacting the cathode with water;
  Flow drying gas to cathode;
  Flow reactant gas to cathode;
  Turn on or increase current to normal operating level and reestablish normal operation.

In some embodiments, the recovery process comprises stopping the flow of current, followed by flowing a gas, which may be the reactant gas or a gas other than the reactant gas. In a case, where the gas is not the reactant gas, the gas flows for a period of time before restarting flow of the reactant gas and turning the current back on. In some embodiments, the gas other than the reactant gas comprises air, an oxidative gas, an inert gas, a combination thereof, or a modified composition of the reactant gas. In some such embodiments, water is not flowed to the cathode at least part of the time while the gas flows. Examples of recovery operations involving gas flow without water contact for at least part of time gas flows include examples 5, 6, and 7.

Example Recovery Sequence 5
  Normal operation, optionally including pulsing electrical current or voltage;
  Turn off or significantly reduce electrical current;
  Release backpressure of the reactant gas and turn off the reactant gas to the cathode;
  Flow a gas other than the reactant gas to the cathode for a period of time;
  Reintroduce the reactant gas at normal operating pressure and flow rate;
  Turn on or increase current to reestablish normal operation.

In some embodiments, the recovery process comprises stopping the flow of current, followed by flowing the reactant gas at reduced pressure and/or reduced flow rate for a period of time, then increasing the pressure and/or flow rate of the reactant gas to normal operating pressure, and finally turning the current back to normal level. In some such embodiments, water is not flowed to the cathode.

Example Recovery Sequence 6
  Normal operation, optionally including pulsing electrical current or voltage;
  Turn off or significantly reduce electrical current;
  Flow gas (optionally the reactant gas) to the cathode under alternative conditions such as reduced flow rate;
  Turn on or increase current to reestablish normal operation.

Example Recovery Sequence 7
  Normal operation, optionally including pulsing electrical current or voltage;
  Turn off or significantly reduce electrical current;
  Reduce pressure of the reactant gas to the cathode for a period of time;
  Increase pressure of the reactant gas to normal operating pressure;
  Turn on or increase current to reestablish normal operation.

Example Recovery Sequence 8
  Normal operation, optionally including pulsing electrical current or voltage;
  Ramp down electrical current to the electrolyzer and optionally apply a low reverse current;
  Flow gas (optionally the reactant gas) to the cathode under alternative conditions such as reduced flow rate and/or pressure (while applying a low current, which may be the low reverse current);
  Ramp up positive electrical current;
  Reestablish full normal operating conditions including full positive current and full flow of reactant gas.

Example Recovery Sequence 9
  Normal operation, optionally including pulsing electrical current or voltage;
  Apply a low reverse current (by ramping or direct transition);
  Flow gas (optionally the reactant gas) to the cathode under alternative conditions such as reduced flow rate and/or pressure (while applying a low current, which may be the low reverse current);

Ramp up positive electrical current;
Reestablish full normal operating conditions including full positive current and full flow of reactant gas.

Example Recovery Sequence 10

Normal operation, optionally including pulsing electrical current or voltage;
Adjust power source or associated circuit to short the electrolyzer or otherwise reach a potential below open circuit voltage;
Flow gas (optionally the reactant gas) to the cathode under alternative conditions such as reduced flow rate and/or pressure (while holding the electrolyzer at open circuit voltage or in a short circuit state);
Reestablish full normal operating conditions including normal operating electrolyzer potential and full flow of reactant gas.

Example Protection Sequence 11

Normal operation, optionally including pulsing electrical current or voltage;
Determine likely occurrence of an unexpected, detrimental event;
Transition electrolyzer to a protective mode (examples of protective mode operating conditions include applying a relatively low current density to the electrolyzer, transitioning the electrolyzer voltage to open circuit voltage, reducing or ramping down the current applied to the electrolyzer);
Determine that that detrimental event is no longer a threat;
Reestablish full normal operating conditions.

Example Recovery Sequence 12

Normal operation, optionally including pulsing electrical current or voltage;
Adjust power source or associated circuit to reach and maintain open circuit voltage;
Flow gas (optionally the reactant gas) to the cathode under alternative conditions such as reduced flow rate and/or pressure (while holding the electrolyzer at open circuit voltage or in a short circuit state);
Reestablish full normal operating conditions including normal operating electrolyzer potential and full flow of reactant gas.

Process Parameters Associated with Recovery Processes

Various operations associated with a recovery process are discussed in sequence below.

Normal Operation

As mentioned, a carbon oxide electrolyzer may operate normally for a period of time before a recovery sequence is executed. Normal operation may include a set of normal operating conditions as described elsewhere herein. Such conditions may include (a) normal reactant gas flow, which may be characterized by normal levels of a reactant gas pressure and flow rate or flow velocity at the cathode, (b) a reactant gas composition, (c) a set temperature or temperature profile, (d) an electrical current or voltage magnitude, optionally with a non-constant waveform, or (e) any combination thereof. In some embodiments, during normal operation, the electrical current or voltage has a pulsed or paused profile in which the current magnitude at the electrolyzer is periodically temporarily decreased or increased.

Normal operation may comprise converting a carbon oxide in the reactant gas to a carbon-containing product. In some embodiments, the carbon oxide is $CO_2$ and/or CO and the carbon-containing reduction product comprises CO, a hydrocarbon, and/or an organic oxygen-containing compound. Typically, during normal operation, liquid (e.g., water) is not introduced to the cathode via the carbon oxide inlet or other source outside the MEA. However, liquid in the form of mist or droplets may, during normal operation, contact the cathode along with the inlet gas.

In various embodiments, an electrolyzer operates normally for a period of time prior to a recovery sequence. For example, an electrolyzer may operate under normal conditions for a period of at least about 100 hours before executing a recovery sequence. In some cases, the period of normal operation lasts for at least about 1000 hours, or at least about 2000 hours, or at least about 5000 hours, or at least about 10,000 hours before executing a recovery sequence. After the recovery sequence, an electrolyzer may return to normal operation for an extended period such as at least about 100 hours. The ensuing period of normal operation may continue uninterrupted by another recovery process or by terminating operation of the electrolyzer. In some implementations, a recovery process is performed periodically during the life of the electrolyzer, but instances of the recovery process are separated by minimum periods of normal operation, such as periods of at least about 100 hours or at least about 500 hours, or at least about 1000 hours.

Electrical Current Reduction or Stoppage

In certain implementations, the recovery sequence stops the flow of electrical current to the electrolyzer, reduces the magnitude of the current density, or reverses the direction of the current at the cathode. The reduction in current may be significant, which means that it does not detrimentally affect the electrolyzer or any of its components such as a cathode catalyst layer. For example, the current should not corrode or otherwise degrade catalyst components such as metals, carbon support material, or polymers. As an example, the current is reduced by at least about 50%. In some examples, a reduced current density at the cathode has a magnitude of at most about 100 $mA/cm^2$ of planar cathode surface area. This current density may apply when gas and/or water is delivered to the cathode from outside the MEA.

In some cases, the recovery sequence employs, at least temporarily, application of electrical current in the reverse direction (i.e., an anodic current flows at the cathode side of the cell). A small anodic current (at the cathode side) may assist in the recovery of performance at the electrolyzer cathode during a subsequent normal operation. It may refresh the catalyst surface.

In some embodiments, current or voltage ramping is applied to a carbon oxide electrolyzer for either recovery for protection. As discussed above in connection with the discussion of protection mode, a ramp may have any of form or slope. In some cases, the average ramp rate from full current (normal operation) to a final current is about 20 $mA/cm^2$ per minute or less, or about 1 to 10 $mA/cm^2$ per minute, or about 0.5 to 1 $mA/cm^2$ per minute. In some cases, the ramping is stepped. The number of steps, the time duration of the steps, and the magnitude of the current density changes of the steps may vary. As an example, a ramp may have about 2 to 50 steps, or about 5 to 30 steps. As a further example, the duration of the steps may be about 1 to 100 seconds, or about 5 to 50 seconds. As a further example, the current magnitude of the steps may be about 0.1 to 10 $mA/cm^2$ or about 0.5 to 5 $mA/cm^2$.

Duration of Current Stoppage

In certain embodiments, the duration of current stoppage in a recovery sequence is about 5 minutes to days (e.g., 10 days). In certain embodiments, the duration of current stoppage is about 10 minutes to about 300 minutes, or about 15 minutes to 60 minutes.

When changing the current from the normal operation at the beginning of the recovery process, the current may be reduced by a sudden stoppage (a single step change), ramping down, and/or multiple steps.

In certain embodiments in which a reverse current is applied, the duration of reverse current applied to the cathode is about 5 seconds to 60 minutes or about 5 minutes to 60 minutes.

Short Circuit

In some embodiments, a power source for powering a carbon oxide electrolyzer is short circuited during recovery or protection mode. A short circuit may occur when the electronic resistance is not large enough in the circuit to impede current flow between the anode and cathode. In such cases, the potential or potentials of the anode and cathode equalize; in other words, the cell voltage is 0 volts. When shorted, the electrolyzer discharges from a normal operating state or from open circuit voltage. During shorting of the electrolyzer, the cell voltage transitions to a level below the open circuit voltage.

The short circuit condition may be held for a prescribed period during recovering or protection mode. In some embodiments, short circuit mode is held for about 30 minutes or less, or about 10 minutes or less, or about 5 minutes or less, or about 1 to 5 minutes. After exiting the short circuit condition, the electrolyzer may return to a normal operating voltage, and optionally to full normal operation.

A short circuit and associated discharge process in which current flows in the reverse direction may provide an oxidation condition on a catalyst (e.g., a gold catalyst) that increases the catalytic effect by, e.g., generating extra active surface area and/or by removing potential impurities or intermediates. A short circuit may also deplete ionic species such as $K^+$, $H^+$, $COOH^-$, $HCO_3^-$, $CO_3^{(2-)}$, $OH^-$, or any combination of positive and/or negative ions. A short circuit may also cause water electrolysis at an MEA interface (e.g., between a PEM and AEM in a bipolar MEA) and/or at the cathode to provide a drier condition for better carbon oxide (e.g., $CO_2$) mass transport. A short circuit may temporarily change the cathode local environment such as its pH or ionic concentrations to thereby improve the $CO_2$ reduction selectivity. A change from lower to higher pH or a change from lower to higher concentrations of potassium may improve selectivity for a particular reaction as the CO generation reaction.

In certain embodiments, a system applies a short circuit when the selectivity of $CO_2$ reduction to CO is below a certain target value and/or it is desired to extend the electrolyzer life by, e.g., a couple of hundred hours. In certain embodiments, a system applies a short circuit for periodic (e.g., recurring) recovery on the reaction selectivity to reach a certain decay rate target within a certain time range. For example, a system may perform a recovery operation whenever the selectivity decays to certain value, e.g., about 90% or less. Another approach performs a recovery operation every time an electrolyzer operates normally for a defined period (e.g., about 200 to 500 hours). Another approach performs a recovery operation every time an electrolyzer exhibits a threshold drop in the selectivity (e.g., about 10% or more).

Open Circuit Voltage

In some embodiments, a carbon oxide electrolyzer is allowed to reach or is maintained at an open circuit voltage during recovery or protection. Open circuit voltage refers to the voltage difference between the anode and cathode when no net electrochemical reaction is taking place at the anode or cathode. This may result when no current flows between the anode and cathode. An open circuit potential may be achieved when a switch in the circuit containing the electrolyzer and a power supply opens by breaking a conductive path between the anode and/or cathode. An open circuit potential may also be achieved by employing a very high impedance element in the circuit including the power supply and electrolyzer. Such a resistor will have the effect of completely shutting off or nearly shutting off all current flow between the anode and the cathode of the electrolyzer.

In some cases, setting an electrolyzer to OCV or allowing to reach OCV while maintaining similar $CO_2$ gas flow rate at the cathode may provide a relative dry condition thereby allowing improved $CO_2$ mass transport. Setting an electrolyzer to OCV or allowing to reach OCV may flush out potential intermediates or impurities on the catalyst surface when no electrochemical reactions are occurring. In some cases, setting an electrolyzer to OCV or allowing to reach OCV temporarily changes the cathode local environment such as pH or ionic concentrations and thereby improve the $CO_2$ reduction selectivity for, e.g., CO production.

Various scenarios and applications may benefit from setting an electrolyzer to OCV or allowing to reach OCV. In some cases, OCV is used when a modest recovery in selectivity is desired and/or the electrolyzer voltage should be maintained at a relatively high level as by comparison to a short circuit condition.

Reverse Current

As indicated, in some embodiments, a reverse current is applied to a carbon oxide electrolyzer during recovery or protection. Forward current is current applied to a carbon oxide electrolyzer during normal operation. Electrons are supplied from a power source to the cathode allowing reduction to occur, and electrons are withdrawn from the anode allowing oxidation to occur. During reverse current, the flow of electrons is reversed so that the electrode that serves as a cathode during normal operation serves as an anode during application of reverse current, and the electrode that serves as an anode during normal operation serves as the cathode during application of reverse current.

Typically, a reverse current is maintained below a level at which carbon and/or other material in the cathode catalyst oxidizes or corrodes. In some embodiments, a reverse current has a magnitude of about $-100$ mA/cm$^2$ or less or about $-5$ to $-100$ mA/cm$^2$. In some embodiments, a reverse current is applied for a time duration of about 100 minutes or less, or about 50 minutes or less, or about 30 seconds to 20 minutes. As a further example, the reverse current may be no greater than about 1 mA/cm$^2$ of cathode surface area or not greater than about 0.5 mA/cm$^2$. In some cases, the reverse current flows is maintained at or below a level in which the cell voltage does not exceed about 1.25 V (for reactant gas) and 2.5 V (for oxidizing gases such as air), or does not exceed about 0.5 V (for reactant gases) and 2 V (for oxidizing gases such as air). In certain embodiments employing a reverse current, such current is limited to no more than about 0.6 Coulombs/cm$^2$ of cathode surface area.

After the finishing application of a reverse current, the electrolyzer may return to a normal operating current, and optionally to full normal operation. In certain embodiments, a final value of the reverse current is achieved by ramping to the final value. A ramp rate and/or stepped ramp procedure as described herein for protection mode or for achieving a reduced current value may be employed.

Among the potential benefits of exposing a carbon oxide electrolyzer to reverse current are those described herein for applying a short circuit. Similarly, exposing a carbon oxide electrolyzer to a reverse current may find applications similar to those for applying a short circuit.

Types of Gases Flowed to the Cathode (Pre-Contact with Water)

In some implementations of a recovery process, a gas flows to the cathode for a period of time after the electrical current is stopped or reduced. Sometimes this gas is referred to herein as a "recovery gas." In some cases, the recovery gas has the same composition as the carbon oxide reactant that flows during normal operation, optionally at a different pressure and/or flow rate than employed in normal operation. For example, the gas flowed during normal operation and during the recovery process contains carbon dioxide or carbon monoxide at a defined concentration. In some cases, a recovery gas that flows to the cathode during a recovery process has composition that is different from that of the reactant gas. In some cases, compared to the reactant gas, the recovery process gas has a lower concentration of carbon oxide reactant. In some cases, the recovery process gas contains an inert gas that is not present in (or is present at a different concentration in) the normal process gas. Examples of inert gases include noble gases (e.g., Ar, He, or Kr) or nitrogen. In some cases, the recovery process gas is or contains air. In some cases, the recovery gas contains an oxidative gas such as oxygen. In some cases, the oxidative gas is simply air, which may contain about 21% oxygen. In other cases, the oxidative gas is oxygen or other oxidizer provided apart from air. For example, oxygen produced at the electrolyzer anode, during normal operation, may be used as an oxidative recovery gas. In some implementations, the recovery gas is humidified. In some embodiments, component gases include carbon dioxide, air, water, an inert gas, or any combination thereof.

In some examples, the recovery gas is 100% or pure reactant gas. In some examples, the recovery gas is 100% or pure inert gas. In some examples, the recovery gas comprises a reactant gas and an inert gas in any ratio. In some examples, the recovery gas comprises an oxidative gas and an inert gas in any ratio. In some examples, the recovery gas is a humidified gas having water vapor present in a concentration of about 0-2% by volume. In some cases, a humidified gas comprises a reactant gas, an inert gas, an oxidative gas, or any combination thereof.

Gas Pressure at Cathode (Pre-Contact with Water)

In some embodiments, after current stoppage or reduction, the pressure of a recovery gas flowing to the cathode may be at a level up to normal operating pressure of the electrolyzer cell. In some embodiments, after current stoppage or reduction, the cathode gas back pressure is reduced to, e.g., 0 psig. Cathode gas back pressure may be controlled by a pressure regulator located downstream from the cathode in the gas flow path. After reducing the cathode gas back pressure, the recovery gas may be present and optionally flowing under a pressure of about 0-600 psig, or about 0-400 psig, or about 0-50 psig.

Gas Flow Rate going through the Cathode (Pre-Contact with Water)

In certain embodiments in which a recovery gas flows after reducing or stopping the electrical current, the gas may be flowed at a rate of about 0 to 50 sccm/cm$^2$ of planar cathode surface area, or about 10 to 30 sccm/cm$^2$ of planar cathode surface area. Note that the flow rate values presented herein are provided on a per surface area of cathode (e.g., per cm$^2$ of planar cathode surface). As a single example, the gas flow rate may be about 500 sccm for an electrolyzer having 25 cm$^2$ of cathode surface area. The gas flow rate may scale linearly or non-linearly with surface area of the cathode. The flow rate values presented here may be instantaneous flow rates or average flow rates.

Duration of Gas Flowing at Cathode (Pre-Contact with Water)

In recovery sequence embodiments in which a recovery gas flows to the cathode, that gas may flow for a period of time after the electrical current is stopped or reduced. In certain embodiments, the duration of the gas flowing to or residing at the cathode is about 30 minutes to 10 days, or about 1 hour to 2 days. The duration of gas flow in a recovery sequences may be at least partially dependent on the flow rate of the gas (e.g., the average flow rate in cases where the flow rate varies). As an example, low or zero flow for a few days and high flow for a few minutes or hours may have similar effects. As a further example, a gas flow and/or exposure time range could be 30 minutes to even days. But at a flow rate of 50 sccm/cm$^2$, the maximum contact/flow time may be about 5 hours.

In some embodiments, the recovery gas is flowed to the cathode before contacting the cathode with water or other liquid. The recovery gas flow may be stopped before contact with the liquid.

Composition of Water Contacting the Cathode

As indicated, various recovery processes involve contacting the cathode with a liquid such as water. It should be understood that when referring to water herein, the recovery process may employ water over a wide range of purities. In some embodiments, the water is deionized water such as deionized water having a resistivity of at least about 1 megaohm, or at least about 10 megaohm, or at least about 18 megaohm. In some embodiments, the water includes one or more dissolved solutes or suspended components. Examples of dissolved solutes include bicarbonates, carbonates, sulfates, hydrogen sulfates, formates, acetates, and halides. As examples, the solutes may be metal (e.g., sodium, potassium, or cesium) or ammonium salts of these anions. In certain embodiments, recovery process water comprises a bicarbonate at a concentration of at most about 10 mM bicarbonate ion, or at most about 5 mM bicarbonate ion, or at most about 2 mM bicarbonate ion. In some embodiments, the recovery process water has a composition that matches or is similar to that of anode water used during normal operation. Examples of anode water compositions are presented in PCT Patent Application No. PCT/US2019/063471, filed Nov. 26, 2019, which is incorporated herein by reference in its entirety.

Water Flow Rate at Cathode

The water optionally flows during contact with the cathode. In some embodiments, the water flow rate to the cathode is up to about 20 ml/min per cm$^2$ of planar cathode surface area. As an example, the water flow rate is about 2-10 ml/min per cm$^2$ of planar cathode surface area. In some embodiments, the flow rate is limited based on pump and associated hardware. Note that water provided to the cathode as part of a recovery process is typically provided from outside MEA, such as via the carbon oxide inlet to the cathode, as opposed to being provided from the anode via the MEA.

Duration of Water Flowing through Cathode

In certain embodiments, the duration of water flowing to the cathode is about 1-100 minutes. In certain embodiments, the duration of water flowing to the cathode is about 2-50 minutes, or about 5-15 minutes.

Drying Steps (Gas Flowing) after Water Flowing

A drying operation may be performed when no water contacts the cathode. Drying may be performed after water contact but before, or possibly during an initial period of, resumption of normal operation.

Drying may be performed with a gas of any composition that removes water from the cathode. Such gas may be referred to herein as a "drying gas." Examples of gases that may be present in a drying gas are air, the reactant gas, and inert gases. Examples of the inert gases include the noble gases (e.g., He, Ar, Kr) and nitrogen. If the reactant gas is used, it is optionally used at a concentration that is different from its use during normal operation. For example, carbon dioxide may be present at 50% (molar) in the reactant and be present at 20% (molar) in the drying gas.

The physical mechanism by which the drying gas removes water from the cathode may include pushing or otherwise forcing water out of the cathode by contacting the cathode with gas at a pressure and/or velocity sufficient to remove liquid water.

Water may also or alternatively be removed by evaporation into the drying gas. To this end, the relative humidity of the drying gas entering the cathode may be controlled to facilitate evaporation. While, in some embodiments, the drying gas may have a very low relative humidity (e.g., about 0 to 100%), in other embodiments, it may have a higher value, which may be desirable to ensure that the MEA does not lose moisture to the point where it dries and its performance degrades.

Duration of Drying

In certain embodiments, the duration of drying the cathode is about 0 to 500 minutes, or about 2 to 100 minutes, or about 5 to 30 minutes.

In some embodiments, the drying operation continues until no further liquid water (e.g., water droplets or mist) is present downstream from the cathode. In some embodiments, the drying operation continues until the humidity of the drying gas entering the cathode is approximately the same as the humidity of the drying gas exiting the cathode.

Restarting Flow or Reactant Gas

If the drying is not conducted with the reactant gas, the recovery process transitions from flowing drying gas to flowing reactant gas. This may involve reestablishing the normal operating gas pressure at the cathode by, e.g., adjusting a setting on the pressure regulator downstream from the cathode. If the drying gas is the reactant gas, then the transition from flowing the drying gas to flowing the reactant gas need not occur, or optionally it occurs but represents only a change in the gas flow rate, pressure, composition, or a combination thereof Current Ramp Rate after Recovery In some embodiments, at the conclusion of the recovery operation, electrical current is resumed directly to the original value or with some ramping steps or step increase.

Optional Voltage Scan

In some embodiments, a recovery process is performed with a voltage or current scan. A voltage or current scan may be performed repeatedly in alternating directions, between two endpoints. A voltage scan may be performed in the manner of cyclic voltammetry. In some cases, a voltage or current scan is performed in a recovery process while the current is otherwise stopped. In some cases, a voltage or current scan is performed while gas flows to the cathode, but water does not contact the cathode. For example, a voltage or current scan may be performed during a gas drying operation in any of recovery sequence examples 2-4, above. In some examples, a voltage or current scan is performed during a gas contact operation that occurs prior to contact with water. See recovery sequence examples 3 and 4, above. In some examples, a voltage or current scan is performed during a gas contact operation that is not associated with a water contact operation. See recovery sequence examples 5-7, above.

A voltage or current scan may have various effects on an electrolyzer cell or its cathode. Examples include:

Relax the charging overpotential of carbon materials within the electrode, which is caused by strong polarization, through current stoppage for different lengths of time.

Electrode surface cleaning (removing impurities/unwanted intermediates) by changing adsorption/desorption environment at zero or slight anodic voltage or under air exposure.

Rearrange cathode catalyst sites to more favorable orientations for COx reduction.

Keep the MEA hydrated.

A voltage scan may be characterized by an initial cathode voltage EO (V), an upper cathode voltage limit V1 (V), a lower cathode voltage limit V2 (V), and a scan rate S (mV/s). In some embodiments, EO has a range of about $-1V$ to 1.2V vs. RHE. In some embodiments, E1 has a range of about $-1V$ to 1.2V. In some embodiments, E2 has a range of about $-1V$ to 1.2V. In some embodiments, S has a range of about $-10000$ to $-0.1$ mV/s, or about 0.1 to 10000 mV/s. The scan direction can be positive or negative, with positive meaning the first sweep is towards the positive direction, while negative meaning the first sweep is towards the negative direction. The scan rates in the positive and negative directions may be the same or different. The number of scans (n) can be in the range from about 1 to 1000.

Figure 2:
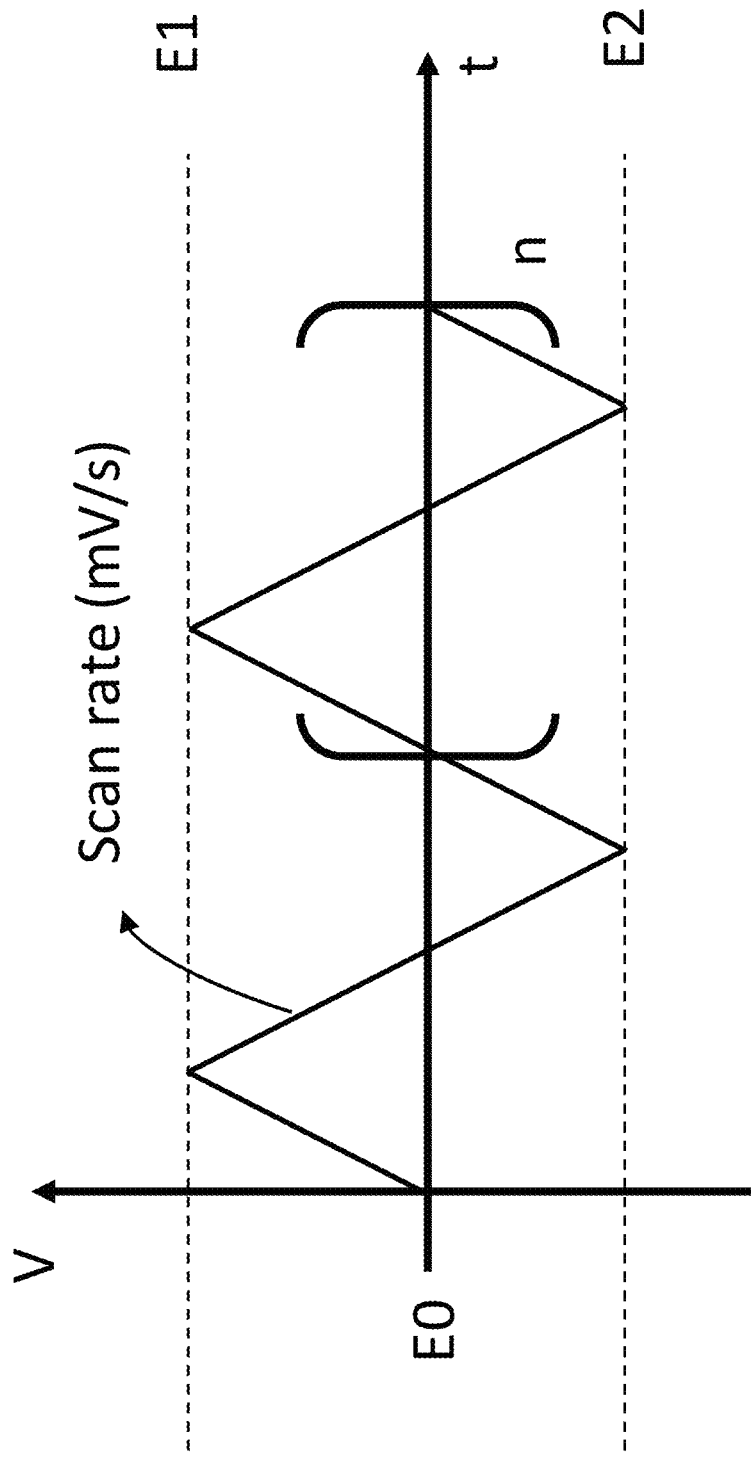
FIG. 2 illustrates example features of a cyclic voltage scan employed during a recovery or protection mode.

FIG. 2 illustrates example features of a cyclic voltage scan.

Temperature Variation During Recovery Operations

In certain embodiments, the temperature of an electrolyzer cell remains unchanged during a recovery operation. In certain embodiments, the temperature of an electrolyzer cell changes during a recovery operation. The temperature change may be driven by a temperature controller, water flowing to the cathode, gas flowing to the cathode, or any combination thereof. In some embodiments, the electrolyzer cell temperature increases during the recovery operation. In some embodiments, the electrolyzer cell temperature decreases during the recovery operation, e.g., by about 5-25° C.

Effects of Recovery and Protection Operations

In certain embodiments, when employing a recovery process, the current efficiency of the electrolyzer may increase immediately after the recovery process, and often for an extended period thereafter. In some cases, the current efficiency increases by at least about 20% or by at least about 35%, or by at least about 50% after a recovery process.

In certain embodiments, when employing a recovery process, an electrolyzer's voltage efficiency does not decrease. For example, an electrolyzer's voltage efficiency may increase by at least about 1%, or by at least about 3% after the recovery process. In certain embodiments, when employing a recovery process, an electrolyzer's cell voltage does not increase. For example, an electrolyzer's cell voltage may decrease by at least about 50 mV or by at least about 100 mV after a recovery process.

In certain embodiments, when employing a recovery process, an electrolyzer's operating lifetime may increase by at least about 100 hours, or by at least about 1000 hours, or by at least about 5000 hours, or by at least about 10,000 hours when compared to an electrolyzer that does not receive a recovery process. In certain embodiments, when employing a recovery process, an electrolyzer's operating lifetime may increase by at least about 50% when compared to an electrolyzer that does not receive a recovery process.

In certain embodiments, when employing a recovery process, an electrolyzer's single pass conversion increases. A single pass conversion may be the molar fraction of reactant gas that converts to an intended product or products. In certain embodiments, a carbon dioxide electrolyzer's single pass conversion increases by at least 3%, or at least about 5%, or at least about 10% after the recovery process.

EXAMPLE

Figure 3:
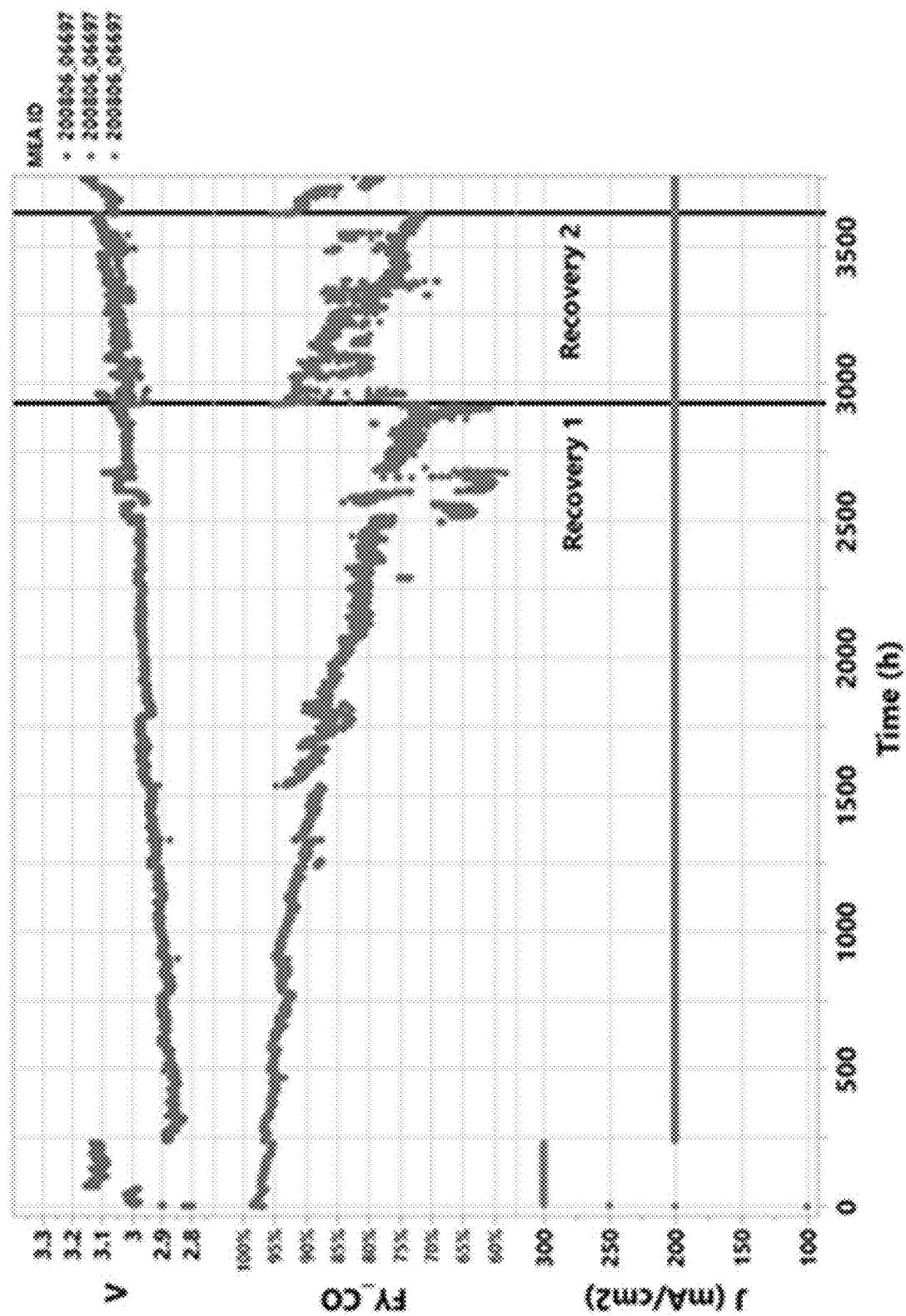
FIG. 3 presents experimental results illustrating some effects of a recovery sequence. This example employed a carbon dioxide electrolyzer having 25 cm² cathode with Au/C catalyst particles.

FIG. 3 illustrates a preliminary experiment illustrating some effects of a recovery sequence. This example employed a carbon dioxide electrolyzer having 25 cm$^2$ cathode with Au/C catalyst particles.

The graph of FIG. 3 shows the applied current density (lower plot), the experimentally observed faradaic yield for converting carbon dioxide to carbon monoxide (middle plot), and the experimentally observed electrolyzer cell voltage.

Note that the experiment employed a startup sequence—which should not be confused with the recovery sequence—having a first stage that used a continuous current density of 300 mA/cm$^2$ and cell temperature of 50° C., and a second stage that used a high current density of 300 mA/cm$^2$ punctuated every 45 minutes with a 5 minute low current pause of 10 mA/cm$^2$ at 40° C. The first stage was performed for 72 hours, and the second phase was performed for 163 minutes. When the second stage completed, the experiment transitioned to normal operation which used a normal current density of 200 mA/cm$^2$ punctuated every 45 minutes with a 5 minute low current pause of 10 mA/cm$^2$ at 40° C.

As shown, about 3000 hours into the experiment, the normal operation temporarily ended, and a recovery sequence was applied. The recovery sequence included turning off the cell current, releasing backpressure and stopping flow of the reactant gas to the cathode, exposing cathode to air at ambient pressure, flowing deionized water to the cathode, stopping contacting the cathode with water, flowing air to cathode, flowing reactant gas to cathode, turning.

As can be seen, the electrolyzer cell voltage gradually increased over the period normal operation, while the electrolyzer faradaic yield of carbon monoxide production decreased. After performing the recovery sequence, the cell voltage decreased by about 0.04 volts, and the faradaic yield of carbon monoxide production increased by about 20%.

Later in the experiment, at about 3600 hours, a second recovery sequence was executed. This sequence included turning off cell current, releasing backpressure and stopping flow of the reactant gas to the cathode, exposing cathode to air at ambient pressure, flowing deionized water to the cathode, stopping contacting the cathode with water, flowing air to cathode, flowing reactant gas to cathode, turning on or increasing current to normal operating level. After performing the second recovery sequence, the cell voltage decreased by about 0.05 volts, and the faradaic yield of carbon monoxide production increased by about 23%.

Process Windows

The electrolyzer design and operating conditions can be tuned for particular applications, and for producing a cathode output having specified compositions. In some implementations, one or more general principles may be applied to operate in a way that produces a required output stream composition.

1. Restrict carbon dioxide reactant availability at the cathode active sites and/or increase current density at the cathode. These operating condition ranges tend to produce the following results: (a) initially, upon decreasing the carbon dioxide reactant availability and/or increasing the current density, the fraction of $CO_2$ converted to CO increases (i.e., $CO:CO_2$ in the output stream increases); (b) at some point, upon further decreasing the carbon dioxide reactant availability and/or increasing the current density, the hydrogen ion reduction reaction becomes more pronounced (i.e., $H_2:CO$ increases). Electrolyzers configured to operate with relatively little carbon dioxide input/availability may simply be designed to control the flow rate of carbon dioxide upstream of the electrolyzer. In some cases, electrolyzers are configured to have flow fields or gas diffusion components that restrict carbon dioxide from reaching active sites on the electrolyzer cathode. In certain embodiments, flow field designs that are not interdigitated, and flow field designs that have long paths such as serpentine paths between the source of $CO_2$ and the cathode result in higher ratios of $CO:H_2$. Interdigitated flow field forces input gas (carbon oxide) to flow through the gas diffusion layer before exiting at a different location on the flow field. Non-interdigitated designs have long continuous paths for the carbon oxide feed gas to flow into and out of the cathode. Channels on the inlet side are spaced from the channels on the outlet side. Gas diffusion electrodes that are relatively thick may restrict $CO_2$ mass transport to the cathode active sites and therefor tend to increase the ratio of $CO:CO_2$ and/or $H_2:CO$.

2. Make hydrogen ions relatively more available at the cathode. Making hydrogen ions relatively more available at the cathode may produce a cathode product stream with a relatively high ratio of $H_2:CO$. Electrolyzers configured in a way that provide a relatively hydrogen rich product may employ designs that (a) starve the cathode of carbon dioxide reactant (as described in 1), (b) permit a relatively high flux of hydrogen ions to be transported from the anode, where they are generated, to the cathode, and/or (c) operate at a relatively high cell temperature. Electrolyzers that can operate with a relatively high flux of hydrogen ions to the cathode may have MEAs with cation conducting polymers and/or mixed ion conducting polymers at the cathode. Alternatively, or additionally, in MEAs that have a cathode buffer layer, the layer is designed to be relatively thin and/or have a relatively high hydrogen ion transference number.

3. Make hydrogen ions less available at the cathode. Making hydrogen ions relatively less available at the cathode may produce a cathode product stream with relatively high ratios of $CO:H_2$. Electrolyzers configured in a way that provides relatively low concentrations of hydrogen in the product may employ designs that (a) provide the cathode with surplus carbon dioxide reactant for a given current density, (b) employ MEA designs that prevent hydrogen ions from reaching the cathode, and/or (c) operate at a relatively low cell temperature.

High $CO_2$ Reduction Product to $CO_2$ Ratio Operating Parameter Regime

In certain embodiments, an electrolyzer is configured to produce, and when operating actually produces, an output stream having a $CO:CO_2$ molar ratio of at least about 1:1 or at least about 1:2 or at least about 1:3. A high CO output stream may alternatively be characterized as having a CO concentration of at least about 25 mole %, or at least about 33 mole %, or at least about 50 mole %.

In certain embodiments, a high carbon monoxide output concentration (in the range of any of the above examples) is obtained by operating a carbon dioxide electrolyzer in a manner that produces any one of or any combination of the following operating conditions:

a current density of at least about 100 mA/cm2, at the cathode, a $CO_2$ stoichiometric flow rate (as described elsewhere herein) of at most about 4, or at most about 2.5, or at most about 1.5 a temperature of at most about 80° C. or at most about 65° C., a pressure range of about 25 to 400 psig, an anode water composition of about 0.1 to 50 mM of a salt such as formate salt and/or bicarbonate salt, and an anode water pH of at least about 1.

In certain embodiments, the electrolyzer may be built to favor high $CO:CO_2$ molar ratios or concentrations, as exemplified here, by using a carbon dioxide electrolyzer having any one of or any combination of the following properties:

relatively small nanoparticle cathode catalysts (e.g., having largest dimensions of, on average, about 0.1-15 nm), gold as the cathode catalyst material, a cathode catalyst layer thickness of about 5-20 um, a cathode gas diffusion layer (GDL) with a microporous layer (MPL), a cathode GDL with PTFE present at about 1-20 wt %, or about 1-10 wt %, or about 1-5 wt %, a GDL that has a thickness of at least about 200 um a bipolar MEA having an anion-exchange cathode buffer layer having a thickness of at least about 5 um, and a cathode flow field having parallel and/or serpentine flow paths.

High Reduction Product ($H_2$+CO) to $CO_2$ Ratio Operating Parameter Regime

In certain embodiments, an electrolyzer is configured to produce, and in operation actually produces, an output stream having a ($H_2$+CO):$CO_2$ molar ratio of at least about 2:1 or at least about 1:2 or at least about 1:3.

In certain embodiments, a relatively high reduction product output concentration (employing any of the ($H_2$+CO):$CO_2$ ratios above) is obtained by operating a carbon dioxide electrolyzer in a manner that produces any one of or any combination of the following operating conditions:

a current density of at least about 300 mA/cm2, a $CO_2$ stoichiometric flow rate of at most about 4, or at most about 2.5, or at most about 1.5 a temperature of at most about 125° C., a pressure of at most about 800 psi, anode water composition of 0 to about 500 mM bicarbonate salt, and an anode water pH of about 0-15.

In certain embodiments, the electrolyzer may be built to favor high (CO+$H_2$):$CO_2$ molar ratios or concentrations, as defined here, by using a carbon dioxide electrolyzer having any one of or any combination of the following properties:

nanoparticle cathode catalysts (e.g., having a largest dimension, on average, of about 0.1-1000 nm), a transition metal as a cathode catalyst material, a cathode catalyst layer thickness of about 0.1-100 um, a cathode gas diffusion layer with or without a microporous layer (MPL), a GDL with about 0-70 wt % PTFE, a GDL that is about 10-1000 um thick, and a bipolar MEA having an anion-exchange cathode buffer layer that is about 0-100 um thick.

Hydrogen Rich Product Stream Operating Parameter Regime

In certain embodiments, a carbon dioxide electrolyzer is configured to produce, and when operating actually produces, an output stream having $H_2$:CO in a molar ratio of at least about 1:1.

In certain embodiments, such hydrogen rich output concentration is obtained by operating a carbon dioxide electrolyzer in a manner that produces any one of, or any combination of, the following operating conditions:

a current density of at least about 300 mA/cm2, a $CO_2$ mass transfer stoichiometric flow rate to the cathode of up to about 2, a temperature of at least about 65° C. or at least about 80° C., a pressure range of about 75 to 500 psig, an anode water composition of pure water or at least about 50 mM bicarbonate salt, and an anode water pH of at most about 1.

In certain embodiments, the electrolyzer may be built to favor hydrogen rich molar ratios or concentrations, as defined here, by using a carbon dioxide electrolyzer having any one of or any combination of the following properties:

relatively large nanoparticle cathode catalysts (e.g., having a largest dimension of, on average, at least about 80 nm)

silver, palladium, or zinc as the cathode catalyst material, a cathode catalyst layer thickness of at most about 5 um or a thickness of at least about 25 um, a cathode gas diffusion layer with no microporous layer (MPL), a cathode GDL with no PTFE present or at least about 20 wt % PTFE, a cathode GDL having a thickness that is at most about 200 um or at least about 500 um, and a bipolar MEA having an anion-exchange cathode buffer layer with a thickness that is about 0-5 um.

High Reduction Product to Hydrogen Product Stream Operating Parameter Regime

In certain embodiments, a carbon dioxide electrolyzer is configured to produce, and when operating actually produces, an output stream having CO:$H_2$ in a molar ratio of at least about 2:1.

In certain embodiments, such product rich output concentration is obtained by operating a carbon dioxide electrolyzer in a manner that produces any one of or any combination of the following operating conditions:

a current density at the cathode of at least about 300 mA/cm2, a $CO_2$ mass transfer stoichiometric flow rate to the cathode of at least about 1.5, or at least about 2.5, or at least about 4, a temperature of at most about 80° C., a pressure in the range of about 75 to 400 psig, an anode water composition of about 0.1 mM to 50 mM bicarbonate salt, and an anode water pH of greater than about 1.

In certain embodiments, the electrolyzer may be built to favor product-rich molar ratios or concentrations, as defined here, by using a carbon dioxide electrolyzer having any one of or any combination of the following properties:

relatively small nanoparticle catalysts (e.g., having largest dimensions of, on average, about 0.1-15 nm), gold as the cathode catalyst material, a cathode catalyst layer thickness of about 5-20 um, a cathode gas diffusion layer with a microporous layer (MPL), a cathode GDL with PTFE present at about 1-20 wt %, or about 1-10 wt %, or about 1-5 wt %, a cathode GDL that has a thickness of at least about 200 um, and a bipolar MEA having an anion-exchange layer with a thickness of at least about 5 um.

Mitigating Need for Recovery Operations

This disclosure pertains to not only methods of performing recovery and/or protection on a carbon oxide electrolyzer, but methods of reducing the likelihood or frequency of performing recovery operations. Such methods may involve operating the electrolyzer in a manner that is unlikely to cause issues that require recovery.

One way of reducing the likelihood that a recovery operation will be needed or the frequency during which recovery operations are performed is to employ anode water that has limited propensity to precipitate solids during normal operation. The anode water may employ salts that have concentrations well below their solubility limits. Examples include sodium salts such as sodium bicarbonate at concentrations of about 10 mM or lower during normal operation. In some embodiments, the anode water employs a potassium salt such as potassium bicarbonate at concentrations of about 15 mM or lower. In some cases, the anode water employs primarily or exclusively salts that have relatively high solubility compared to other potential salts. For example, the anode water may employ primarily or exclusively potassium salts and relatively little or no sodium salts. Additional examples of anode water composition are provided in PCT Publication No. 2020112919, published on Jun. 4, 2020, which is incorporated herein by reference in its entirety.

System Embodiments

Figure 4:
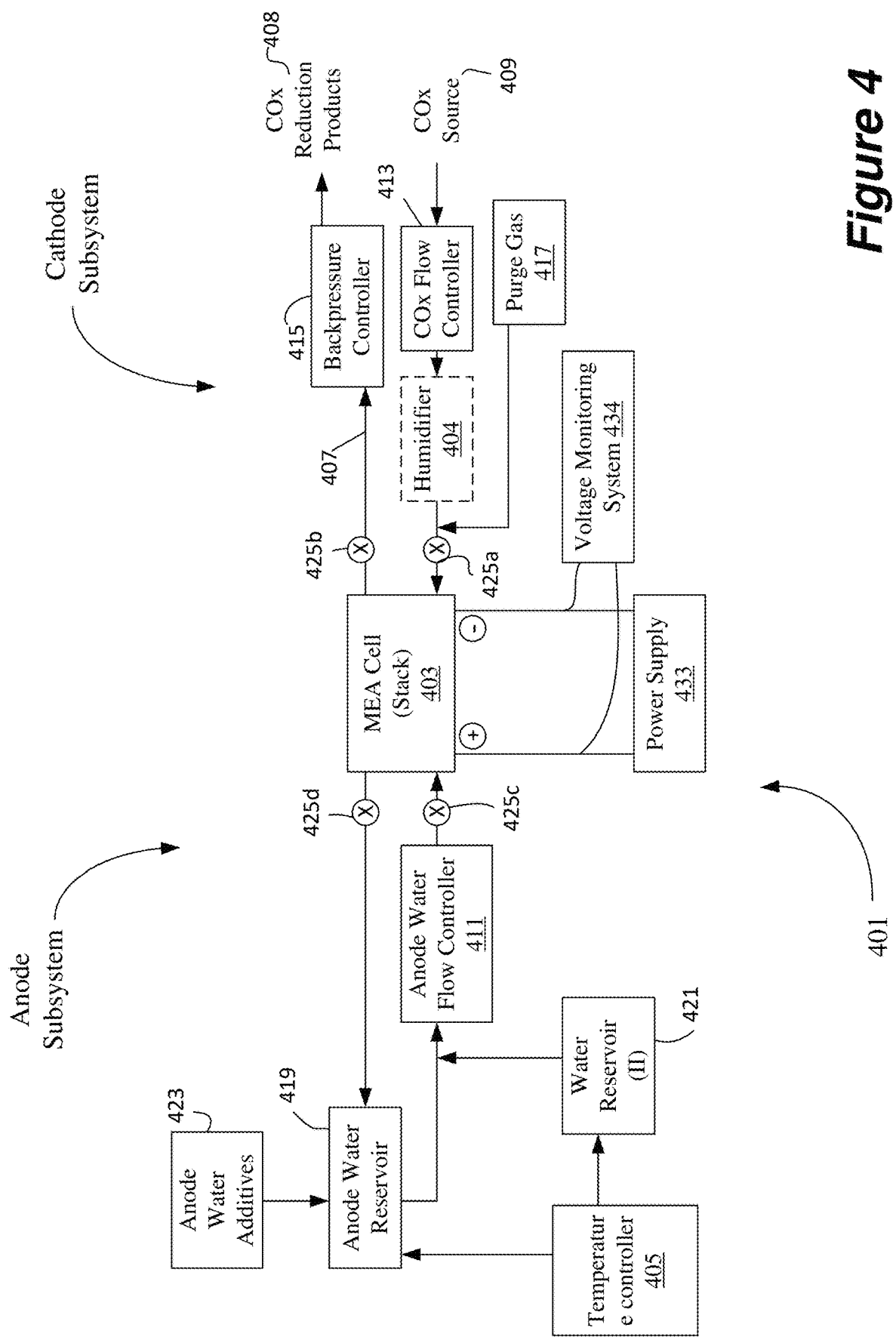
FIG. 4 depicts a system for controlling the operation of a carbon oxide reduction reactor that may include a cell comprising a MEA.

FIG. 4 depicts a system 401 for controlling the operation of a carbon oxide reduction reactor 403 that may include a cell comprising a MEA such as any one or more of those described herein. The reactor may contain multiple cells or MEAs arranged in a stack. System 401 includes an anode subsystem that interfaces with an anode of reduction reactor 403 and a cathode subsystem that interfaces with a cathode of reduction reactor 403. System 401 is an example of a system that may be used with or to implement any of the methods or operating conditions described above.

As depicted, the cathode subsystem includes a carbon oxide source 409 configured to provide a feed stream of carbon oxide to the cathode of reduction reactor 403, which, during operation, may generate an output stream that includes product(s) of a reduction reaction at the cathode. The product stream may also include unreacted carbon oxide and/or hydrogen. See 408.

The carbon oxide source 409 is coupled to a carbon oxide flow controller 413 configured to control the volumetric or mass flow rate of carbon oxide to reduction reactor 403. One or more other components may be disposed on a flow path from flow carbon oxide source 409 to the cathode of reduction reactor 403. For example, an optional humidifier 404 may be provided on the path and configured to humidify the carbon oxide feed stream. Humidified carbon oxide may moisten one or more polymer layers of an MEA and thereby avoid drying such layers. Another component that may be disposed on the flow path is a purge gas inlet coupled to a purge gas source 417. In certain embodiments, purge gas source 417 is configured to provide purge gas during periods when current is paused to the cell(s) of reduction reactor 403. In some implementations, flowing a purge gas over an MEA cathode facilitates recovery of catalyst activity and/or selectivity. This may be due, at least in part, to flushing certain reaction intermediates off catalyst active sites and/or remove water from the cathode. Examples of purge gases include carbon dioxide, carbon monoxide, hydrogen, nitrogen, argon, helium, oxygen, and mixtures of any two or more of these.

During operation, the output stream from the cathode flows via a conduit 407 that connects to a backpressure controller 415 configured to maintain pressure at the cathode side of the cell within a defined range (e.g., about 50 to 800 psig, depending on the system configuration). The output stream may provide the reaction products 408 to one or more components (not shown) for separation and/or concentration.

In certain embodiments, the cathode subsystem is configured to controllably recycle unreacted carbon oxide from the outlet stream back to the cathode of reduction reactor 403. In some implementations, the output stream is processed to remove reduction product(s) and/or hydrogen before recycling the carbon oxide. Depending upon the MEA configuration and operating parameters, the reduction product(s) may be carbon monoxide, hydrogen, hydrocarbons such as methane and/or ethylene, oxygen-containing organic compounds such as formic acid, acetic acid, and any combinations thereof. In certain embodiments, one or more components, not shown, for removing water from the product stream are disposed downstream form the cathode outlet. Examples of such components include a phase separator configured to remove liquid water from the product gas stream and/or a condenser configured to cool the product stream gas and thereby provide a dry gas to, e.g., a downstream process when needed. In some implementations, recycled carbon oxide may mix with fresh carbon oxide from source 409 upstream of the cathode.

As depicted in FIG. 4, an anode subsystem is configured to provide an anode feed stream to an anode side of the carbon oxide reduction reactor 403. In certain embodiments, the anode subsystem includes an anode water source, not shown, configured to provide fresh anode water to a recirculation loop that includes an anode water reservoir 419 and an anode water flow controller 411. The anode water flow controller 411 is configured to control the flow rate of anode water to or from the anode of reduction reactor 403. In the depicted embodiment, the anode water recirculation loop is coupled to components for adjusting the composition of the anode water. These may include a water reservoir 421 and/or an anode water additives source 423. Water reservoir 421 is configured to supply water having a composition that is different from that in anode water reservoir 419 (and circulating in the anode water recirculation loop). In one example, the water in water reservoir 421 is pure water that can dilute solutes or other components in the circulating anode water. Pure water may be conventional deionized water even ultrapure water having a resistivity of, e.g., at least about 15 MOhm-cm or over 18.0 MOhm-cm. Anode water additives source 423 is configured to supply solutes such as salts and/or other components to the circulating anode water.

During operation, the anode subsystem may provide water or other reactant to the anode of reactor 403, where it at least partially reacts to produce an oxidation product such as oxygen. The product along with unreacted anode feed material is provided in a reduction reactor outlet stream. Not shown in FIG. 4 is an optional separation component that may be provided on the path of the anode outlet stream and configured to concentrate or separate the oxidation product from the anode product stream.

Other control features may be included in system 401. For example, a temperature controller may be configured to heat and/or cool the carbon oxide reduction reactor 403 at appropriate points during its operation. In the depicted embodiment, a temperature controller 405 is configured to heat and/or cool anode water provided to the anode water recirculation loop. For example, the temperature controller 405 may include or be coupled to a heater and/or cooler that may heat or cool water in anode water reservoir 419 and/or water in reservoir 421. In some embodiments, system 401 includes a temperature controller configured to directly heat and/or cool a component other than an anode water component. Examples of such other components in the cell or stack and the carbon oxide flowing to the cathode.

Depending upon the phase of the electrochemical operation, including whether current is paused to carbon oxide reduction reactor 403, certain components of system 401 may operate to control non-electrical operations. For example, system 401 may be configured to adjust the flow rate of carbon oxide to the cathode and/or the flow rate of anode feed material to the anode of reactor 403. Components that may be controlled for this purpose may include carbon oxide flow controller 413 and anode water controller 411.

In addition, depending upon the phase of the electrochemical operation including whether current is paused, certain components of system 401 may operate to control the composition of the carbon oxide feed stream and/or the anode feed stream. For example, water reservoir 421 and/or anode water additives source 423 may be controlled to adjust the composition of the anode feed stream. In some cases, additives source 423 may be configured to adjust the concentration of one or more solutes such as one or more salts in an aqueous anode feed stream.

In some cases, a temperature controller such controller 405 is configured to adjust the temperature of one or more components of system 401 based on a phase of operation. For example, the temperature of cell 403 may be increased or decreased during break-in, a current pause in normal operation, and/or storage.

In some embodiments, a carbon oxide electrolytic reduction system is configured to facilitate removal of a reduction cell from other system components. This may be useful with the cell needs to be removed for storage, maintenance, refurbishment, etc. In the depicted embodiments, isolation valves 425a and 425b are configured to block fluidic communication of cell 403 to a source of carbon oxide to the cathode and backpressure controller 415, respectively. Additionally, isolation valves 425c and 425d are configured to block fluidic communication of cell 403 to anode water inlet and outlet, respectively.

The carbon oxide reduction reactor 403 may also operate under the control of one or more electrical power sources and associated controllers. See, block 433. Electrical power source and controller 433 may be programmed or otherwise configured to control current supplied to and/or to control voltage applied to the electrodes in reduction reactor 403. The current and/or voltage may be controlled to execute the current schedules and/or current profiles described elsewhere herein. For example, electrical power source and controller 433 may be configured to periodically pause current applied to the anode and/or cathode of reduction reactor 403. Any of the current profiles described herein may be programmed into power source and controller 433.

In certain embodiments, electric power source and controller 433 performs some but not all the operations necessary to implement desired current schedules and/or profiles in the carbon oxide reduction reactor 403. A system operator or other responsible individual may act in conjunction with electrical power source and controller 433 to fully define the schedules and/or profiles of current applied to reduction reactor 403. For example, an operator may institute one or more current pauses outside the set of current pauses programmed into power source and controller 433.

In certain embodiments, the electrical power source and controller acts in concert with one or more other controllers or control mechanisms associated with other components of system 401. For example, electrical power source and controller 433 may act in concert with controllers for controlling the delivery of carbon oxide to the cathode, the delivery of anode water to the anode, the addition of pure water or additives to the anode water, and any combination of these features. In some implementations, one or more controllers are configured to control or operate in concert to control any combination of the following functions: applying current and/or voltage to reduction cell 403, controlling backpressure (e.g., via backpressure controller 415), supplying purge gas (e.g., using purge gas component 417), delivering carbon oxide (e.g., via carbon oxide flow controller 413), humidifying carbon oxide in a cathode feed stream (e.g., via humidifier 404), flow of anode water to and/or from the anode (e.g., via anode water flow controller 411), and anode water composition (e.g., via anode water source 405, pure water reservoir 421, and/or anode water additives component 423).

In the depicted embodiment, a voltage monitoring system 434 is employed to etermine the voltage across an anode and cathode of an MEA cell or across any two electrodes of a cell stack, e.g., determining the voltage across all cells in a multi-cell stack. The voltage determined in this way can be used to control the cell voltage during a current pause, inform the duration of a pause, etc. In certain embodiments, voltage monitoring system 434 is configured to work in concert with power supply 433 to cause reduction cell 403 to remain within a specified voltage range. For example, power supply 433 may be configured to apply current and/or voltage to the electrodes of reduction cell 403 in a way that maintains the cell voltage within a specified range during a current pause. If, for example during a current pause, the cell's open circuit voltage deviates from a defined range (as determined by voltage monitoring system 434), power supply may be configured to apply current or voltage to the electrodes to maintain the cell voltage within the specified range.

A condition that may trigger protection mode is loss of power to the electrolyzer. Under such a condition, it may be desirable to apply a small current to the electrolyzer while power is otherwise unavailable. To accomplish this, some electrolyzer systems include an uninterruptible power supply (UPS) which may include a power source such as a battery or battery pack having a capacity sufficient to provide at least limited amounts of current to the electrolyzer. As indicated, supplying such current may mitigate problems or potential problems created by unforeseen interruptions such as a power outage.

In some embodiments, a UPS is directly integrated with a carbon oxide electrolyzer or a group of electrolyzers. Some industrial scale carbon oxide electrolyzer systems may employ a dedicated UPS. Examples of industrial scale electrolyzers include those configured to consume at least about 100 kg of carbon dioxide per day. In some cases, such industrial scale carbon oxide electrolysis systems can operate off the power of about 100 kW or greater.

An electrolytic carbon oxide reduction system such as that depicted in FIG. 4 may employ a control system that includes one or more controllers and one or more controllable components such as pumps, sensors, dispensers, valves, and power supplies. Examples of sensors include pressure sensors, temperature sensors, flow sensors, conductivity sensors, voltmeters, ammeters, electrolyte composition sensors including electrochemical instrumentation, chromatography systems, optical sensors such as absorbance measuring tools, and the like. Such sensors may be coupled to inlets and/or outlets of an MEA cell (e.g., in a flow field), in a reservoir for holding anode water, pure water, salt solution, etc., and/or other components of an electrolytic carbon oxide reduction system.

Among the various functions that may be controlled by one or more controllers are: applying current and/or voltage to a carbon oxide reduction cell, controlling backpressure on an outlet from a cathode on such cell, supplying purge gas to a cathode inlet, delivering carbon oxide to the cathode inlet, humidifying carbon oxide in a cathode feed stream, flowing anode water to and/or from the anode, and controller anode feed composition. Any one or more of these functions may have a dedicated controller for controlling its function alone. Any two or more of these functions may share a controller. In some embodiments, a hierarchy of controllers is employed, with at least one master controller providing instructions to two or more component controllers. For example, a system may comprise a master controller configured to provide high level control instructions to (i) a power supply to a carbon oxide reduction cell, (ii) a cathode feed stream flow controller, and (iii) an anode feed stream flow controller. For example, a programmable logic controller (PLC) may be used to control individual components of the system.

In certain embodiments, a control system is configured to apply current to a carbon oxide reduction cell comprising an MEA in accordance with a current schedule, which may have any of the characteristics described herein. For example, the current schedule may provide periodic pauses in the applied current. In some cases, the control system provides the current pauses with defined profiles such as ramps and/or step changes as described herein.

In certain embodiments, a control system is configured to control the flow rate of one or more feed streams (e.g., a cathode feed stream such as a carbon oxide flow and an anode feed stream) in concert with a current schedule. For example, the flow of carbon oxide or a purge gas may be turned on, turned off, or otherwise adjusted when current applied to an MEA cell is paused.

In certain embodiments, a control system may be configured to implement a recovery sequence as described herein. Such control system may be configured to pause or reduce current, flow a recovery gas, flow water or other liquid, dry the cathode, resume normal operation, or any combination thereof. The controller may be configured to control the initiation of a recovery sequence, control the duration of any operation in a recovery sequence, etc.

A controller may include any number of processors and/or memory devices. The controller may contain control logic such software or firmware and/or may execute instructions provided from another source. A controller may be integrated with electronics for controlling operation the electrolytic cell before, during, and after reducing a carbon oxide. The controller may control various components or subparts of one or multiple electrolytic carbon oxide reduction systems. The controller, depending on the processing requirements and/or the type of system, may be programmed to control any of the processes disclosed herein, such as delivery of gases, temperature settings (e.g., heating and/or cooling), pressure settings, power settings (e.g., electrical voltage and/or current delivered to electrodes of an MEA cell), liquid flow rate settings, fluid delivery settings, and dosing of purified water and/or salt solution. These controlled processes may be connected to or interfaced with one or more systems that work in concert with the electrolytic carbon oxide reduction system.

In various embodiments, a controller comprises electronics having various integrated circuits, logic, memory, and/or software that receive instructions, issue instructions, control operations described herein. The integrated circuits may include chips in the form of firmware that store program instructions, digital signal processors (DSPs), chips defined as application specific integrated circuits (ASICs), and/or one or more microprocessors, or microcontrollers that execute program instructions (e.g., software). Program instructions may be instructions communicated to the controller in the form of various individual settings (or program files), defining operational parameters for carrying out a process on one or more components of an electrolytic carbon oxide reduction system. The operational parameters may, in some embodiments, be part of a recipe defined by process engineers to accomplish one or more processing steps during generation of a particular reduction product such as carbon monoxide, hydrocarbons, and/or other organic compounds.

The controller, in some implementations, may be a part of or coupled to a computer that is integrated with, coupled to the system, otherwise networked to the system, or a combination thereof. For example, the controller may utilize instructions stored remotely (e.g., in the "cloud") and/or execute remotely. The computer may enable remote access to the system to monitor current progress of electrolysis operations, examine a history of past electrolysis operations, examine trends or performance metrics from a plurality of electrolysis operations, to change parameters of current processing, to set processing steps to follow a current processing, or to start a new process. In some examples, a remote computer (e.g. a server) can provide process recipes to a system over a network, which may include a local network or the internet. The remote computer may include a user interface that enables entry or programming of parameters and/or settings, which are then communicated to the system from the remote computer. In some examples, the controller receives instructions in the form of data, which specify parameters for each of the processing steps to be performed during one or more operations.

The controller may be distributed, such as by comprising one or more discrete controllers that are networked together and working towards a common purpose, such as applying current to an MEA cell and other process controls described herein. An example of a distributed control system for such purposes includes one or more processors on a system for electrolytically reducing a carbon oxide and one or more processors located remotely (such as at the platform level or as part of a remote computer) that combine to control a process.

Controllers and any of various associated computational elements including processors, memory, instructions, routines, models, or other components are sometimes described or claimed as "configured to" perform a task or tasks. In such contexts, the phrase "configured to" is used to connote structure by indicating that the component includes structure (e.g., stored instructions, circuitry, etc.) that performs a task or tasks during operation. As such, a controller and/or associated component can be said to be configured to perform the task even when the specified component is not necessarily currently operational (e.g., is not on).

Controllers and other components that are "configured to" perform an operation may be implemented as hardware—for example, circuits, memory storing program instructions executable to implement the operation, etc. Additionally, controllers and other components "configured to" perform an operation may be implemented as hardware that is manipulated by software and/or firmware (e.g., an FPGA or a general-purpose processor executing software) to operate in manner that is capable of performing the recited task(s). Additionally, "configured to" can refer to one or more memories or memory elements storing computer executable instructions for performing the recited task(s). Such memory elements may include memory on a computer chip having processing logic.

MEA Design Embodiments

MEA Overview

In various embodiments, an MEA contains an anode layer, a cathode layer, electrolyte, and optionally one or more other layers. The layers may be solids and/or gels. The layers may include polymers such as ion-conducting polymers.

When in use, the cathode of an MEA promotes electrochemical reduction of $CO_x$ by combining three inputs: $CO_x$, ions (e.g., protons) that chemically react with CON, and electrons. The reduction reaction may produce CO, hydrocarbons, and/or oxygen and hydrogen containing organic compounds such as methanol, ethanol, and acetic acid. When in use, the anode of an MEA promotes an electrochemical oxidation reaction such as electrolysis of water to produce elemental oxygen and protons. The cathode and anode may each contain catalysts to facilitate their respective reactions.

The compositions and arrangements of layers in the MEA may promote high yield of a $CO_x$ reduction products. To this end, the MEA may facilitate any one or more of the following conditions: (a) minimal parasitic reduction reactions (non-$CO_x$ reduction reactions) at the cathode; (b) low loss of $CO_x$, reactants at anode or elsewhere in the MEA; (c) maintain physical integrity of the MEA during the reaction (e.g., prevent delamination of the MEA layers); (d) prevent $CO_x$ reduction product cross-over; (e) prevent oxidation production (e.g., $O_2$) cross-over; (f) maintain a suitable environment at the cathode for oxidation; (g) provide pathway for desired ions to travel between cathode and anode while blocking undesired ions; and (h) minimize voltage losses. As explained herein, the presence of salts or salt ions in the MEA can facilitate some of all of these conditions.

$CO_x$ Reduction Considerations

Polymer-based membrane assemblies such as MEAs have been used in various electrolytic systems such as water electrolyzers and in various galvanic systems such as fuel cells. However, $CO_x$ reduction presents problems not encountered, or encountered to a lesser extent, in water electrolyzers and fuel cells.

For example, for many applications, an MEA for $CO_x$ reduction requires a lifetime on the order of about 50,000 hours or longer (approximately five years of continuous operation), which is significantly longer than the expected lifespan of a fuel cell for automotive applications; e.g., on the order of 5,000 hours. And for various applications, an MEA for $CO_x$ reduction employs electrodes having a relatively large surface area by comparison to MEAs used for fuel cells in automotive applications. For example, MEAs for $CO_x$ reduction may employ electrodes having surface areas (without considering pores and other nonplanar features) of at least about 500 $cm^2$.

$CO_x$ reduction reactions may be implemented in operating environments that facilitate mass transport of particular reactant and product species, as well as to suppress parasitic reactions. Fuel cell and water electrolyzer MEAs often cannot produce such operating environments. For example, such MEAs may promote undesirable parasitic reactions such as gaseous hydrogen evolution at the cathode and/or gaseous $CO_2$ production at the anode.

In some systems, the rate of a $CO_x$ reduction reaction is limited by the availability of gaseous $CO_x$ reactant at the cathode. By contrast, the rate of water electrolysis is not significantly limited by the availability of reactant: liquid water tends to be easily accessible to the cathode and anode, and electrolyzers can operate close to the highest current density possible.

MEA Configurations

In certain embodiments, an MEA has a cathode layer, an anode layer, and a polymer electrolyte membrane (PEM) between the anode layer and the cathode layer. The polymer electrolyte membrane provides ionic communication between the anode layer and the cathode layer, while preventing electronic communication, which would produce a short circuit. The cathode layer includes a reduction catalyst and a first ion-conducting polymer. The cathode layer may also include an ion conductor and/or an electron conductor. The anode layer includes an oxidation catalyst and a second ion-conducting polymer. The anode layer may also include an ion conductor and/or an electron conductor. The PEM includes a third ion-conducting polymer.

In certain embodiments, the MEA has a cathode buffer layer between the cathode layer and the polymer electrolyte membrane. The cathode buffer includes a fourth ion-conducting polymer.

In certain embodiments, the MEA has an anode buffer layer between the anode layer and the polymer electrolyte membrane. The anode buffer includes a fifth ion-conducting polymer.

In connection with certain MEA designs, there are three available classes of ion-conducting polymers: anion-conductors, cation-conductors, and mixed cation-and-anion-conductors. In certain embodiments, at least two of the first, second, third, fourth, and fifth ion-conducting polymers are from different classes of ion-conducting polymers.

Ion-Conducting Polymers for MEA Layers

The term "ion-conducting polymer" is used herein to describe a polymer electrolyte having greater than about 1 mS/cm specific conductivity for anions and/or cations. The term "anion-conductor" describes an ion-conducting polymer that conducts anions primarily (although there will still be some small amount of cation conduction) and has a transference number for anions greater than about 0.85 at around 100 micron thickness. The terms "cation-conductor" and/or "cation-conducting polymer" describe an ion-conducting polymer that conducts cations primarily (e.g., there can still be an incidental amount of anion conduction) and has a transference number for cations greater than approximately 0.85 at about 100 micron thickness. For an ion-conducting polymer that is described as conducting both anions and cations (a "cation-and-anion-conductor"), neither the anions nor the cations have a transference number greater than approximately 0.85 or less than approximately 0.15 at about 100 micron thickness. To say a material conducts ions (anions and/or cations) is to say that the material is an ion-conducting material or ionomer. Examples of ion-conducting polymers of each class are provided in the below Table 1.

TABLE 1

Ion-Conducting Polymers

| Class | Description | Common Features | Examples |
|---|---|---|---|
| A. Anion-conducting | Greater than approximately 1 mS/cm specific conductivity for anions, which have a transference number greater than approximately 0.85 at around 100 micron thickness | Positively charged functional groups are covalently bound to the polymer backbone | aminated tetramethyl polyphenylene; poly(ethylene-co-tetrafluoroethylene)-based quaternary ammonium polymer; quaternized polysulfone |
| B. Conducts both anions and cations | Greater than approximately 1 mS/cm conductivity for ions (including both cations and anions), which have a transference number between approximately 0.15 and 0.85 at around 100 micron thickness | Salt is soluble in the polymer and the salt ions can move through the polymer material | polyethylene oxide; polyethylene glycol; poly(vinylidene fluoride); polyurethane |
| C. Cation-conducting | Greater than approximately 1 mS/cm specific conductivity for cations, which have a transference number greater than approximately 0.85 at around 100 micron thickness | Negatively charged functional groups are covalently bound to the polymer backbone | perfluorosulfonic acid polytetrafluoroethylene co-polymer; sulfonated poly(ether ether ketone); poly(styrene sulfonic acid- co-maleic acid) |

Polymeric Structures

Examples of polymeric structures that can include an ionizable moiety or an ionic moiety and be used as ion-conducting polymers in the MEAs described here are provided below. The ion-conducting polymers may be used as appropriate in any of the MEA layers that include an ion-conducting polymer. Charge conduction through the material can be controlled by the type and amount of charge (e.g., anionic and/or cationic charge on the polymeric structure) provided by the ionizable/ionic moieties. In addition, the composition can include a polymer, a homopolymer, a copolymer, a block copolymer, a polymeric blend, other polymer-based forms, or other useful combinations of repeating monomeric units. As described below, an ion conducting polymer layer may include one or more of crosslinks, linking moieties, and arylene groups according to various embodiments. In some embodiments, two or more ion conducting polymers (e.g., in two or more ion conducting polymer layers of the MEA) may be crosslinked.

Non-limiting monomeric units can include one or more of the following:

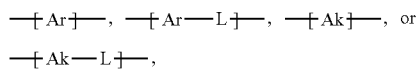

in which Ar is an optionally substituted arylene or aromatic; Ak is an optionally substituted alkylene, haloalkylene, aliphatic, heteroalkylene, or heteroaliphatic; and L is a linking moiety (e.g., any described herein) or can be $-C(R^7)(R^8)-$. Yet other non-limiting monomeric units can include optionally substituted arylene, aryleneoxy, alkylene, or combinations thereof, such as optionally substituted (aryl)(alkyl)ene (e.g., -Ak-Ar— or -Ak-Ar-Ak- or —Ar-Ak-, in which Ar is an optionally substituted arylene and Ak is an optionally substituted alkylene). One or more monomeric units can be optionally substituted with one or more ionizable or ionic moieties (e.g., as described herein).

One or more monomeric units can be combined to form a polymeric unit. Non-limiting polymeric units include any of the following:

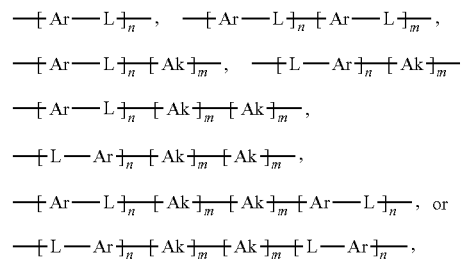

in which Ar, Ak, L, n, and m can be any described herein. In some embodiments, each m is independently 0 or an integer of 1 or more. In other embodiments, Ar can include two or more arylene or aromatic groups.

Other alternative configurations are also encompassed by the compositions herein, such as branched configurations, diblock copolymers, triblock copolymers, random or statistical copolymers, stereoblock copolymers, gradient copolymers, graft copolymers, and combinations of any blocks or regions described herein.

Examples of polymeric structures include those according to any one of formulas (I)-(V) and (X)-(XXXIV), or a salt thereof. In some embodiments, the polymeric structures are copolymers and include a first polymeric structure selected from any one of formulas (I)-(V) or a salt thereof and a second polymeric structure including an optionally substituted aromatic, an optionally substituted arylene, a structure selected from any one of formulas (I)-(V) and (X)-(XXXIV), or a salt thereof.

In one embodiment, the MW of the ion-conducting polymer is a weight-average molecular weight (Mw) of at least 10,000 g/mol; or from about 5,000 to 2,500,000 g/mol. In another embodiment, the MW is a number average molecular weight (Mn) of at least 20,000 g/mol; or from about 2,000 to 2,500,000 g/mol.

In any embodiment herein, each of n, n1, n2, n3, n4, m, m1, m2, or m3 is, independently, 1 or more, 20 or more, 50 or more, 100 or more; as well as from 1 to 1,000,000, such as from 10 to 1,000,000, from 100 to 1,000,000, from 200 to 1,000,000, from 500 to 1,000,000, or from 1,000 to 1,000,000.

Non-limiting polymeric structures can include the following:

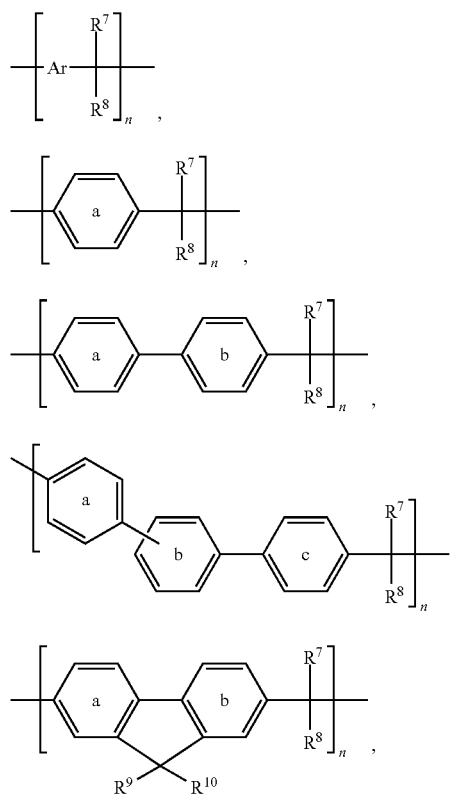

or a salt thereof, wherein:

each of $R^7$, $R^8$, $R^9$, and $R^{10}$ is, independently, an electron-withdrawing moiety, H, optionally substituted aliphatic, alkyl, heteroaliphatic, heteroalkylene, aromatic, aryl, or arylalkylene, wherein at least one of $R^7$ or $R^8$ can include the electron-withdrawing moiety or wherein a combination of $R^7$ and $R^8$ or $R^9$ and $R^{10}$ can be taken together to form an optionally substituted cyclic group;

Ar comprises or is an optionally substituted aromatic or arylene (e.g., any described herein);

each of n is, independently, an integer of 1 or more;

each of rings a-c can be optionally substituted; and rings a-c, $R^7$, $R^8$, $R^9$, and $R^{10}$ can optionally comprise an ionizable or ionic moiety.

Further non-limiting polymeric structures can include one or more of the following:

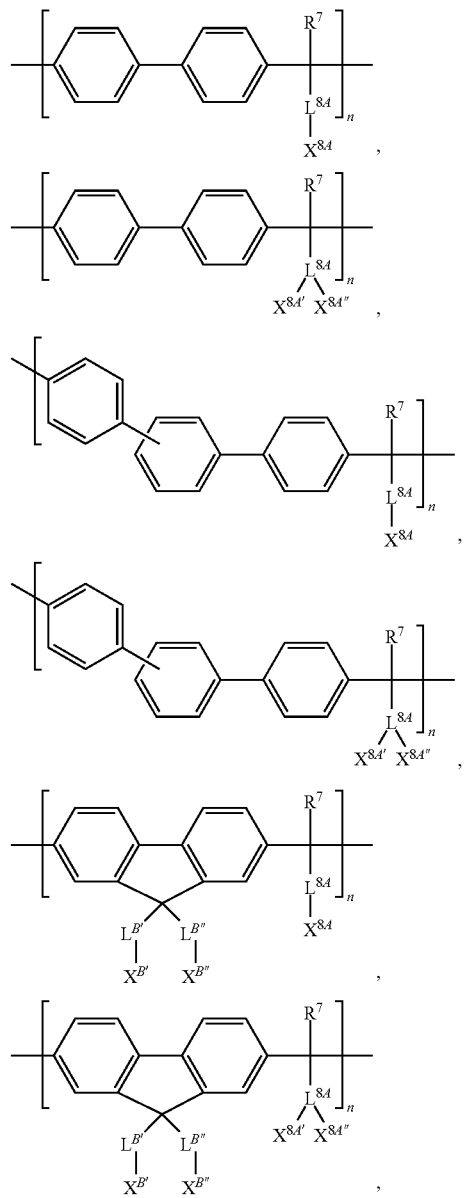

or a salt thereof, wherein:

$R^7$ can be any described herein (e.g., for formulas (I)-(V));

n is from 1 or more;

each $L^{8A}$, $L^{B'}$, and $L^{B''}$ is, independently, a linking moiety; and each $X^{8A}$, $X^{8A'}$, $X^{8A''}$, $X^{B'}$, and $X^{B''}$ is, independently, an ionizable or ionic moiety.

Yet other polymeric structures include the following:
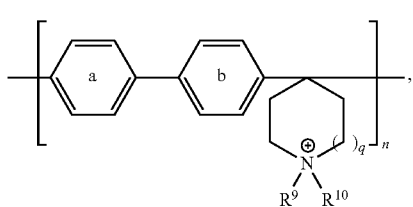
(X)
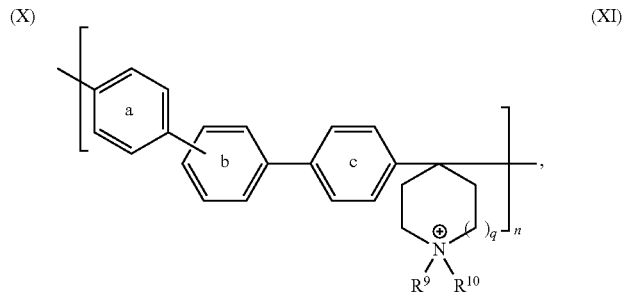
(XI)
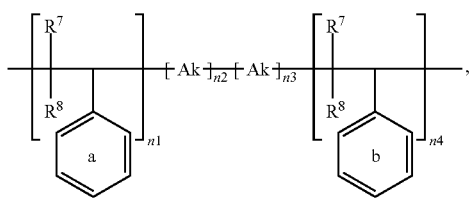
(XII)
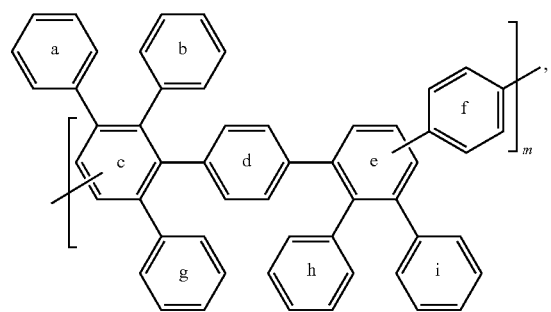
(XIII)
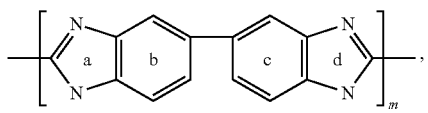
(XIV)
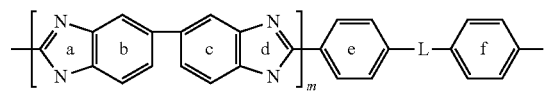
(XV)
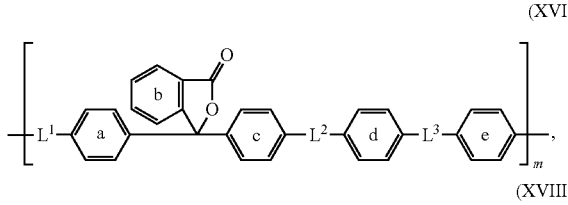
(XVI)
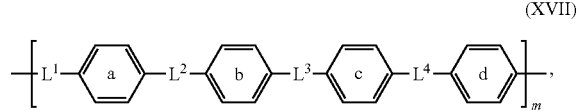
(XVII)
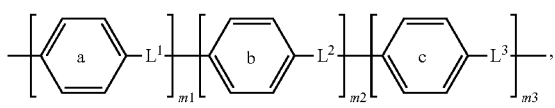
(XVIII)
(XIX)
(XX)
(XXI)
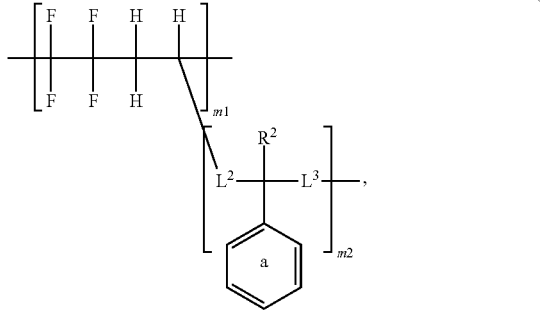

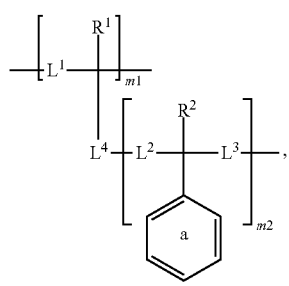 (XXII)
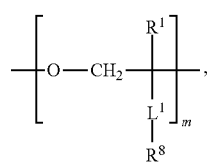 (XXIII)
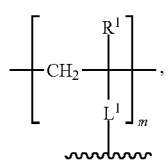 (XXIV)
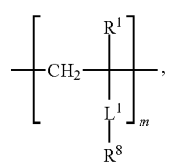 (XXV)
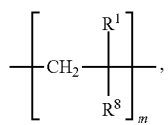 (XXVI)
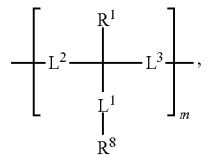 (XXVII)
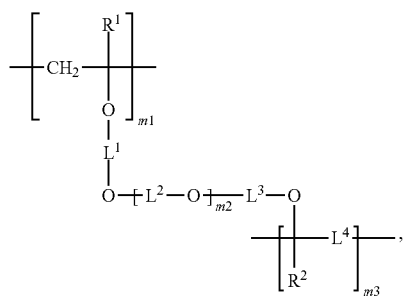 (XXVIII)
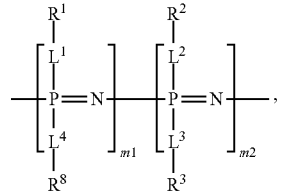 (XXIX)
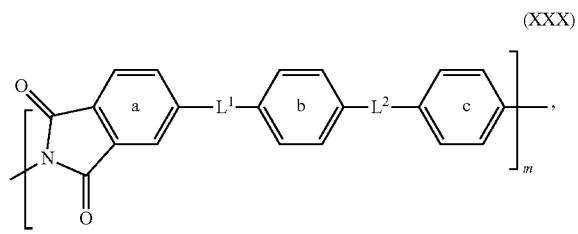 (XXX)
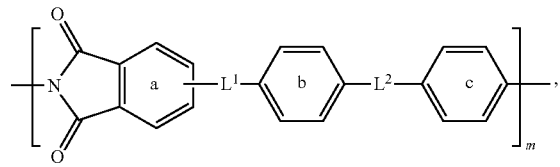 (XXXI)
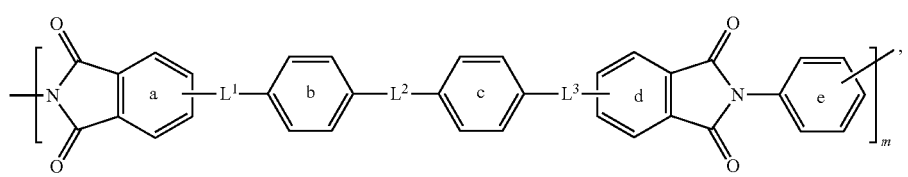 (XXXII)
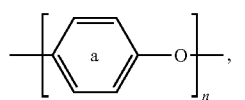 (XXXIII)
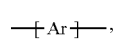 (XXXIV)

or a salt thereof, wherein:
- each of $R^1$, $R^2$, $R^3$, $R^7$, $R^8$, $R^9$, and $R^{10}$ is, independently, an electron-withdrawing moiety, H, optionally substituted aliphatic, alkyl, heteroaliphatic, heteroalkylene, aromatic, aryl, or arylalkylene, wherein at least one of $R^7$ or $R^8$ can include the electron-withdrawing moiety or wherein a combination of $R^7$ and $R^8$ or $R^9$ and $R^{10}$ can be taken together to form an optionally substituted cyclic group;
- each Ak is or comprises an optionally substituted aliphatic, alkylene, haloalkylene, heteroaliphatic, or heteroalkylene;
- each Ar is or comprises an optionally substituted arylene or aromatic;
- each of L, $L^1$, $L^2$, $L^3$, and $L^4$ is, independently, a linking moiety;
- each of n, n1, n2, n3, n4, m, m1, m2, and m3 is, independently, an integer of 1 or more; q is 0, 1, 2, or more;
- each of rings a-i can be optionally substituted; and
- rings a-i, $R^7$, $R^8$, $R^9$, and $R^{10}$ can optionally include an ionizable or ionic moiety.

In particular embodiments (e.g., of formula (XIV) or (XV)), each of the nitrogen atoms on rings a and/or b are substituted with optionally substituted aliphatic, alkyl, aromatic, aryl, an ionizable moiety, or an ionic moiety. In some embodiments, one or more hydrogen or fluorine atoms (e.g., in formula (XIX) or (XX)) can be substituted to include an ionizable moiety or an ionic moiety (e.g., any described herein). In other embodiments, the oxygen atoms present in the polymeric structure (e.g., in formula XXVIII) can be associated with an alkali dopant (e.g., $K^+$).

In particular examples, Ar, one or more of rings a-i (e.g., rings a, b, f, g, h, or i), L, $L^1$, $L^2$, $L^3$, $L^4$, Ak, $R^7$, $R^8$, $R^9$, and/or $R^{10}$ can be optionally substituted with one or more ionizable or ionic moieties and/or one or more electron-withdrawing groups. Yet other non-limiting substituents for Ar, rings (e.g., rings a-i), L, Ak, $R^7$, $R^8$, $R^9$, and $R^{10}$ include one or more described herein, such as cyano, hydroxy, nitro, and halo, as well as optionally substituted aliphatic, alkyl, alkoxy, alkoxyalkyl, amino, aminoalkyl, aryl, arylalkylene, aryloyl, aryloxy, arylalkoxy, hydroxyalkyl, and haloalkyl.

In some embodiments, each of $R^1$, $R^2$, and $R^3$ is, independently, H, optionally substituted aromatic, aryl, aryloxy, or arylalkylene. In other embodiments (e.g., of formulas (I)-(V) or (XII)), $R^7$ includes the electron-withdrawing moiety. In yet other embodiments, $R^8$, $R^9$, and/or $R^{10}$ includes an ionizable or ionic moiety.

In one instance, a polymeric subunit can lack ionic moieties. Alternatively, the polymeric subunit can include an ionic moiety on the Ar group, the L group, both the Ar and L groups, or be integrated as part of the L group. Non-limiting examples of ionizable and ionic moieties include cationic, anionic, and multi-ionic group, as described herein.

In any embodiment herein, the electron-withdrawing moiety can include or be an optionally substituted haloalkyl, cyano (CN), phosphate (e.g., —O(P=O)($OR^{P1}$)($OR^{P2}$) or —O—[P(=O)($OR^{P1}$)—O]$_{p3}$—$R^{P2}$), sulfate (e.g., —O—S(=O)$_2$($OR^{S1}$)), sulfonic acid (—$SO_3$H), sulfonyl (e.g., —$SO_2$—$CF_3$), difluoroboranyl (—$BF_2$), borono (B(OH)$_2$), thiocyanato (—SCN), or piperidinium. Yet other non-limiting phosphate groups can include derivatives of phosphoric acid, such as orthophosphoric acid, pyrophosphoric acid, tripolyphosphoric acid, tetrapolyphosphoric acid, trimetaphosphoric acid, and/or phosphoric anhydride, or combinations thereof.

Yet other polymeric units can include poly(benzimidazole) (PBI), polyphenylene (PP), polyimide (PI), poly(ethyleneimine) (PEI), sulfonated polyimide (SPI), polysulfone (PSF), sulfonated polysulfone (SPSF), poly(ether ether ketone) (PEEK), PEEK with cardo groups (PEEK-WC), polyethersulfone (PES), sulfonated polyethersulfone (SPES), sulfonated poly(ether ether ketone) (SPEEK), SPEEK with cardo groups (SPEEK-WC), poly(p-phenylene oxide) (PPO), sulfonated polyphenylene oxide (SPPO), ethylene tetrafluoroethylene (ETFE), polytetrafluoroethylene (PTFE), poly(epichlorohydrin) (PECH), poly(styrene) (PS), sulfonated poly(styrene) (SPS), hydrogenated poly(butadiene-styrene) (HPBS), styrene divinyl benzene copolymer (SDVB), styrene-ethylene-butylene-styrene (SEBS), sulfonated bisphenol-A-polysulfone (SPSU), poly(4-phenoxy benzoyl-1,4-phenylene) (PPBP), sulfonated poly(4-phenoxy benzoyl-1,4-phenylene) (SPPBP), poly(vinyl alcohol) (PVA), poly(phosphazene), poly(aryloxyphosphazene), polyetherimide, as well as combinations thereof.

Bipolar MEA for COx Reduction

In certain embodiments, the MEA includes a bipolar interface with an anion-conducting polymer on the cathode side of the MEA and an interfacing cation-conducting polymer on the anode side of the MEA. In some implementations, the cathode contains a first catalyst and an anion-conducting polymer. In certain embodiments, the anode contains a second catalyst and a cation-conducting polymer. In some implementations, a cathode buffer layer, located between the cathode and PEM, contains an anion-conducting polymer. In some embodiments, an anode buffer layer, located between the anode and PEM, contains a cation-conducting polymer.

During operation, an MEA with a bipolar interface moves ions through a polymer-electrolyte, moves electrons through metal and/or carbon in the cathode and anode layers, and moves liquids and gas through pores in the layers.

In embodiments employing an anion-conducting polymer in the cathode and/or in a cathode buffer layer, the MEA can decrease or block unwanted reactions that produce undesired products and decrease the overall efficiency of the cell. In embodiments employing a cation-conducting polymer in the anode and/or in an anode buffer layer can decrease or block unwanted reactions that reduce desired product production and reduce the overall efficiency of the cell.

For example, at levels of electrical potential used for cathodic reduction of $CO_2$, hydrogen ions may be reduced to hydrogen gas. This is a parasitic reaction; current that could be used to reduce $CO_2$ is used instead to reduce hydrogen ions. Hydrogen ions may be produced by various oxidation reactions performed at the anode in a $CO_2$ reduction reactor and may move across the MEA and reach the cathode where they can be reduced to produce hydrogen gas. The extent to which this parasitic reaction can proceed is a function of the concentration of hydrogen ions present at the cathode. Therefore, an MEA may employ an anion-conducting material in the cathode layer and/or in a cathode buffer layer. The anion-conducting material at least partially blocks hydrogen ions from reaching catalytic sites on the cathode. As a result, parasitic production of hydrogen gas generation is decreased and the rate of CO or other product production and the overall efficiency of the process are increased.

Another reaction that may be avoided is reaction of carbonate or bicarbonate ions at the anode to produce $CO_2$. Aqueous carbonate or bicarbonate ions may be produced from $CO_2$ at the cathode. If such ions reach the anode, they may react with hydrogen ions to produce and release gaseous $CO_2$. The result is net movement of $CO_2$ from the cathode to the anode, where it does not react and is lost with oxidation products. To prevent the carbonate and bicarbonate ion produced at the cathode from reaching the anode, the anode and/or an anode buffer layer may include a cation-conducting polymer, which at least partially blocks the transport of negative ions such as bicarbonate ions to the anode.

Thus, in some designs, a bipolar membrane structure raises the pH at the cathode to facilitate $CO_2$ reduction while a cation-conducting polymer such as a proton-exchange layer prevents the passage of significant amounts of $CO_2$ and $CO_2$ reduction products (e.g., bicarbonate) to the anode side of the cell.

Figure 5:
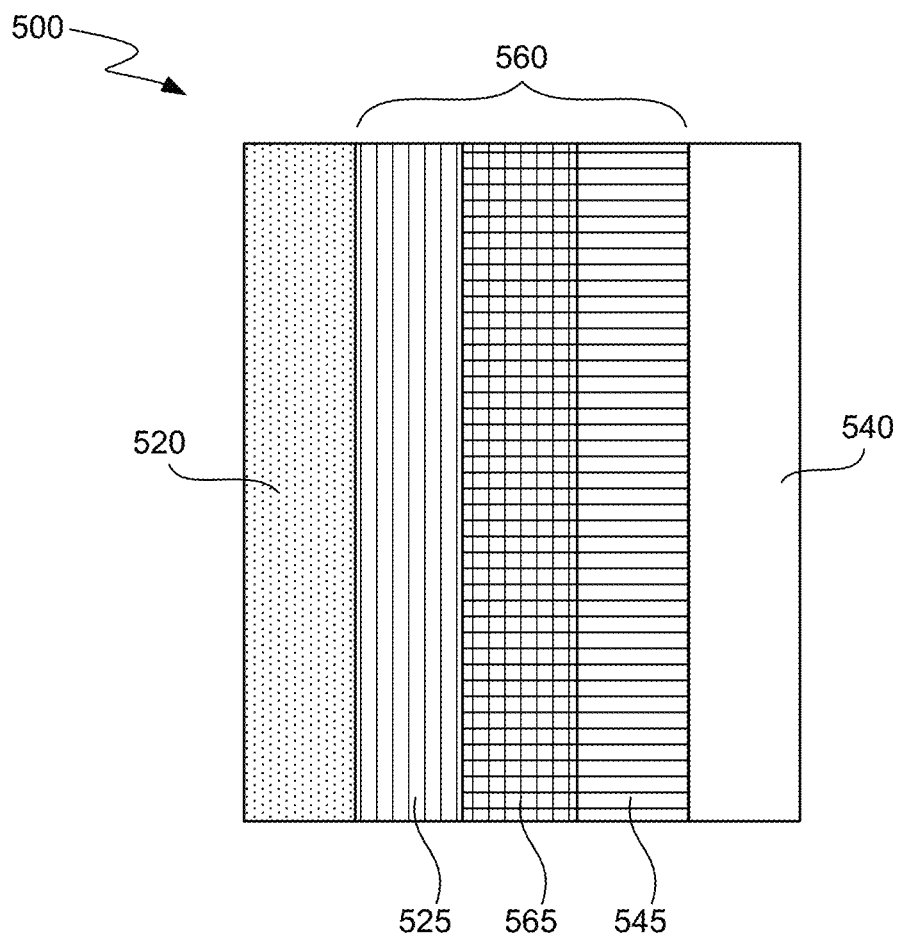
FIG. 5 illustrates an example MEA for use in $CO_x$ reduction.

An example MEA 500 for use in $CO_x$ reduction is shown in FIG. 5. The MEA 500 has a cathode layer 520 and an anode layer 540 separated by an ion-conducting polymer layer 560 that provides a path for ions to travel between the cathode layer 520 and the anode layer 540. In certain embodiments, the cathode layer 520 includes an anion-conducting polymer and/or the anode layer 540 includes a cation-conducting polymer. In certain embodiments, the cathode layer and/or the anode layer of the MEA are porous. The pores may facilitate gas and/or fluid transport and may increase the amount of catalyst surface area that is available for reaction.

The ion-conducting layer 560 may include two or three sublayers: a polymer electrolyte membrane (PEM) 565, an optional cathode buffer layer 525, and/or an optional anode buffer layer 545. One or more layers in the ion-conducting layer may be porous. In certain embodiments, at least one layer is nonporous so that reactants and products of the cathode cannot pass via gas and/or liquid transport to the anode and vice versa. In certain embodiments, the PEM layer 565 is nonporous. Example characteristics of anode buffer layers and cathode buffer layers are provided elsewhere herein. In certain embodiments, the ion-conducting layer includes only a single layer or two sublayers.

In some embodiments, a carbon oxide electrolyzer anode contains a blend of oxidation catalyst and an anode ion-conducting polymer. There are a variety of oxidation reactions that can occur at the anode depending on the reactant that is fed to the anode and the anode catalyst(s). In one arrangement, the oxidation catalyst is selected from the group consisting of metals and oxides of Ir, Pt, Ni, Ru, Pd, Au, and alloys thereof, IrRu, PtIr, Ni, NiFe, stainless steel, and combinations thereof. The oxidation catalyst can further contain conductive support particles selected from the group consisting of carbon, boron-doped diamond, and titanium.

The oxidation catalyst can be in the form of a structured mesh or can be in the form of particles. If the oxidation catalyst is in the form of particles, the particles can be supported by electronically conductive support particles. The conductive support particles can be nanoparticles. The conductive support particles may be compatible with the chemicals that are present in an electrolyzer anode when the CRR is operating and are oxidatively stable so that they do not participate in any electrochemical reactions. It is especially useful if the conductive support particles are chosen with the voltage and the reactants at the anode in mind. In some arrangements, the conductive support particles are titanium, which is well-suited for high voltages. In other arrangements, the conductive support particles are carbon, which can be most useful at low voltages. In general, such conductive support particles are larger than the oxidation catalyst particles, and each conductive support particle can support many oxidation catalyst particles. In one arrangement, the oxidation catalyst is iridium ruthenium oxide.

Examples of other materials that can be used for the oxidation catalyst include, but are not limited to, those listed above. It should be understood that many of these metal catalysts can be in the form of oxides, especially under reaction conditions.

In some embodiments, the MEA has an anode layer comprising oxidation catalyst and a second ion-conducting polymer. The second ion-conducting polymer can comprise one or more polymers that contain covalently bound, negatively charged functional groups configured to transport mobile positively charged ions. The second ion-conducting polymer can be selected from the group consisting of ethanesulfonyl fluoride, 2-[1-[difluoro-[(trifluoroethenyl)oxy]methyl]-1,2,2,2-tetrafluoroethoxy]-1,1,2,2,-tetrafluoro-, with tetrafluoroethylene, tetrafluoroethylene-perfluoro-3,6-dioxa-4-methyl-7-octenesulfonic acid copolymer, other perfluorosulfonic acid polymers and blends thereof. Examples of cation-conducting polymers include e.g., Nafion 115, Nafion 117, and/or Nafion 211.

There may be tradeoffs in choosing the amount of ion-conducting polymer in the anode. It is important to include enough anode ion-conducting polymer to provide sufficient ionic conductivity. But it is also important for the anode to be porous so that reactants and products can move through it easily, and to maximize the amount of catalyst surface area that is available for reaction. In various arrangements, the ion-conducting polymer in the anode makes up approximately 50 wt % of the layer or between approximately 5 and 20 wt %, 10 and 90 wt %, between 20 and 80 wt %, between 25 and 70 wt %, or any suitable range. It is especially useful if the anode 240 can tolerate high voltages, such as voltages above about 1.2 V vs. a reversible hydrogen electrode. It is especially useful if the anode 240 is porous in order to maximize the amount of catalyst surface area available for reaction and to facilitate gas and liquid transport.

In one example of a metal catalyst, Ir or IrOx particles (100-200 nm) and Nafion ionomer form a porous layer approximately 10 μm thick. Metal catalyst loading is approximately 0.5-3 $g/cm^2$.

In some embodiments, NiFeOx is used for basic reactions.
PEM

MEAs may include a polymer electrolyte membrane (PEM) disposed between and conductively coupled to the anode catalyst layer and the cathode catalyst layer. In certain embodiments, a polymer electrolyte membrane has high ionic conductivity (e.g., greater than about 1 mS/cm) and is mechanically stable. Mechanical stability can be evidenced in a variety of ways such as through high tensile strength, modulus of elasticity, elongation to break, and tear resistance. Many commercially available membranes can be used for the polymer electrolyte membrane. Examples include, but are not limited to, various Nafion® formulations, GORE-SELECT, FumaPEM® (PFSA) (FuMA-Tech GmbH), and Aquivion® (PFSA) (Solvay).

In one arrangement, the PEM comprises at least one ion-conducting polymer that is a cation-conductor. The third ion-conducting polymer can comprise one or more covalently-bound, negatively-charged functional groups configured to transport mobile positively-charged ions. The third ion-conducting polymer can be selected from the group consisting of ethanesulfonyl fluoride, 2-[1-[difluoro-[(trifluoroethenyl)oxy]methyl]-1,2,2,2-tetrafluoroethoxy]-1,1,2,2,-tetrafluoro-, with tetrafluoro ethylene, tetrafluoro ethylene-perfluoro-3,6-dioxa-4-methyl-7-octenesulfonic acid copolymer, other perfluorosulfonic acid polymers and blends thereof.

Cathode Buffer Layer

When the polymer electrolyte membrane is a cation conductor (e.g., it conducts protons), it may contain a high concentration of protons during operation of the CRR, while a cathode may operate better when a low concentration of protons is present. A cathode buffer layer may be provided between the polymer electrolyte membrane and the cathode to provide a region of transition from a high concentration of protons to a low concentration of protons. In one arrangement, a cathode buffer layer is an ion-conducting polymer with many of the same properties as the ion-conducting polymer in the cathode. A cathode buffer layer may provide a region for the proton concentration to transition from a polymer electrolyte membrane, which has a high concentration of protons, to the cathode, which has a low proton concentration. Within the cathode buffer layer, protons from the polymer electrolyte membrane may encounter anions from the cathode, and they may neutralize one another. The cathode buffer layer may help ensure that a deleterious number of protons from the polymer electrolyte membrane does not reach the cathode and raise the proton concentration. If the proton concentration of the cathode is too high, $CO_x$ reduction does not occur. A high proton concentration may be a concentration in the range of about 10 to 0.1 molar and low proton concentration may be a concentration of less than about 0.01 molar.

A cathode buffer layer can include a single polymer or multiple polymers. If the cathode buffer layer includes multiple polymers, the multiple polymers can be mixed together or can be arranged in separate, adjacent layers. Examples of materials that can be used for the cathode buffer layer include, but are not limited to, FumaSep FAA-3, Tokuyama anion exchange membrane material, and polyether-based polymers, such as polyethylene oxide (PEO), and blends thereof. Further examples are given above in the discussion of the cathode catalyst layer.

The thickness of the cathode buffer layer is chosen to be sufficient that $CO_x$ reduction activity is high due to the proton concentration being low. This sufficiency can be different for different cathode buffer layer materials. In general, the thickness of the cathode buffer layer is between approximately 200 nm and 100 μm, between 300 nm and 75 μm, between 500 nm and 50 μm, or any suitable range.

In some embodiments, the cathode buffer layer is less than 50 μm, for example between 1-25 μm such between 1-5 μm, 5-15 μm, or 10-25 μm. By using a cathode buffer layer in this range of thicknesses, the proton concentration in the cathode can be reduced while maintaining the overall conductivity of the cell. In some embodiments, an ultra-thin layer (100 nm-1 μm and in some embodiments, sub-micron) may be used. And as discussed above, in some embodiments, the MEA does not have a cathode buffer layer. In some such embodiments, anion-conducting polymer in the cathode catalyst layer is sufficient. The thickness of the cathode buffer layer may be characterized relative to that of the PEM.

Water and $CO_2$ formed at the interface of a cathode buffer layer and a PEM can delaminate the MEA where the polymer layers connect. The delamination problem can be addressed by employing a cathode buffer layer having inert filler particles and associated pores. One possible explanation of its effectiveness is that the pores create paths for the gaseous carbon dioxide to escape back to the cathode where it can be reduced.

Materials that are suitable as inert filler particles include, but are not limited to, $TiO_2$, silica, PTFE, zirconia, and alumina. In various arrangements, the size of the inert filler particles is between 5 nm and 500 μm, between 10 nm and 100 μm, or any suitable size range. The particles may be generally spherical.

If PTFE (or other filler) volume is too high, it will dilute the polymer electrolyte to the point where ionic conductivity is low. Too much polymer electrolyte volume will dilute the PTFE to the point where it does not help with porosity. In many embodiments a mass ratio of polymer electrolyte/PTFE is 0.25 to 2, and more particularly, 0.5 to 1. A volume ratio polymer electrolyte/PTFE (or, more generally, polymer electrolyte/inert filler) may be 0.25 to 3, 0.5 to 2, 0.75 to 1.5, or 1.0 to 1.5.

In other arrangements, porosity is achieved by using particular processing methods when the layers are formed. One example of such a processing method is laser ablation, where nano to micro-sized channels are formed in the layers. Another example is mechanically puncturing a layer to form channels through it.

In one arrangement, the cathode buffer layer has a porosity between 0.01% and 95% (e.g., approximately between, by weight, by volume, by mass, etc.). However, in other arrangements, the cathode buffer layer can have any suitable porosity (e.g., between 0.01-95%, 0.1-95%, 0.01-75%, 1-95%, 1-90%). In some embodiments, the porosity is 50% or less, e.g., 0.1-50%, 5-50%, 20-50%, 5-40%, 10-40%, 20-40%, or 25%-40%. In some embodiments, the porosity is 20% or below, e.g. 0.1-20%, 1-10%, or 5-10%.

Porosity may be measured as described above with respect to the catalyst layer, including using mass loadings and thicknesses of the components, by methods such as mercury porosimetry, x-ray diffraction (SAXS or WAXS), and image processing on TEM images to calculate filled space vs. empty space. Porosity is measured when the MEA is completely dry as the materials swell to varying degrees when exposed to water during operation.

Porosity in layers of the MEA, including the cathode buffer layer, is described further below.

Anode Buffer Layer

In some CRR reactions, bicarbonate is produced at the cathode. It can be useful if there is a polymer that blocks bicarbonate transport somewhere between the cathode and the anode, to prevent migration of bicarbonate away from the cathode. It can be that bicarbonate takes some $CO_2$ with it as it migrates, which decreases the amount of $CO_2$ available for reaction at the cathode. In some MEAs, the polymer electrolyte membrane includes a polymer that blocks bicarbonate transport. Examples of such polymers include, but are not limited to, Nafion® formulations, GORE-SELECT, FumaPEM® (PFSA) (FuMA-Tech GmbH), and Aquivion® (PFSA) (Solvay). In some MEAs, there is an anode buffer layer between the polymer electrolyte membrane and the anode, which blocks transport of bicarbonate. If the polymer electrolyte membrane is an anion-conductor, or does not block bicarbonate transport, then an additional anode buffer layer to prevent bicarbonate transport can be useful. Materials that can be used to block bicarbonate transport include, but are not limited to Nafion® formulations, GORE-SELECT, FumaPEM® (PFSA) (FuMA-Tech GmbH), and Aquivion® (PFSA) (Solvay). Of course, including a bicarbonate blocking feature in the ion-exchange layer is not particularly desirable if there is no bicarbonate in the CRR.

In certain embodiments, an anode buffer layer provides a region for proton concentration to transition between the polymer electrolyte membrane to the anode. The concentration of protons in the polymer electrolyte membrane depends both on its composition and the ion it is conducting.

For example, a Nafion polymer electrolyte membrane conducting protons has a high proton concentration. A FumaSep FAA-3 polymer electrolyte membrane conducting hydroxide has a low proton concentration. For example, if the desired proton concentration at the anode is more than 3 orders of magnitude different from the polymer electrolyte membrane, then an anode buffer layer can be useful to affect the transition from the proton concentration of the polymer electrolyte membrane to the desired proton concentration of the anode. The anode buffer layer can include a single polymer or multiple polymers. If the anode buffer layer includes multiple polymers, the multiple polymers can be mixed together or can be arranged in separate, adjacent layers. Materials that can be useful in providing a region for the pH transition include, but are not limited to, Nafion, FumaSep FAA-3, Sustainion®, Tokuyama anion exchange polymer, and polyether-based polymers, such as polyethylene oxide (PEO), blends thereof, and/or any other suitable materials. High proton concentration is considered to be in the range of approximately 10 to 0.1 molar and low concentration is considered to be less than approximately 0.01 molar. Ion-conducting polymers can be placed in different classes based on the type(s) of ions they conduct. This has been discussed in more detail above. There are three classes of ion-conducting polymers described in Table 1 above. In one embodiment of the invention, at least one of the ion-conducting polymers in the cathode, anode, polymer electrolyte membrane, cathode buffer layer, and anode buffer layer is from a class that is different from at least one of the others.

Layer Porosity

It can be useful if some or all of the following layers are porous: the cathode, the cathode buffer layer, the anode and the anode buffer layer. In some arrangements, porosity is achieved by combining inert filler particles with the polymers in these layers. Materials that are suitable as inert filler particles include, but are not limited to, $TiO_2$, silica, PTFE, zirconia, and alumina. In various arrangements, the size of the inert filler particles is between 5 nm and 500 μm, between 10 nm and 100 μm, or any suitable size range. In other arrangements, porosity is achieved by using particular processing methods when the layers are formed. One example of such a processing method is laser ablation, where nano to micro-sized channels are formed in the layers. Laser ablation can additionally or alternatively achieve porosity in a layer by subsurface ablation. Subsurface ablation can form voids within a layer, upon focusing the beam at a point within the layer, and thereby vaporizing the layer material in the vicinity of the point. This process can be repeated to form voids throughout the layer, and thereby achieving porosity in the layer. The volume of a void is preferably determined by the laser power (e.g., higher laser power corresponds to a greater void volume) but can additionally or alternatively be determined by the focal size of the beam, or any other suitable laser parameter. Another example is mechanically puncturing a layer to form channels through the layer. The porosity can have any suitable distribution in the layer (e.g., uniform, an increasing porosity gradient through the layer, a random porosity gradient, a decreasing porosity gradient through the layer, a periodic porosity, etc.).

The porosities (e.g., of the cathode buffer layer, of the anode buffer layer, of the membrane layer, of the cathode layer, of the anode layer, of other suitable layers, etc.) of the examples described above and other examples and variations preferably have a uniform distribution, but can additionally or alternatively have any suitable distribution (e.g., a randomized distribution, an increasing gradient of pore size through or across the layer, a decreasing gradient of pore size through or across the layer, etc.). The porosity can be formed by any suitable mechanism, such as inert filler particles (e.g., diamond particles, boron-doped diamond particles, polyvinylidene difluoride/PVDF particles, polytetrafluoroethylene/PTFE particles, etc.) and any other suitable mechanism for forming substantially non-reactive regions within a polymer layer. The inert filler particles can have any suitable size, such as a minimum of about 10 nanometers and a maximum of about 200 nanometers, and/or any other suitable dimension or distribution of dimensions.

As discussed above, the cathode buffer layer preferably has a porosity between about 1 and 90 percent by volume but can additionally or alternatively have any suitable porosity (including, e.g., no porosity). However, in other arrangements and examples, the cathode buffer layer can have any suitable porosity (e.g., between 0.01-95%, 0.1-95%, 0.01-75%, 1-95%, 1-90%, etc.). in some embodiments, the porosity is 20% or below, e.g. 0.1-20%, 1-10%, or 5-10%.

In some embodiments, the cathode buffer layer is porous but at least one layer between the cathode layer and the anode layer is nonporous. This can prevent the passage of gases and/or bulk liquid between the cathode and anode layers while still preventing delamination. For example, the nonporous layer can prevent the direct passage of water from the anode to the cathode.

OTHER EMBODIMENTS

Although omitted for conciseness, embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

What is claimed is:

1. A method of operating an electrolyzer for carbon oxide reduction, the method comprising:
    performing normal operation at the electrolyzer, wherein normal operation comprises inletting a reactant gas comprising a carbon oxide to a cathode of the electrolyzer and applying an electrical current to the electrolyzer at a first current density, to thereby produce an operating electrical potential between the cathode and an anode of the electrolyzer and reduce the carbon oxide and produce a carbon-containing reduction product;
    performing a scheduled recovery process comprising: (i) transitioning the electrolyzer to a state in which there is an open circuit voltage between the cathode and the anode of the electrolyzer, and (ii) while the electrolyzer maintains the open circuit voltage, flowing a recovery gas to the cathode; and
    resuming normal operation at the electrolyzer, wherein resuming normal operation comprises returning to the operating electrical potential.

2. The method of claim 1, wherein normal operation comprises flowing the reactant gas to the cathode at first flow rate and at a first pressure.

3. The method of claim 1, wherein the carbon oxide is $CO_2$ and/or CO and the carbon-containing reduction product comprises CO, a hydrocarbon, or an organic oxygen-containing compound.

4. The method of claim 1, wherein normal operation comprises periodically pausing and/or pulsing the electrical current to the electrolyzer.

5. The method of claim 1, wherein performing normal operation at the electrolyzer comprises performing normal operation for a period of at least about 100 hours.

6. The method of claim 1, further comprising, after resuming normal operation at the electrolyzer, continuing to perform normal operation at the electrolyzer for at least about 100 hours before again performing the scheduled recovery process or terminating operation of the electrolyzer.

7. The method of claim 1, wherein the recovery gas has a different composition than the reactant gas.

8. The method of claim 1, further comprising determining that an event that is likely to harm performance of the electrolyzer is occurring or is likely to occur, and performing a protection process.

9. The method of claim 1, wherein normal operation comprises stopping or modifying flow of the recovery gas to the cathode.

10. The method of claim 1, wherein the recovery gas is the reactant gas.

11. The method of claim 10, wherein the recovery process comprises maintaining the reactant gas flow to the cathode while open circuit voltage is maintained.

12. The method of claim 1, wherein normal operation comprises a pulsed voltage profile.

13. The method of claim 1, wherein performing normal operation at the electrolyzer comprises performing normal operation for a period of at least about 500 hours.

14. The method of claim 1, further comprising, after resuming normal operation at the electrolyzer, continuing to perform normal operation at the electrolyzer for at least about 500 hours before again performing a scheduled recovery process or terminating operation of the electrolyzer.

15. The method of claim 1, wherein performing normal operation at the electrolyzer comprises performing normal operation for a period of at least about 1000 hours.

16. The method of claim 1, further comprising, after resuming normal operation at the electrolyzer, continuing to perform normal operation at the electrolyzer for at least about 2000 hours before again performing the scheduled recovery process or terminating operation of the electrolyzer.

* * * * *